(12) United States Patent
Wolters et al.

(10) Patent No.: US 9,248,971 B2
(45) Date of Patent: Feb. 2, 2016

(54) CONVEYOR ROLLER ARRANGEMENT

(75) Inventors: Laurens G. J. Wolters, Lichtenvoorde (NL); Michael Hendrik DeGroot, Rockford, MI (US)

(73) Assignee: Laitram, L.L.C., Harahan, LA (US)

( * ) Notice: Subject to any disclaimer, the term of this patent is extended or adjusted under 35 U.S.C. 154(b) by 61 days.

(21) Appl. No.: 14/237,503

(22) PCT Filed: Aug. 13, 2012

(86) PCT No.: PCT/US2012/050500
§ 371 (c)(1),
(2), (4) Date: Jun. 14, 2014

(87) PCT Pub. No.: WO2013/023202
PCT Pub. Date: Feb. 14, 2013

(65) Prior Publication Data
US 2015/0083547 A1 Mar. 26, 2015

Related U.S. Application Data

(60) Provisional application No. 61/522,587, filed on Aug. 11, 2011, provisional application No. 61/590,790, filed on Jan. 25, 2012, provisional application No. 61/665,888, filed on Jun. 28, 2012.

(51) Int. Cl.
*B65G 39/09* (2006.01)
*B02C 17/00* (2006.01)
(Continued)

(52) U.S. Cl.
CPC ............... *B65G 39/09* (2013.01); *B02C 17/00* (2013.01); *B02C 17/04* (2013.01); *B65G 23/04* (2013.01);
(Continued)

(58) Field of Classification Search
CPC ........ B02C 17/00; B02C 17/04; B65G 23/00; B65G 23/08; B65G 39/00
USPC ................ 193/37; 198/788; 277/420; 384/56
See application file for complete search history.

(56) References Cited

U.S. PATENT DOCUMENTS 1,780,493 A 11/1930 McKee
1,868,825 A 7/1932 Grosjean
(Continued)

FOREIGN PATENT DOCUMENTS

DE 735959 C 6/1943
DE 1842769 U 11/1961
(Continued)

OTHER PUBLICATIONS

Supplementary Partial European Search Report, EP12821834, mailed Mar. 24, 2015, European Patent Office, Munich, Germany.

*Primary Examiner* — Leslie A Nicholson, III

(57) ABSTRACT

A conveyor roller has a drum shell and an end lid that has an end lid, an embossed spring band, and a mounting face that is affixed to an axial end of the drum shell. The end lid has a cylindrical geometry that mates with the mounting face, whereby the embossed spring band is compressed by an interference fit between the two mating cylindrical geometries. A polymeric seal is disposed between the inward face of the end lid and the outward face of the drum shell, near the outer circumference of the end lid. Thus, the end lid maintains a spring force against the polymeric seal. The end lid has a ring compression geometry for exerting a compressive force on the polymeric seal as the end lid is retained against the drum shell by the embossed spring band. A cleaning system has a shaft with cleaning conduits, inlet and outlet ports, and an end lid.

10 Claims, 46 Drawing Sheets

(51) Int. Cl.
*B02C 17/04* (2006.01)
*B65G 23/08* (2006.01)
*H02K 7/116* (2006.01)
*B65G 43/02* (2006.01)
*B65G 45/22* (2006.01)
*G01M 3/26* (2006.01)
*F16H 1/32* (2006.01)
*H02K 1/27* (2006.01)
*H02K 9/06* (2006.01)
*B65G 39/02* (2006.01)
*B65G 23/04* (2006.01)

(52) U.S. Cl.
CPC ............... *B65G 23/08* (2013.01); *B65G 39/02* (2013.01); *B65G 43/02* (2013.01); *B65G 45/22* (2013.01); *F16H 1/32* (2013.01); *G01M 3/26* (2013.01); *H02K 1/2786* (2013.01); *H02K 7/116* (2013.01); *H02K 9/06* (2013.01); *Y10T 29/49826* (2015.01)

(56) References Cited

U.S. PATENT DOCUMENTS

| | | |
|---|---|---|
| 1,881,267 A | 10/1932 | Drexler |
| 3,608,987 A | 9/1971 | Jordan |
| 3,693,037 A | 9/1972 | West |
| 3,705,994 A | 12/1972 | Berry, Jr. |
| 3,763,980 A | 10/1973 | Vom Stein et al. |
| 3,957,147 A | 5/1976 | Specht |
| 4,048,531 A | 9/1977 | Buess et al. |
| 4,063,636 A | 12/1977 | vom Stein |
| 4,068,025 A | 1/1978 | Sahm |
| 4,554,473 A | 11/1985 | Muller |
| 4,575,652 A | 3/1986 | Gogue |
| 4,598,240 A | 7/1986 | Gale et al. |
| 4,604,665 A | 8/1986 | Muller et al. |
| 4,626,727 A | 12/1986 | Janson |
| 4,730,136 A | 3/1988 | Muller |
| 4,841,186 A | 6/1989 | Feigel et al. |
| 4,882,511 A | 11/1989 | von der Heide |
| 5,065,061 A | 11/1991 | Satoh et al. |
| 5,088,596 A | 2/1992 | Agnoff |
| 5,128,819 A | 7/1992 | Elsaesser et al. |
| 5,162,685 A | 11/1992 | Yamaguchi et al. |
| 5,180,344 A | 1/1993 | Hall |
| 5,200,661 A | 4/1993 | Shramo et al. |
| 5,233,250 A | 8/1993 | De Filippis |
| 5,413,209 A | 5/1995 | Werner |
| 5,442,248 A | 8/1995 | Agnoff |
| 5,448,117 A | 9/1995 | Elliott |
| 5,462,156 A | 10/1995 | Kobayashi et al. |
| D423,178 S | 4/2000 | Specht |
| 6,119,969 A | 9/2000 | Racine |
| 6,124,656 A | 9/2000 | Jensen |
| 6,206,181 B1 | 3/2001 | Syverson |
| 6,244,427 B1 | 6/2001 | Syverson |
| 6,286,659 B1 | 9/2001 | Petrovic |
| 6,402,653 B1 | 6/2002 | Jensen |
| 6,419,070 B1 | 7/2002 | Agnoff |
| 6,443,295 B1 | 9/2002 | Hill |
| 6,502,690 B1 | 1/2003 | Specht |
| 6,585,107 B1 | 7/2003 | Specht |
| 6,710,505 B1 | 3/2004 | Barani et al. |
| 6,879,078 B2 | 4/2005 | Wolters |
| 6,997,461 B2 | 2/2006 | Smith et al. |
| 7,049,718 B2 | 5/2006 | Nickel-Jetter et al. |
| 7,157,817 B2 | 1/2007 | Nvidberg |
| 7,207,433 B2 | 4/2007 | Schaefer |
| 7,318,578 B2 | 1/2008 | Hvidberg et al. |
| 7,329,215 B2 | 2/2008 | Umeda |
| 7,337,524 B2 | 3/2008 | Wolters |
| 7,510,073 B2 | 3/2009 | Kanaris |
| 7,954,626 B2 | 6/2011 | Eigenfeld |
| 2006/0033286 A1 | 2/2006 | Erich |
| 2006/0228174 A1 | 10/2006 | Woodhead et al. |
| 2007/0018596 A1 | 1/2007 | van den Bogaerd |
| 2009/0101466 A1 | 4/2009 | Karcher |
| 2009/0294255 A1 | 12/2009 | Szarkowski et al. |
| 2010/0230250 A1 | 9/2010 | Lindemann |
| 2011/0062000 A1 | 3/2011 | Yamamoto |
| 2012/0134610 A1 | 5/2012 | Leuver et al. |
| 2013/0087433 A1 | 4/2013 | Sejourne |

FOREIGN PATENT DOCUMENTS

| | | |
|---|---|---|
| DE | 1192584 B | 5/1965 |
| DE | 1540442 A | 2/1979 |
| DE | 29611097 U1 | 9/1996 |
| DE | 19618248 C1 | 10/1997 |
| DE | 19639091 A1 | 3/1998 |
| DE | 29623889 U1 | 6/2000 |
| DE | 19527082 C2 | 2/2003 |
| DE | 10308070 A1 | 9/2004 |
| DE | 102006057461 B4 | 2/2009 |
| DE | 102008061979 B4 | 12/2010 |
| EP | 2184836 A1 | 5/2010 |
| GB | 2241558 A | 4/1991 |
| GB | 2472020 A | 1/2011 |
| WO | 8300954 A1 | 3/1983 |
| WO | 0059810 A2 | 10/2000 |
| WO | 2007125001 A2 | 11/2007 |
| WO | 2010022698 A1 | 3/2010 |
| WO | 2011036219 A1 | 3/2011 |

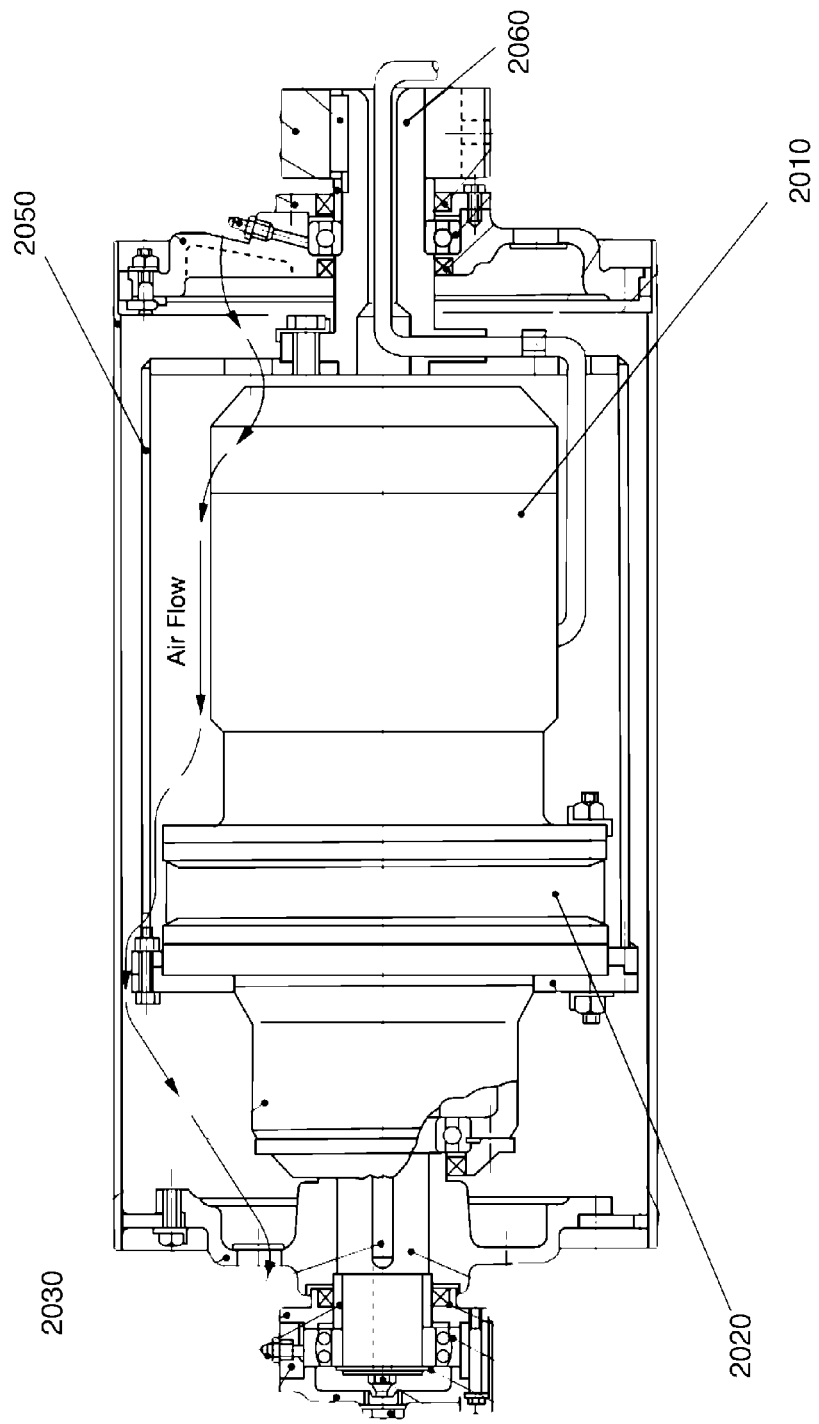

Section A-A

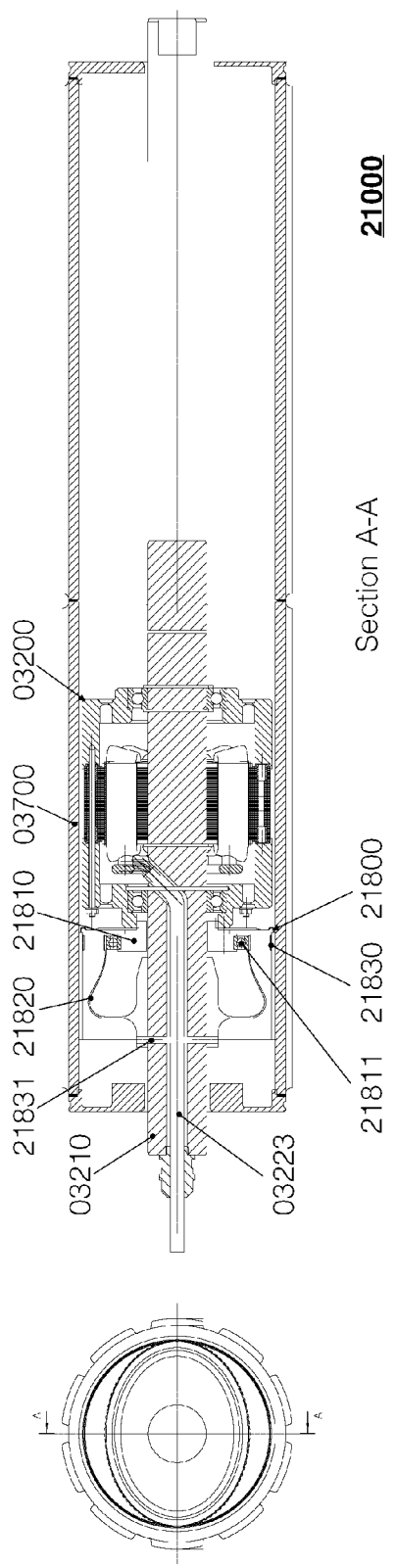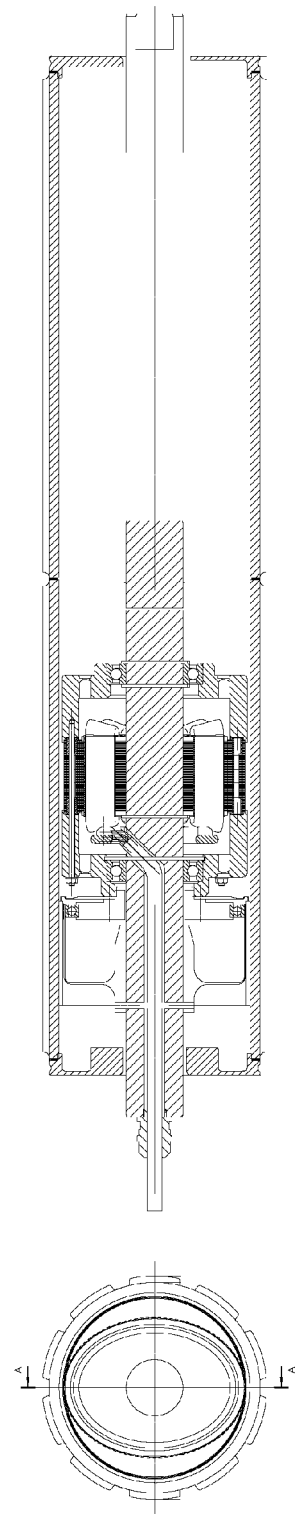

CONVEYOR ROLLER ARRANGEMENT

RELATIONSHIP TO OTHER APPLICATION(S)

This application claims the benefit of the filing dates of: U.S. Provisional Patent Application Ser. No. 61/522,587, filed Aug. 11, 2011; U.S. Provisional Patent Application Ser. No. 61/590,790, filed Jan. 25, 2012; and U.S. Provisional Patent Application Ser. No. 61/665,888, filed Jun. 28, 2012, the disclosures of all of which are incorporated herein by reference.

BACKGROUND OF THE INVENTION

1. Field of the Invention

This invention relates generally to high powered compact electric motors, and more particularly, to a motor and reducer system, the motor being an outer rotor motor that is particularly adaptable for motorized drums used in a conveyor or the like to drive a conveyor belt or the like around the drum shell, and more particularly to sanitary conveyor motorized drum applications. In addition, this invention relates to a sanitation system that monitors fluid pressures within high powered compact electric motors, as well as fluid pressures within conveyor rollers and supporting structures, the sanitation system being particularly adaptable to sanitary conveyor applications.

2. Description of the Related Art

Motorized drums are predominantly configured so that a motor and reducer are disposed within a drum shell and the rotations of the motor are reduced by the reducer and then transmitted to the drum shell so that when the external shafts are secured to the frame of a conveyor, the drum shell is able to rotate. In some embodiments, the drum shell drives a flat belt, or toothed belt, or modular belt.

The motorized drum that is currently available has a drum shell and the motor and reducer are housed within this drum shell. Bearings and seals are disposed at both end sections of the drum shell with end covers for closing these end sections disposed between the bearings and the drum shell. Labyrinths are frequently used in the end covers to protect the seals from high pressure water that is used to clean food processing plants. There are employed first and second mounting shafts that enable rotation relative to the drum shell. Accordingly, the drum shell rotates about a central axis of the first and second mounting shafts. The first mounting shaft contains a hollow portion through which the motor wiring leads, which are connected to the motor, exit the motorized drum. The known motorized drum is partially filled with oil, which lubricates the open gear box and bearings, and transmits the heat from the motor to the inner periphery of the roller drum as the oil moves throughout the motorized drum.

The known motor has an internal rotor with a shaft attached. This motor rotor shaft also functions as the input shaft for the reducer. The reducer has an output shaft that is coupled to the shell while the fixed reference point of the reducer (it's housing) rotates relative to the drum shell and has no rotary motion relative to the motor stator and mounting shafts. When the motor is energized, the shaft of the known motor rotates. The speed of this rotation is reduced by the reducer, and the reducer output power is then transmitted to the drum shell via the output shaft, thereby driving the drum shell into rotation. In order to achieve smooth operation, the central axis of the motor output shaft and the central axis of the first and second mounting shafts must be in substantial alignment with each other.

The food processing industry is often a twenty four hour cycle that typically employs two shifts of production and one shift of cleaning. The focus is on high throughput, and downtime is not acceptable. Equipment failure must be repairable immediately or replaceable with spare parts.

Existing motorized drums are essentially custom products. Four variables are involved in the selection of a motorized drum. These are: belt speed, belt width, belt pull, and pulley diameter. Additional options may also be included in the analysis, such as lagging, various electrical options, and the need for reinforced shafts.

Currently, the industry predominantly uses AC induction motors that operate at a fixed speed. A motor speed and a gear reduction arrangement must be selected to provide the highest possible belt pull for the application, while creating the lowest amount of heat. The heat issue is critical as the motorized drum is a closed system that renders removal of heat to be very difficult. Therefore a large number of motors, in different poles, must be considered for each diameter along with multiple two and three stage gear boxes.

Currently, the industry uses helical gearing that is limited by the diameter and axial length of the pulley. Therefore, to transmit the necessary torque through the gear box, it is often necessary to use a larger diameter pulley, which is usually not preferred by the market.

In order to have the correct motorized drum available for each application, the manufacturer would need to stock thousands of possibilities, which is not financially feasible. Therefore, each motor is custom built based upon the four variables noted above, resulting in unacceptably long lead times to the industry. As zero downtime is a market requirement, the food processor customer must stock spares of all the motors he uses. This can be as many as several hundreds of motors, requiring high capital investment and cost.

Therefore, it is an object of this invention to create a modular motorized drum that can eliminate the customer's need for a large spare parts inventory by means of a motorized drum produced in its minimal axial length (hereafter, base unit), that includes a mounting face system on one end of the motorized drum onto which various components can be mounted. Such components include end lids, additional extension drum shells and an extension shaft that can accommodate the attachment of sprockets, among others.

It is a further object of this invention to increase the torque density of the motorized drum so that the modular base unit can be a single unit in a preferred diameter and axial length.

It is another object of this invention to provide a motor that maintains a relatively constant torque and efficiency curve across a broad speed range so that a single base unit can be used in all applications within a given production plant.

Customers require spares and spare parts because of the high likelihood of catastrophic failure present in the current art. One contributor to catastrophic failure among current art is the high belt pull and/or tension of the belt on the motorized drum that causes severe and immediate damage to the internal components. Existing motorized drums use segmented or partial shafts. A partial shaft is fixed to the conveyor and enters the motorized drum and is attached to a motor flange. The motor flange is attached to the motor, and the motor is attached to a gear box. The gear box is attached to a partial shaft that exits the motorized drum and is then affixed to the conveyor. These partial shaft segments are either substantially coaxial or are parallel with the motor shaft portion. The dividing of the shaft axially, however, diminishes the transaxial rigidity of the shaft, causing flexure and misalignment between the partial shafts and thus between the motor and transmission.

Such misalignment creates inefficiency, high wear, and often catastrophic failure of the transmission or motor. Prior art efforts to alleviate this problem by include increasing the diameter of the first or second mounting shaft within the motorized drum as the axial length of the motorized drum increases. Others in the art have sought to compensate by using axially longer end lids.

Therefore, it is an object of this invention to accommodate the misalignment between all components of the motorized drum and to accommodate, rather than minimize, the inherent forces causing deflection that enters the motorized drum.

Another significant problem with existing art is its inability to comply fully with the food safety demands of the market. First, it is noted that existing products are filled with oil in order to lubricate gears, bearings, and seals. The oil also transmits heat from the motor core to the shell, where it can be removed by conduction to the belt. Further, system inefficiencies create heat and build pressure in the system, forcing the oil to leak through the rubber lip seals—especially where scoring has occurred in the shaft at the seal. Oil leakage creates the risk of contamination of the food products.

Therefore, it is yet another object of this invention to eliminate the use of oil in the motorized drum.

Second, it is a significant problem with existing motor designs that harborage points exist in the exterior of the drum unit wherein bacterial colonies (i.e., pathogens) can grow. Examples of efforts to alleviate this problem include the use of a labyrinth in the end lid that is used to protect rotary shaft seals from high pressure washing. Also, external bolts and washers are used to connect the end lids to the drum shell, and further bacterial harborage regions are present between the drum shell and its end lids.

Therefore, it is a further object of the invention to eliminate harborage points where colonies of bacteria can flourish.

Third, existing motorized drums that drive modular conveyor belting or toothed driven belting, predominantly engage the belting by means of grooved rubber or polyurethane lagging. This lagging will crack, lift, or pit, thereby not only creating additional harborage points for bacteria, but also serving to isolate heat within the motor. The result is that currently available motors must be derated typically by approximately 18%. This means that more heat is created in relationship to the work performed because the motor is now running at decreased efficiency. The lagging therefore causes the pulley to take a longer period of time to reach steady state, and when it does reach the steady state condition, it does so at a higher temperature than would have been the case without the polymeric lagging, ultimately resulting in higher belt temperature. This additional heat must then be removed from the lagging by the conveyor belt. As the conveyor belt moves along the conveyor, the heat typically is removed from the belt either by convection into the environment or through conduction into the food product being conveyed. It is desired by food industry personnel that no heat from the drive system enter into the food product.

Other prior art arrangements drive modular conveyor belting or toothed driven belting by mounting sprockets to the drum shell instead of lagging. In such arrangements, the conveyor belt does not contact the drum shell directly, and therefore the drum motor still needs to be derated. Further, the sprockets, in their various mounting structures to the shell, create harborage points or dead spaces where bacterial colonies can grow.

Therefore, it is an object of this invention to reduce the steady state temperature of the motorized drum.

It is a further object of the invention to increase the rate of heat dissipation from the windings within the electrical motor to the inner surface of the drum shell.

Fourth, the food industry is concerned about potential cross contamination between the materials within a motorized drum and the food products being conveyed. Thus, the industry continues to seek a solution that will announce the presence of conditions that produce a likelihood of cross contamination. For example, many food industry customers require that red or blue dyes be added to a food grade oil so that when oil leaks, it can be detected. This proposed solution is not reliably effective because after the motorized drum is operated for a period of time, the oil becomes black and the red or blue dye no longer functions as an alert. Additionally, even when there is no actual leakage of oil, cross contamination is still a threat because bacterial colonies will grow in a labyrinth or seal unnoticed, which can then be propelled onto the conveyor during performance of a high pressure cleaning procedure.

Therefore, it is still another object of this invention not only to eliminate the use of oil in a closed system, but also to monitor the corruption of the rotary shaft seals and the static end lid seals in order to alert the system operator in a timely manner that the integrity of the seals has been compromised.

SUMMARY OF THE INVENTION

The foregoing and other objects are achieved by this invention, which provides, in accordance with a first apparatus aspect thereof, a conveyor roller having a drum shell, and a shaft extending outward of the drum shell. An end lid seal assembly is affixed to an axial end of the drum shell. The end lid seal assembly is provided with an end lid interposed between the drum shell and the shaft, a polymeric rotary seal, and a seal compression plate.

In one embodiment of this first apparatus aspect of the invention, there is additionally provided a fastener that extends through the seal compression plate and is fastened into the end lid. In a specific illustrative embodiment of the invention, the seal compression plate is fastened into the end lid by threaded engagement.

In a further embodiment, there is provided an embossed spring band for fastening the end lid against a mounting face. The embossed seal band ensures that the seal compression plate is pressed toward the end lid, and that a force is applied to the polymeric rotary seal.

In another embodiment there is provided a ring compression geometry on an axially inward face and about an inner circumference of the end lid. The ring compression geometry exerts a compressive force on the polymeric rotary seal when the end lid is urged toward the end lid.

In a still further embodiment, the seal compression plate is configured to have a ring compression geometry on its axially outward face about an inner circumference of the end lid. The ring compression geometry exerts a compressive force on the polymeric rotary seal when the seal compression plate is urged toward the end lid.

In accordance with a second apparatus aspect of the invention, there is provided a conveyor roller having a drum shell. An end lid assembly is provided with an end lid, an embossed spring band, and a mounting face that is affixed to the drum shell at an axial end of the drum shell. The end lid has a first cylindrical geometry with a first nominal diameter designed to mate with a second cylindrical geometry having a second nominal diameter on the mounting face, whereby when the embossed spring band is disposed radially between the mating first and second cylindrical geometries, the embossed spring band is compressed to an extent that creates an interference fit between the two mating cylindrical geometries.

In one embodiment of this second apparatus aspect of the invention, there is additionally provided a polymeric seal that is disposed axially between the axially inward face of the end lid and the axially outward face of the drum shell about the outer circumference of the end lid. The end lid maintains a spring force about its outer circumference against the polymeric seal. In a specific illustrative embodiment of the invention, the end lid is configured to have a ring compression geometry on its axially inward face about the outer circumference of the end lid, for exerting a compressive force on the polymeric seal as the end lid is retained against the drum shell by the embossed spring band.

In another embodiment, the drum shell is configured to have a ring compression geometry on an axially outward face about the outer circumference of the end lid. Such a ring compression geometry exerts a compressive force on the polymeric seal as the end lid is retained against the drum shell by the embossed spring band.

In accordance with a third apparatus aspect of the invention, there is provided a conveyor roller that has a drum shell. There is additionally provided a cleaning system for rotary shaft seals. In accordance with the invention, the cleaning system has a shaft with first and second cleaning conduits, an inlet port attached to the first cleaning conduit, and an outlet port that is attached to the second cleaning conduit. An end lid is provided having an axially inward face. There are also provided a first axially outward polymeric rotary seal and a second axially outward polymeric rotary seal. A chamber is formed between the first and second axially outward polymeric rotary seals, into which the first and second cleaning conduits communicate. A seal compression plate and a seal spacer ring are also provided.

In one embodiment of this third apparatus aspect of the invention, there is provided a fastener. The chamber is formed between the first and second axially outward polymeric rotary seals, by the process of:

disposing an outward face of the first axially outward polymeric rotary seal axially inward of the inward face of the end lid;

disposing an outward face of the seal spacer ring axially inward of an inward face of the first axially outward polymeric rotary seal;

disposing an outward face of the second axially outward polymeric rotary seal axially inward of an inward face of the spacer ring;

disposing an outward face of the seal compression plate axially inward of the inward face of the second axially outward polymeric rotary seal; and urging the seal compression plate toward the end lid by operation of the fastener.

In a further embodiment, the end lid is configured to have a ring compression geometry on an axially inward face about its inner circumference, for exerting a compressive force on the first axially outward polymeric rotary seal when the seal compression plate is urged toward the end lid.

In yet another embodiment, the seal spacer ring is configured to have a ring compression geometry on its axially outward face about the inner circumference of the end lid, which imposes an axial compressive force on the first axially outward polymeric rotary seals when the seal compression plate is urged against the end lid.

BRIEF DESCRIPTION OF THE DRAWING

Comprehension of the invention is facilitated by reading the following detailed description, in conjunction with the annexed drawing, in which:

FIG. 2 is a simplified schematic representation of another conventional motorized drum;

FIG. 21 is a simplified schematic representation of a motorized drum utilizing a harmonic speed reducer with a hollow bore input, wherein the major axis of the wave generator is in the horizontal position;

FIG. 22 is a simplified schematic representation of a motorized drum utilizing a harmonic speed reducer with a hollow bore input, wherein the major axis of the wave generator is in the vertical position;

DETAILED DESCRIPTION

Figure 1:
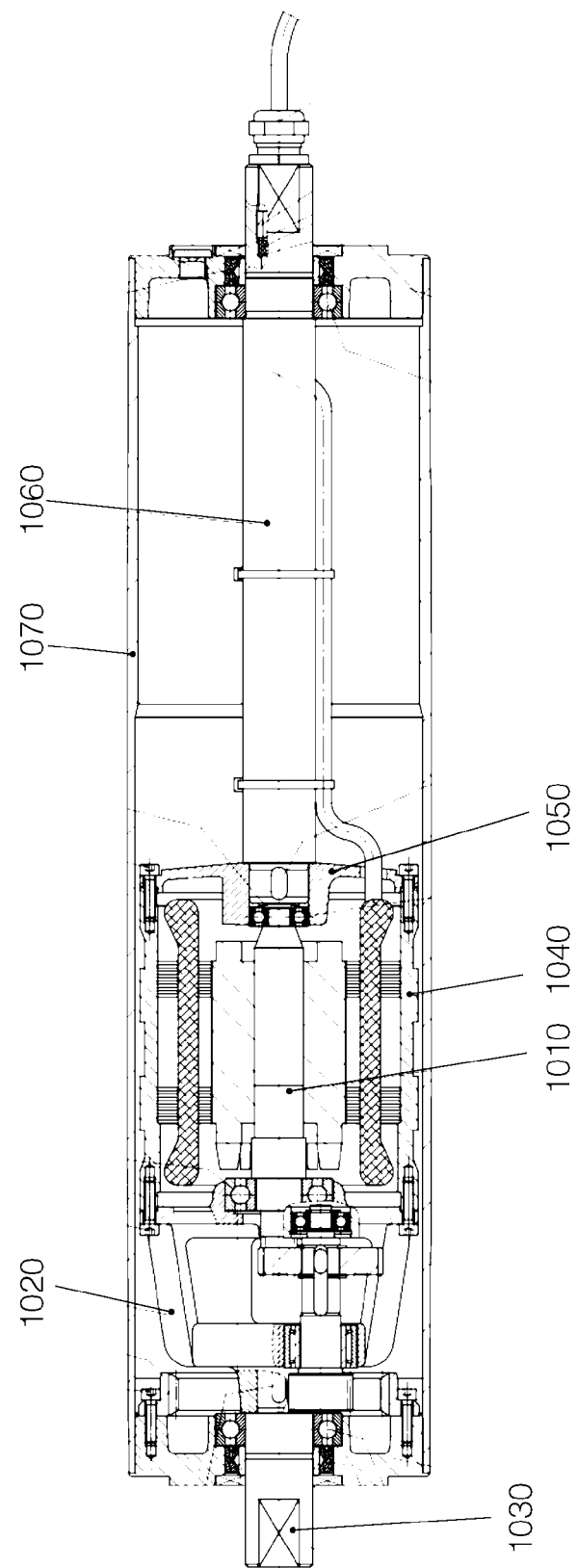
FIG. 1 is a simplified schematic representation of a conventional motorized drum.

The following designations of items in the drawings are employed in the following detailed description:

| Item # | Description |
|---|---|
| 03000 | Motorized drum |
| 03010 | Base unit |
| 03100 | Cycloidal Reducer |
| 03110 | Hollow bore eccentric input |
| 03140 | Cycloidal disk (external toothed gear) |
| 03150 | Primary guide pin support ring |
| 03151 | Secondary guide pin support ring |
| 03153 | Guide pin bushing |
| 03160 | Cycloidal reducer housing (internal toothed ring gear) |
| 03161 | Ring pin |
| 03200 | Motor (Permanent magnet) |
| 03210 | Central shaft |
| 03220 | Stator |
| 03221 | Stator laminations |
| 03222 | Stator windings |
| 03223 | Stator winding leads |
| 03230 | Rotor |
| 03231 | First rotor bearing |
| 03232 | Second rotor bearing |
| 03233 | Primary rotor end lid |
| 03234 | Secondary rotor end lid |
| 03241 | Rotor laminations |
| 03242 | Rotor lamination clamp bolt |
| 03247 | Rotor output tab |
| 03310 | High speed coupler |
| 03350 | High torque coupler |
| 03351 | High torque central shaft key |
| 03410 | Primary end lid |
| 03420 | Embossed spring band |
| 03430 | End lid mounting face |
| 03440 | Seal compression plate |
| 03441 | Fastener |
| 03442 | Rotary polymeric lip seal |
| 03450 | Static polymeric seal |
| 03510 | Mounting ring |
| 03511 | Primary spring ring |
| 03512 | Mounting face |
| 03520 | Extension clamp spacer |
| 03530 | Clamp ring |
| 03531 | Secondary spring ring |
| 03532 | Extension clamping bolt |
| 03533 | Mating cam face washers |
| 03534 | Bolt holder |
| 03540 | Seal compression plate |
| 03541 | Fastener |
| 03542 | Rotary polymeric lip seal |
| 03560 | Extension shell attachment |
| 03570 | End lid attachment |
| 03571 | Embossed spring band |
| 03572 | Static seal |
| 03700 | Drum shell |
| 03710 | First base unit bearing |
| 03711 | Second base unit bearing |
| 04000 | Motorized drum |
| 04111 | Eccentric input shaft |
| 04140 | Cycloidal disk (external toothed gear) |
| 04152 | Guide pin |
| 04153 | Guide pin bushing |
| 04160 | Cycloidal reducer housing (internal toothed ring gear) |
| 04161 | Ring pin |
| 04200 | Motor (Induction) |
| 04210 | Stator shaft |
| 04220 | Stator |
| 04221 | Stator laminations |
| 04230 | Rotor |
| 04231 | First rotor bearing |
| 04232 | Second rotor bearing |
| 07224 | Stator slots |
| 07225 | Stator slots |
| 07226 | Stator winding retaining hook |
| 08235 | Rotor slot |
| 1010 | Inner turning rotor |
| 1020 | Helical gear reducer housing |
| 10236 | Rotor bar |
| 1030 | First partial shaft |
| 1040 | Motor housing |
| 1050 | Motor flange |
| 1060 | Second partial shaft |
| 1070 | Drum shell |
| 11224 | Stator wire portion |
| 11225 | Stator wire portion |
| 11226 | Stator wire portion |
| 11227 | Stator wire portion |
| 13243 | Embedded north rotor magnets |
| 13244 | Embedded south rotor magnets |
| 13246 | Rotor lamination bolt hole |
| 15245 | Rotor magnets - surface mounted |
| 18233 | Primary rotor end lid |
| 18234 | Secondary rotor end lid |
| 18240 | Rotor fins |
| 18249 | Air flow loop |
| 19100 | Cycloidal Reducer |
| 19111 | Eccentric input shaft |
| 19140 | Cycloidal disk (external toothed gear) |
| 19141 | Aperture |
| 19152 | Guide pin |
| 19153 | Guide pin bushing |
| 19160 | Cycloidal reducer housing (internal toothed ring gear) |
| 19161 | Ring pin |
| 19162 | Ring pin bushing |
| 2010 | Inner turning rotor motor |
| 20100 | Cycloidal Reducer |
| 20110 | Hollow bore eccentric input |
| 20140 | Cycloidal disk (external toothed gear) |
| 20141 | Aperture |
| 20152 | Guide pin |
| 20153 | Guide pin bushing |
| 20160 | Cycloidal reducer housing (internal toothed ring gear) |
| 20161 | Ring pin |
| 20162 | Ring pin bushing |
| 2020 | Cycloidal speed reducer |
| 2030 | First partial shaft |
| 2040 | Motor housing |
| 2050 | Support flange |
| 2060 | Second partial shaft |
| 21000 | Motorized drum |
| 21800 | Harmonic speed reducer |
| 21810 | Wave generator |
| 21811 | Elliptical ball bearing |
| 21820 | Flexible spline |
| 21830 | Rigid circular spline |
| 21831 | Affixing pin |

-continued

| Item # | Description |
| --- | --- |
| 23120 | Hollow bore eccentric raceway |
| 23130 | Hollow bore eccentric input tab |
| 27110 | Cycloidal reducer input |
| 27150 | Cycloidal reducer fixed reference |
| 27160 | Cycloidal reducer output |
| 27410 | End lid |
| 31130 | Hollow bore eccentric input slot |
| 31248 | Rotor output slot |
| 31310 | High speed coupler - first alternate |
| 32310 | High speed coupler - second alternate |
| 33131 | Hollow bore eccentric input tab |
| 33132 | Hollow bore eccentric input slot |
| 33310 | High speed coupler - third alternate |
| 35210 | Central shaft |
| 35311 | High speed coupler orthogonal driving face |
| 35312 | High speed coupler orthogonal driving face |
| 35313 | High speed coupler orthogonal driving face |
| 35314 | High speed coupler orthogonal driving face |
| 35315 | High speed coupler orthogonal driving face |
| 35316 | High speed coupler orthogonal driving face |
| 35317 | High speed coupler orthogonal driving face |
| 35318 | High speed coupler orthogonal driving face |
| 35350 | High torque coupler |
| 35352 | High torque keyless bushing |
| 35353 | High torque key ring |
| 36000 | Motorized drum |
| 36513 | Mounting ring alignment bolt |
| 36530 | Clamp ring |
| 36532 | Extension clamping bolt |
| 36560 | Extension shaft attachment |
| 37000 | Motorized drum |
| 37510 | Mounting ring |
| 37511 | Primary spring ring |
| 37530 | Clamp ring |
| 37560 | Extension shaft attachment |
| 38530 | Clamp ring |
| 38550 | Threaded flange |
| 38551 | Central nut |
| 46900 | End lid Removal Tool |
| 46910 | Joining cord |
| 46920 | Recessed, outer circumferential geometry |
| 46930 | Recessed, inner circumferential geometry |
| 46940 | End tool clamp |
| 46950 | Slide hammer |
| 48000 | Motorized drum |
| 48210 | Central shaft |
| 48540 | Seal compression plate |
| 48541 | Seal spacer ring |
| 48570 | End lid attachment |
| 48610 | First cleaning conduit |
| 48611 | Second cleaning conduit |
| 48612 | Fluid conduit |
| 48613 | Annular chamber |
| 48614 | Dead space |
| 48615 | Motorized drum chamber |
| 48620 | Inlet port |
| 48621 | Outlet port |
| 48622 | Fluid port |
| 48630 | Polymeric radial seal |
| 48631 | Polymeric radial seal |
| 48632 | Polymeric radial seal |
| 49100 | Fluid line |
| 49200 | Sensor |
| 49300 | Controller |
| 49400 | Valve |
| 49500 | Pump |
| 50450 | Chamfer |
| 50510 | Mounting ring |
| 50511 | Spring ring |
| 50512 | Mounting face |
| 50530 | Clamp ring |
| 50531 | Spring ring |
| 50532 | Clamping bolt |
| 50560 | Extension shell attachment |
| 50700 | Drum shell |

FIG. 1 is a simplified schematic representation of a prior art motorized drum that utilizes an inner turning rotor motor 1010, a helical gear reducer 1020 and a first partial shaft 1030 connected to the helical gear reducer housing 1020, which is connected to the motor housing 1040. Motor housing 1040 is connected to a motor housing flange 1050, which is connected to a second partial shaft 1060. This motorized drum is a closed, oil-filled, thermal system utilizing the oil (not shown) to transfer motor heat (not shown) to drum shell 1070.

FIG. 2 is a simplified schematic representation of a prior art motorized drum that utilizes an inner turning rotor motor 2010, a cycloidal reducer 2020 and a first partial shaft 2030 that is connected to the housing (not specifically designated) of cycloidal reducer 2020. The housing of cycloidal reducer 2020 is connected to a motor stator housing (not specifically designated) and a support flange 2050 that encompasses the motor. Support flange 2050 is further connected to a second partial shaft 2060.

This motorized drum is an open thermal system, utilizing external air (shown by curved arrows), which is urged into the motorized drum and flows across the motor and reducer and exits the opposite end of the motorized drum, to transfer the motor heat into the ambient environment.

Figure 3C:
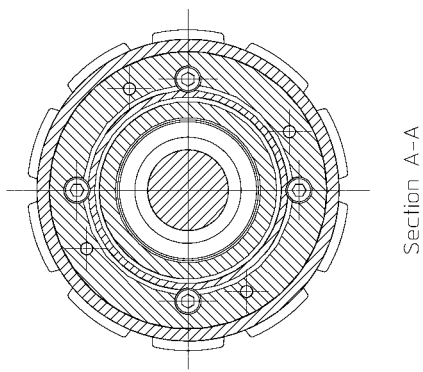
FIG. 3(c) is a simplified section view across A-A of FIG. 3B, showing the mounting face.
Figure 3A:
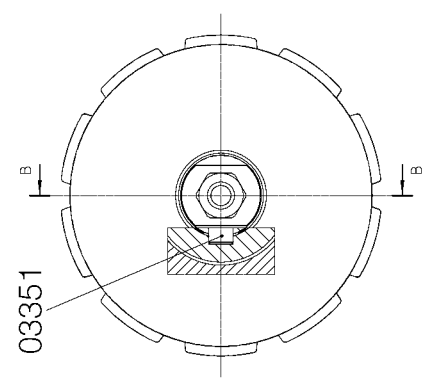
FIG. 3(a) is a simplified end view of an embodiment of the motorized drum of the present invention with a partial cut away showing the key inserted in the central shaft for engaging the high torque coupler.
Figure 3B:
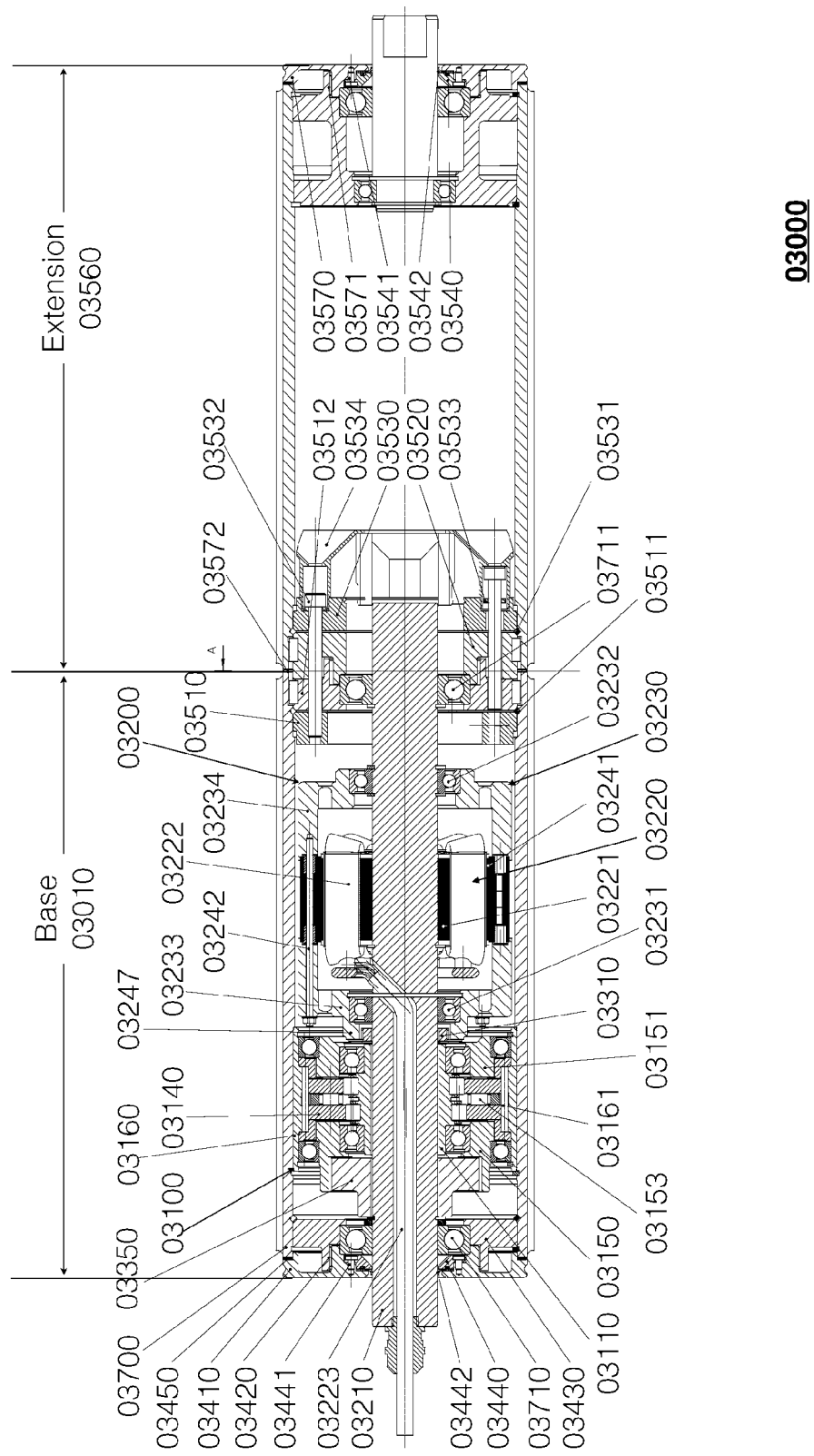
FIG. 3(b) is an axial cross-section of a motorized drum of a particular embodiment of the present invention, wherein an external rotor is connected to a cycloidal reducer utilizing a hollow bore input shaft within a drum shell, and wherein an extension shell component with integrated sprocket geometry is attached to the mounting face of the base unit.

FIG. 3(b) is a side plan axial cross-sectional representation of a motorized drum 03000 constructed as a specific illustrative embodiment of the invention of the present invention. In this embodiment, the radially interior periphery of external rotor 03230 rotates about the radially exterior stator 03220 and is connected to a cycloidal reducer 03100 utilizing a hollow bore input shaft 03110 within a drum shell 03700, and wherein an extension shell attachment 03560 is attached to the mounting face 03512 of base unit 03010.

The motorized drum 03000 of the present invention comprises a drum shell 03700 and the motor 03200 and cycloidal reducer 03100 are housed inside of drum shell 03700. Bearings 03710, 03711 are disposed at both end sections of the drum shell on the central shaft 03210 thereby constituting the base unit 03010. In this embodiment, an extension shell attachment 03560 is mounted to the mounting face 03512 on the right side of the base unit 03010. The base unit 03010 plus the mounted extension shell attachment 03560 are sealed forming a closed thermal system.

The motor output, which is a pair of tabs 03247 on the rotor 03230, is coupled to the cycloidal reducer input 03110, by means of a high speed coupler 03310 thus reducing the speed and increasing the torque. The cycloidal housing, which is an internal toothed ring gear 03160, is directly connected to drum shell 03700 so that the drum shell rotates about fixed central shaft 03210.

Stator 03220 of motor 03200 is affixed to central shaft 03210. The central shaft and stator winding leads 03223 pass through the center of the hollow bore eccentric input 03110 of the cycloidal reducer 03100 with sufficient clearance to accommodate the deflection that central shaft 03210 will experience in operation. Outer turning rotor 03230 is mounted to central shaft 03210 by means of rotor bearings 03231 and 03232.

The fixed reference point of the cycloidal reducer 03100 is affixed to central shaft 03210 by a high torque coupler 03350 and high torque central shaft key 03351 (FIG. 3a).

A primary end lid 03410 is attached to the base unit 03010 by means of an embossed spring band 03420 and an end lid mounting face 03430.

Figure 4:
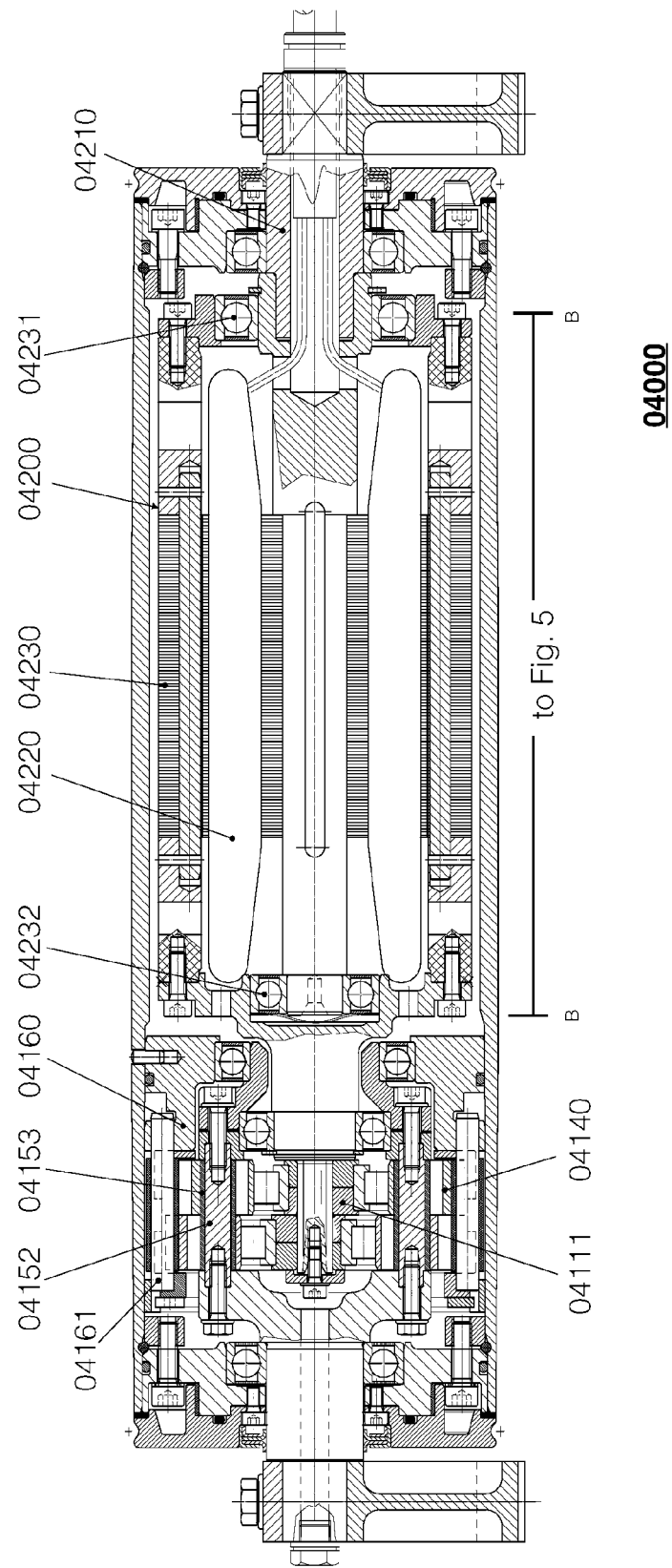
FIG. 4 is an axial cross-section of a motorized drum of a particular illustrative embodiment demonstrating some of the aspects of the present invention, wherein an external rotor is connected to a cycloidal reducer utilizing a central input shaft within a drum shell.

FIGS. 4 through 12 relate to an embodiment of the present invention, wherein the outer turning rotor is of an induction motor. FIG. 4 is a simplified axial cross-section through a motorized drum 04000 wherein a motor 04200 has an external rotor 04230 constructed in accordance with the principles of one embodiment of the invention. Outer turning rotor 04230 improves the torque density of the motor, whereby the same torque that is achievable in an inner turning rotor can be achieved in an outer turning rotor in either a smaller diameter or a shorter axial length. In FIG. 4, outer turning rotor 04230 is, as stated, of an induction motor. A stator 04220 is affixed to the stator shaft 04210 and external rotor 04230 is arranged to rotate about stator 04220 and stator shaft 04210, which are fixed.

Figure 5:
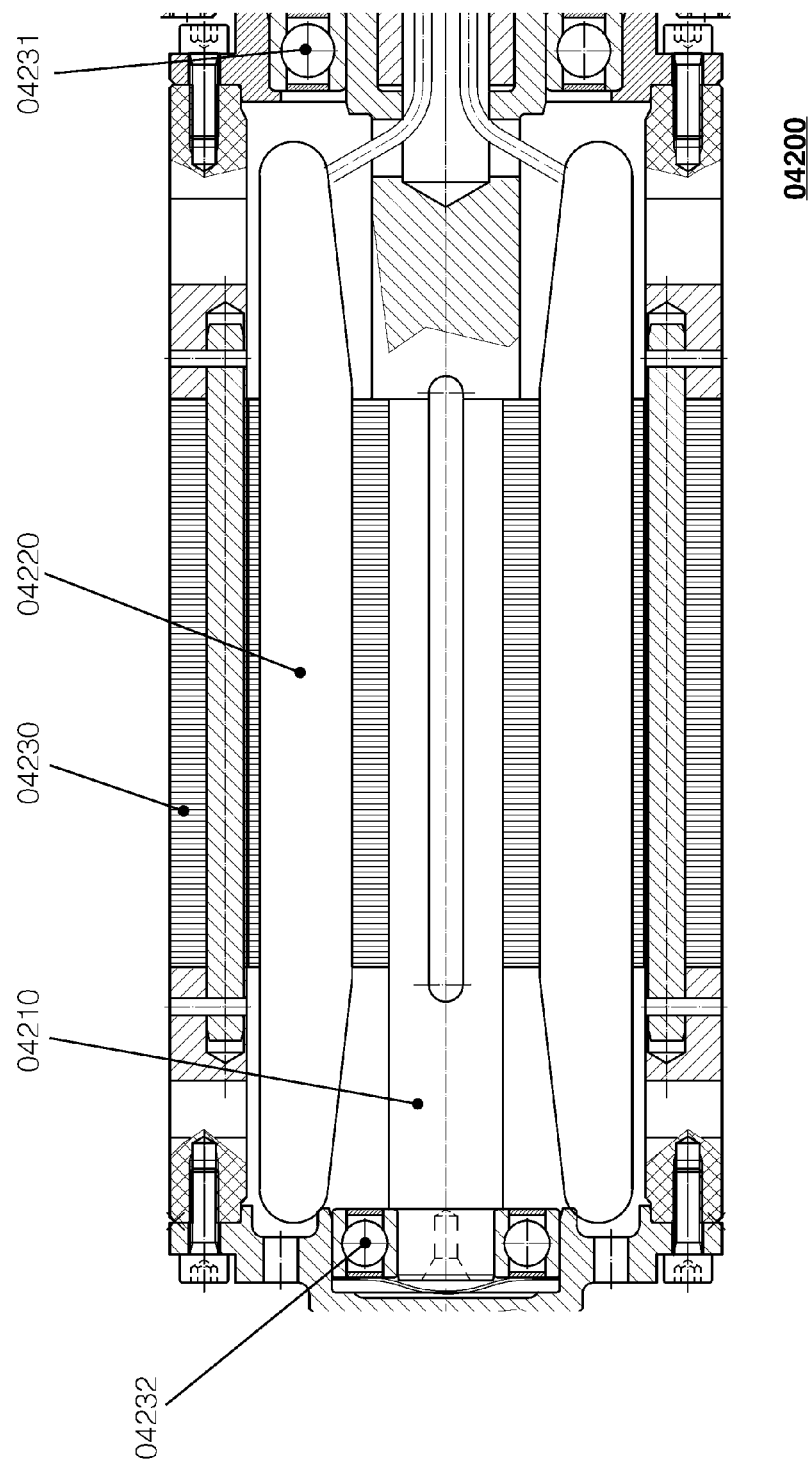
FIG. 5 is an enlargement of the portion B-B of the simplified schematic cross-sectional representation of the embodiment of FIG. 4.

FIG. 5 is an enlargement of the portion B-B of the electric motor of FIG. 4. Here it is seen that the external rotor 04230 is rotatably supported on stator shaft 04210 by bearings 04231 and 04232 (only partially shown in FIG. 5), which in this specific illustrative embodiment of the invention are conventional ball bearings.

Figure 6:
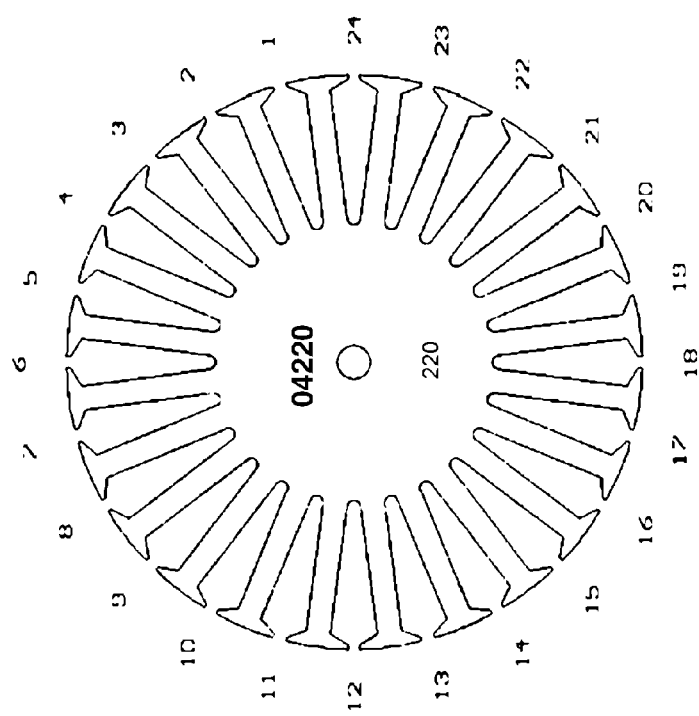
FIG. 6 is a simplified schematic cross-sectional representation of a portion of the stator of an outer rotor induction motor embodiment of the invention having twenty-four slots.

FIG. 6 is a simplified schematic transaxial cross-sectional representation of a portion of stator 04220 of outer rotor induction motor 04200 (not shown in this figure). The represented portion of stator 04220, in some embodiments of the invention, corresponds to a ferromagnetic lamination element 04221 of stator 04220 (designated generally in this figure). In this specific illustrative embodiment of the invention, stator 04220 is configured to have twenty-four slots (each of which is individually numbered in the figure).

Figure 7:
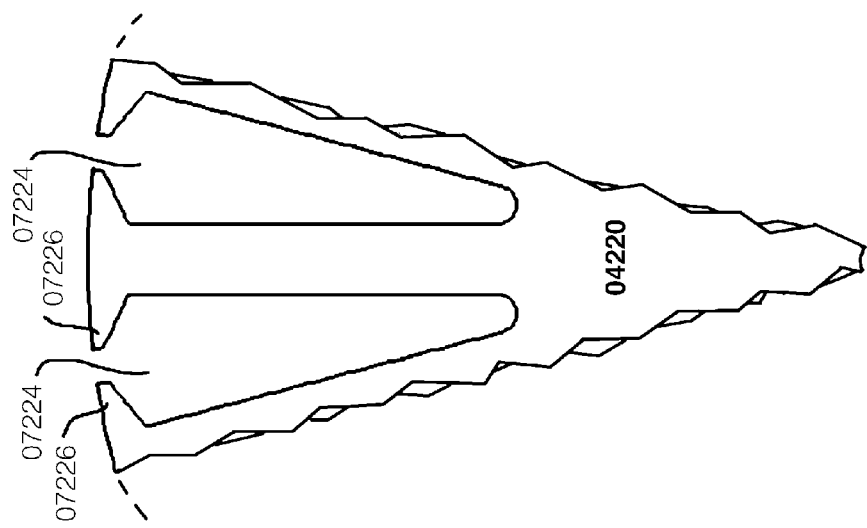
FIG. 7 is an enlargement of a fragmented portion of the simplified schematic cross-sectional representation of the of the stator embodiment of FIG. 6 showing two of the twenty-four slots in greater detail.

FIG. 7 is an enlargement of a fragmented portion of stator 04220 of FIG. 6. This figure shows two of the twenty-four slots in greater detail. As shown in this figure, representative slots 07224 and 07225 each extend substantially radially through stator 04220, and have a substantially V-shaped configuration. Each such slot has, in this specific illustrative embodiment of the invention, substantially inward portions 07226 that reduce the circumferential dimension of the slot opening and thereby enhance the security with which the stator windings (not shown) are retained within the slots.

Figure 8:
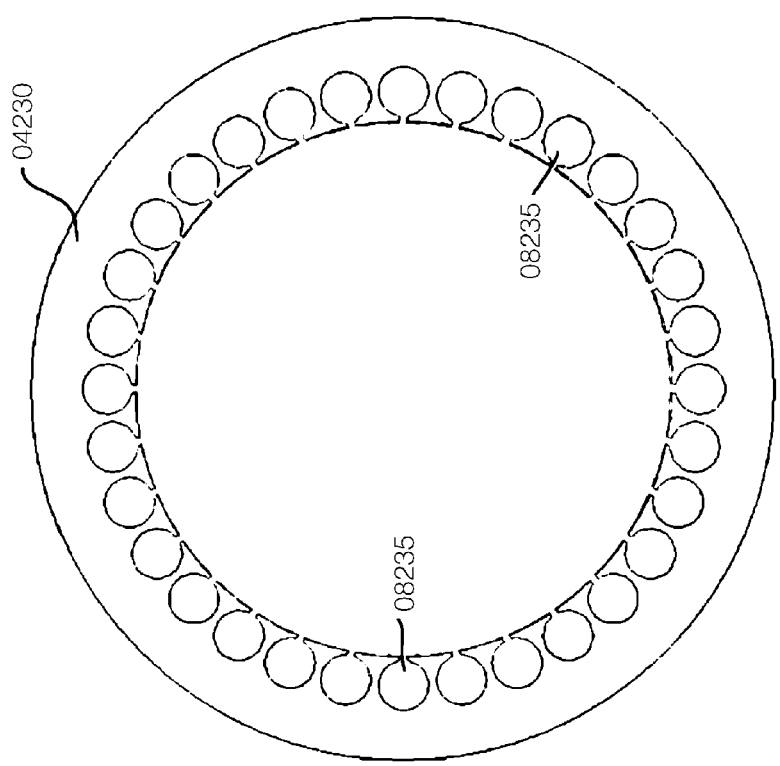
FIG. 8 is a simplified schematic cross-sectional representation of a rotor of the outer rotor induction motor embodiment of the present invention having thirty-two substantially round-shaped slots.

FIG. 8 is a simplified schematic cross-sectional representation of rotor 04230 of the outer rotor induction motor embodiment of the present invention having thirty-two substantially round-shaped slots 08235.

Figure 9:
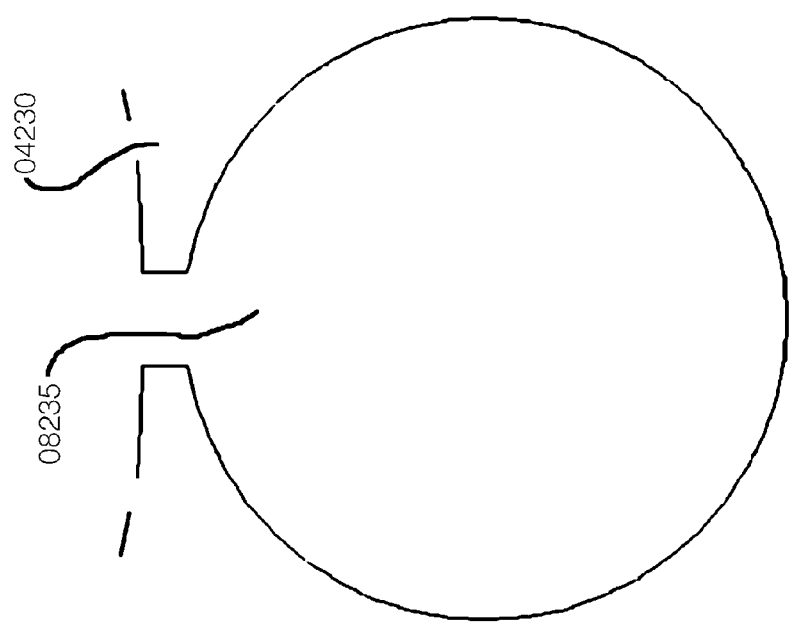
FIG. 9 is an enlargement of a portion of the simplified schematic cross-sectional representation of the rotor embodiment of FIG. 8 showing one of the thirty-two substantially round-shaped slots in greater detail.

FIG. 9 is an enlargement of a portion of the rotor embodiment of FIG. 8 showing one of the thirty-two substantially round-shaped slots in greater detail.

The rotor comprises 32 round shaped slots, as shown in FIGS. 8 and 9. The use of 32 bars ensures that there are no dangerous parasitic synchronous locking torques. The lowest common harmonic orders of the magneto-motive force between the stator with 24 magnetic teeth, as described above, and the rotor with 32 magnetic teeth, when there are two magnetic poles, is 95 and 97. This will create a minor torque dip at zero rotational speed. Hence, the outer rotor of the present application does not need to be skewed to eliminate the parasitic synchronous torques. Simple cross-sectional shapes, such as circular or square, for the bars will be adequate.

Figure 10:
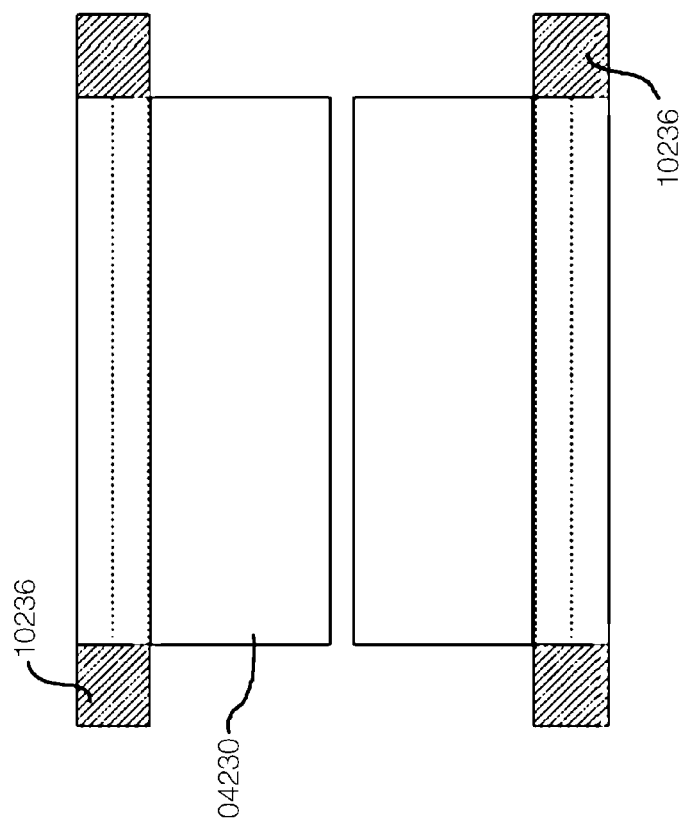
FIG. 10 is a simplified schematic cross-sectional representation of rotor bars that are inserted through the substantially round-shaped slots of the rotor arrangement of FIGS. 7 and 8 and are fixed within an end-ring without requiring die-casting.

FIG. 10 shows conductive rotor bars 10236, which in some embodiments of the invention are made of aluminum, and are, in this embodiment, inserted directly in the rotor slots 08235, as herein illustrated. Short-circuit elements short circuit respective ends of the rotor conductors.

Figure 11:
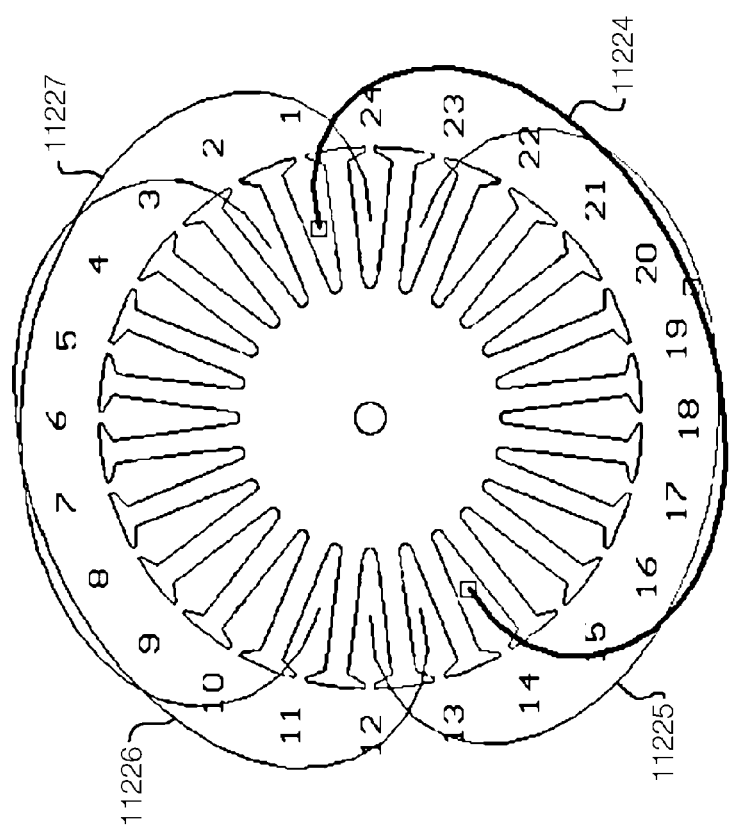
FIG. 11 is a simplified schematic representation of a winding distribution useful in the practice of the present invention.

FIG. 11 is a simplified schematic representation of a winding distribution useful in the practice of the present invention. The 2-pole winding can be inserted automatically in a one layer distribution as shown in this figure. By way of example, in this specific illustrative embodiment of the invention winding a wire portion 11224 loops between slots numbered 1 and 14. Similarly, wire portion 11225 loops between slots numbered 23 and 12, wire portion 11226 loops between slots numbered 13 and 2, and wire portion 11227 loops between slots numbered 11 and 24.

Figure 12:
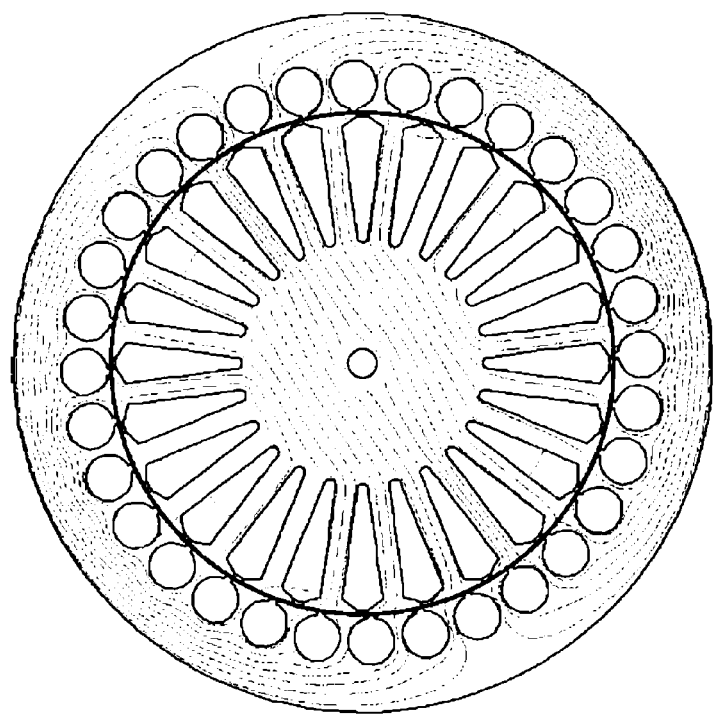
FIG. 12 is a simplified magnetic flux diagram of an induction motor that illustrates the tight linkage between the stator and rotor under load conditions that is achieved by a specific illustrative embodiment of the invention.

FIG. 12 is a simplified flux diagram that illustrates the tight linkage between the stator and rotor under load conditions that is achieved by a specific illustrative embodiment of the invention. This figure illustrates the tight linkage between the stator and rotor under load conditions. It is seen from this figure that the highest flux-density occurs in the rotor back iron.

Since the rotor is located outside of the stator, the rotor diameter at the area facing the stator is larger than for an inner rotor configuration. The torque of a motor is proportional to the volume in the motor air-gap ($L*\pi*D^2/4$) where L is the active stack length and D is the rotor diameter. Because the diameter D is larger than that of an internal rotor induction motor, a reduced value for the stack length L is achievable for a given torque. An illustrative embodiment of the outer rotor induction motor of the present invention has a ratio D/L of 0.7. By comparison with the inner rotor induction motor configuration, the outer rotor solution has a higher (torque): (total volume) ratio.

The main loss component in a motor is the stator winding copper loss. The primary way of dissipating heat from the stator to the ambient environment in a conventional motorized drum having a closed thermal system is by means of conducting the motor heat to oil that in turn conducts the motor heat to the drum shell. The heat in the drum shell can then be conducted to the conveyor belt, if one exists, or convected to the ambient air, if no belt is present.

Figure 18:
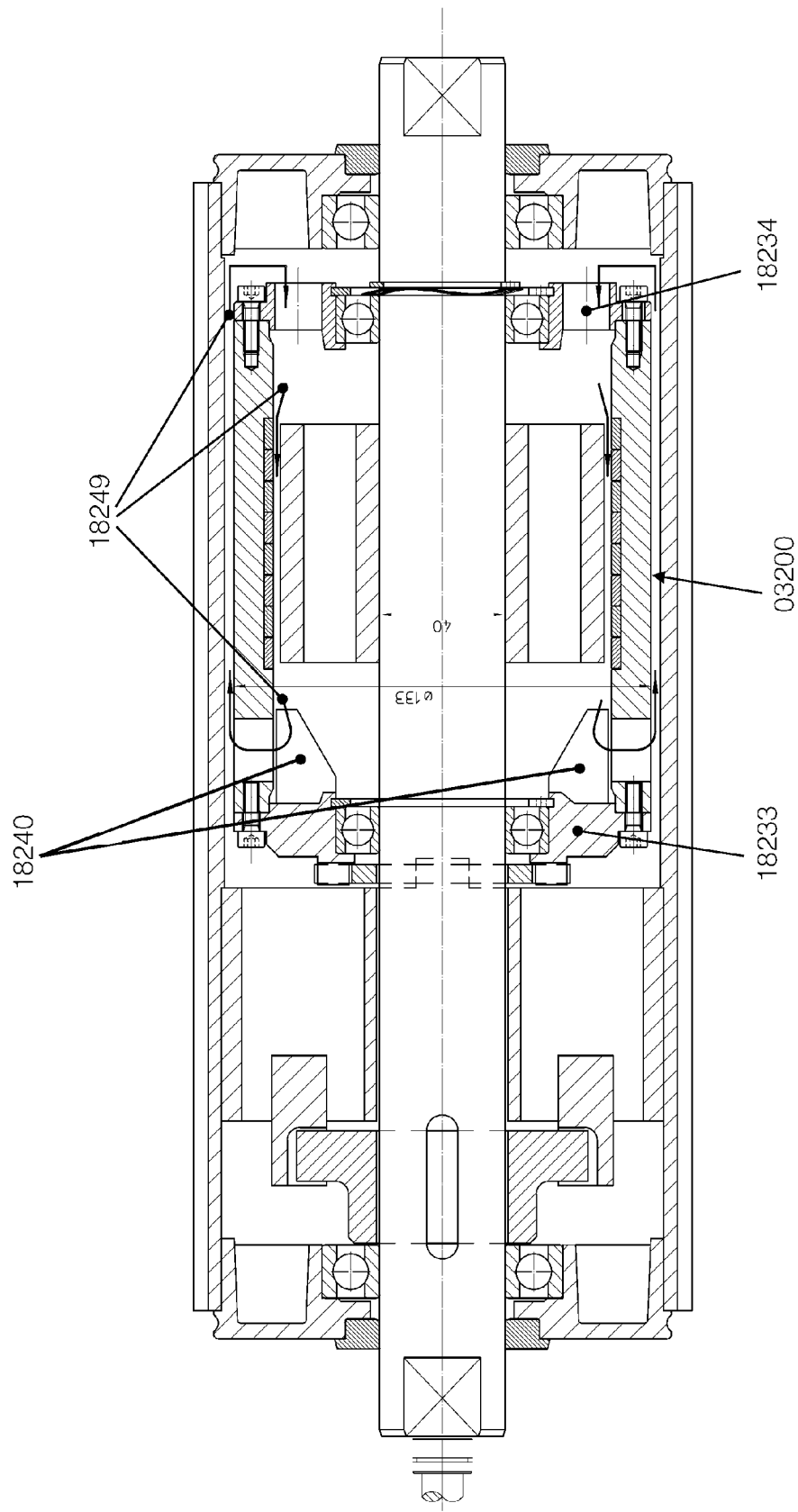
FIG. 18 is a simplified schematic representation of an axial cross-section through an external rotor with a drum shell that is particularly suited for use in a motorized drum, and this is useful to describe the flow of cooling gas in a single centrifugal impeller embodiment of the invention.

However, it is a significant feature of the present invention that oil is not used. Instead, a gas flow loop 18249 (see, FIG. 18), which in some embodiments is an air flow loop, is generated by use of a one or more axial air impellers having, for example, rotary fins. In the embodiment of FIG. 18, a centrifugal rotary fin 18240 is attached to the primary rotor end lid 18233. This fan impeller fin, like the outer turning rotor, has a larger diameter than if it were attached to an inner turning rotor, and accordingly has greater effective gas flow. The gas flow loop has an axial toroidal flow path between the rotor and the stator and another toroidal axial flow path in the opposite direction between the rotor and the inner surface of the drum shell, which is substantially impermeable. The secondary rotor end lid 18234 is simply spoked to have minimal effect on the gas flow loop generated by centrifugal rotary fins 18240.

In other embodiments that are not herein shown, axial fin designs are embedded into the primary and secondary rotor end lids to generate the gas flow.

An outer turning rotor significantly reduces the likelihood of catastrophic motor failure that would result from deflection and misalignment inherent in conventional motorized drums. In the present invention, as shown in FIG. 3, fixed stator shaft 03210 of motor 03200 serves as the fixed central shaft 03210 of motorized drum 03000 mounted to drum shell 03700 by means of base unit bearings 03710 and 03711. In this construction, during operation, the only significantly deflecting part is fixed central shaft 03210. Stator 03220 is directly affixed to central shaft 03210 and outer turning rotor 03230 is affixed to the fixed central shaft by rotor bearing 03231 in the primary rotor end lid 03233 and by rotor bearing 03232 in secondary rotor end lid 03234. Therefore, stator 03220 and outer turning rotor 03230 move in tandem as the fixed central shaft 03210 deflects.

Figure 13B:
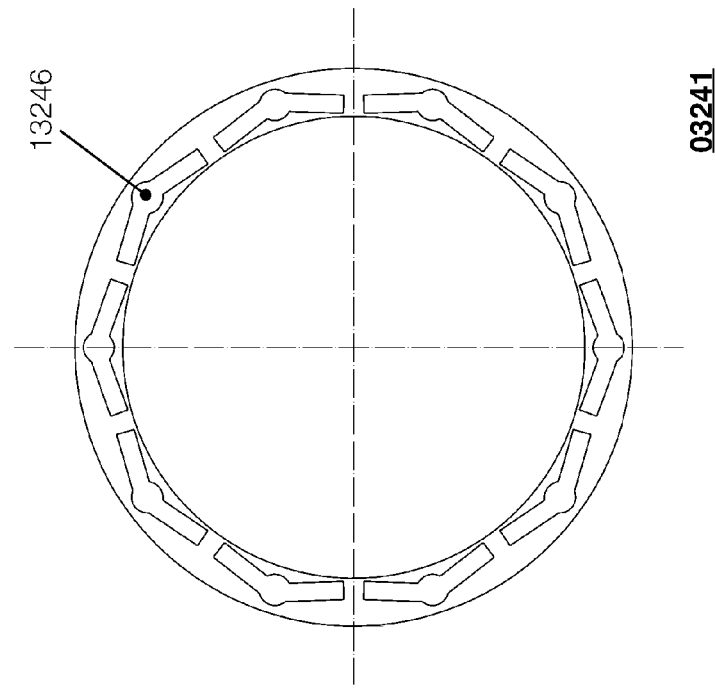
FIG. 13(b) is a cross-sectional representation of the outer turning rotor lamination showing the bolt holes in the center of each magnet polarity pair.
Figure 13A:
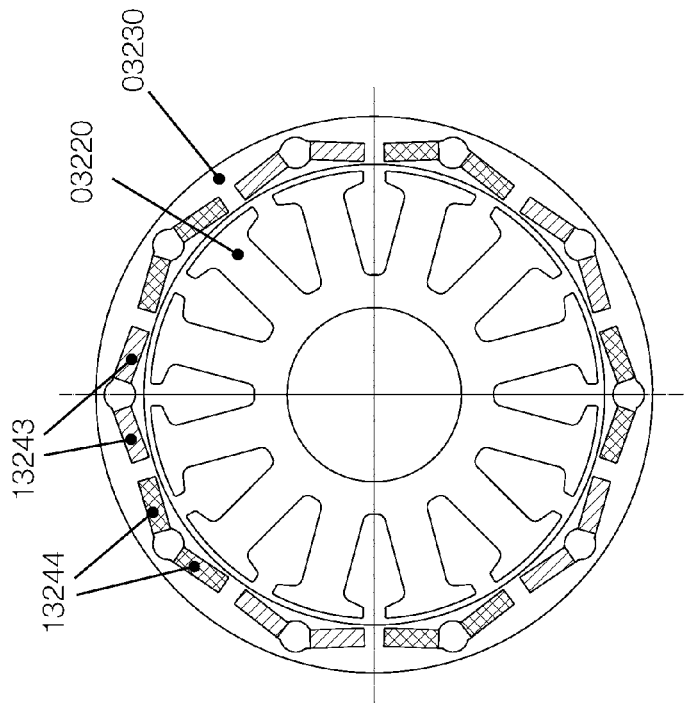
FIG. 13(a) is a simplified schematic cross-sectional representation of a permanent magnet motor utilizing an outer turning rotor with magnets embedded within the rotor laminations.

FIGS. 13-17 relate to an embodiment of the present invention wherein the outer turning rotor is of a permanent magnet motor. FIG. 13 is a cross-sectional representation of the outer turning permanent magnet motor 03200. In this illustrative embodiment, magnets are embedded in magnet receiving slots between inner and outer circumferential peripheral surfaces of a ferromagnetic rotor element, such as a rotor 03230, in polarity pairs of north magnets 13244 and south magnets 13243. The rotor rotates around stator 03220. The magnets are arranged so that every other magnet has an opposite polarity, thus forming an alternating pattern of north paired magnets 13244 and south paired magnets 13243. The magnets shown are rectangular with a magnet face intermediate of two corners. Further, the magnet pairs are arranged so that the adjacent polarity corners are radially outward of the distal same-polarity corners. In this fashion, the magnetic flux is focused by the angled pairs of magnets and therefore causes a feedback in the stator 03220 that is sensed by the controlling power electronics (not shown) to determine the position of rotor 03230 relative to stator 03220. One advantage of this design is that no additional physical encoders or sensors are required to be inserted into motorized drum 03000 for the controlling power electronics to drive motor 03200 properly.

Further, in this illustrative embodiment, rotor 03230 does not utilize a housing. Instead, rotor lamination 03241, shown in FIG. 13*b*, utilizes a circumferential gap or hole 13246 between the same polarity magnet pairs through which the lamination stack is fastened between both rotor end lids by means of rotor lamination clamp bolt 03242 (FIG. 3). This design minimizes the overall diameter of motor 03200, enabling achievement of greater torque density.

Figure 14B:
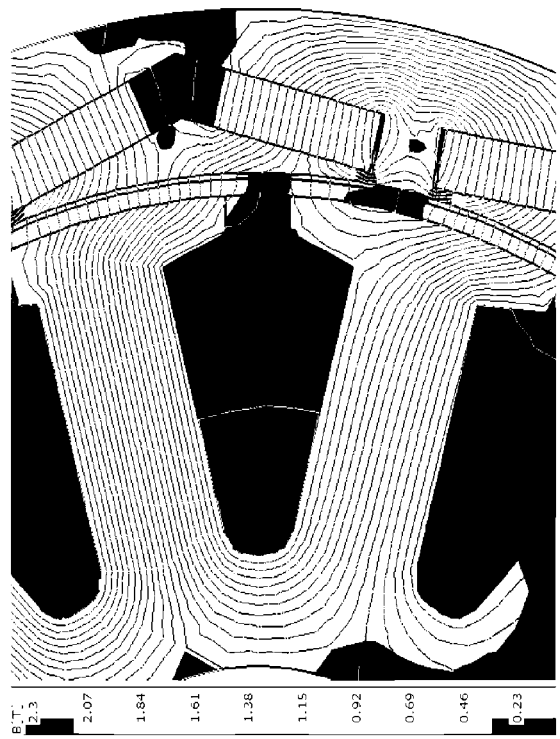
FIG. 14(a) is a simplified magnetic flux diagram of a interior permanent magnet synchronous motor, utilizing an outer turning rotor. 14(b) is an enlarged view of the magnetic flux at the point where north south magnets are in close proximity.
Figure 14A:
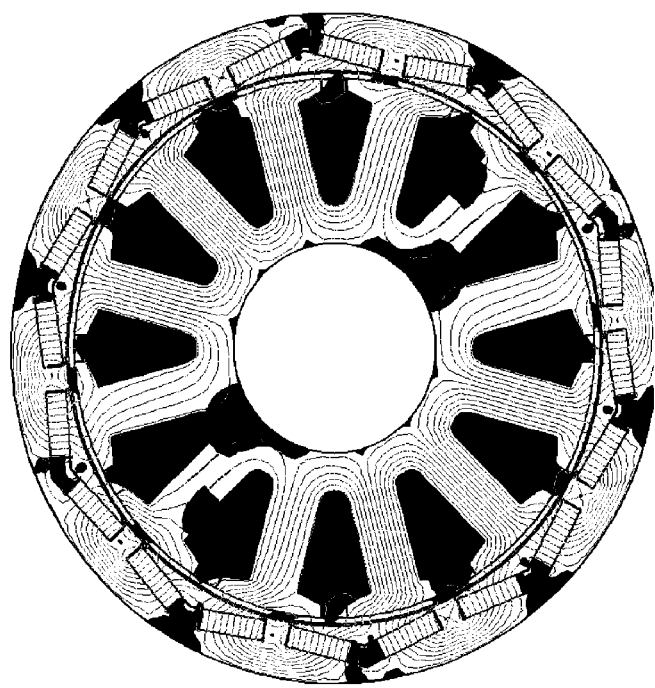

FIGS. 14*a* and 14*b* further illustrate the magnetic flux circuit through the rotor laminations pattern that is created with this illustrative embodiment.

Figure 15:
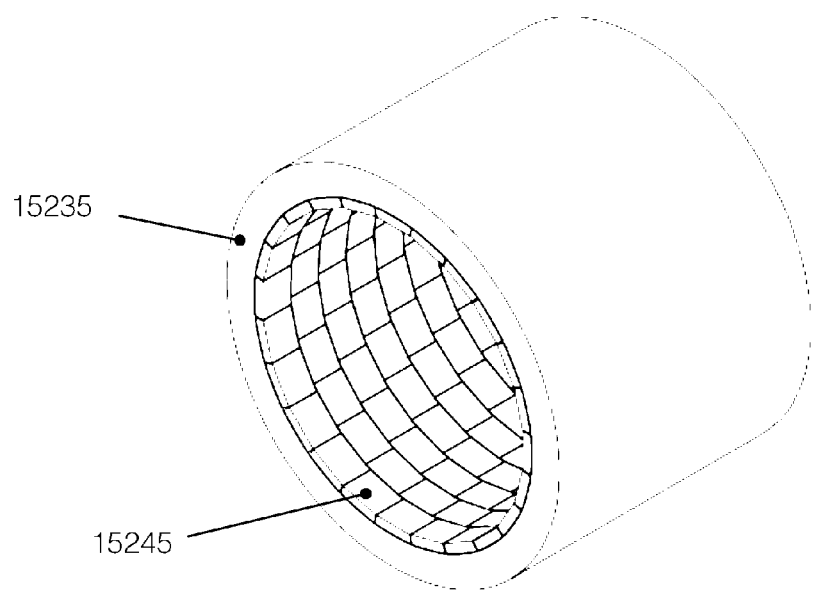
FIG. 15. is a simplified schematic isometric representation of a permanent magnet rotor system having a permanent magnet rotor housing in which a plurality of permanent magnet elements are arranged in a spiral configuration.
Figure 16:
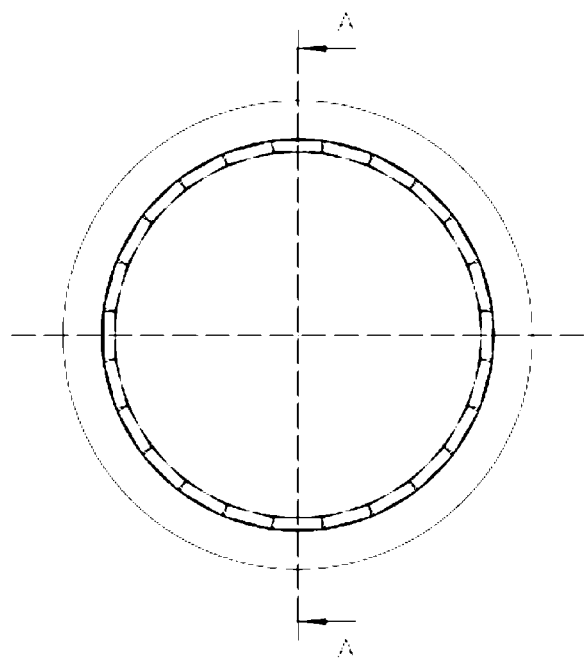
FIG. 16 is a simplified schematic end plan representation of the permanent magnet rotor housing embodiment of FIG. 15.
Figure 17:
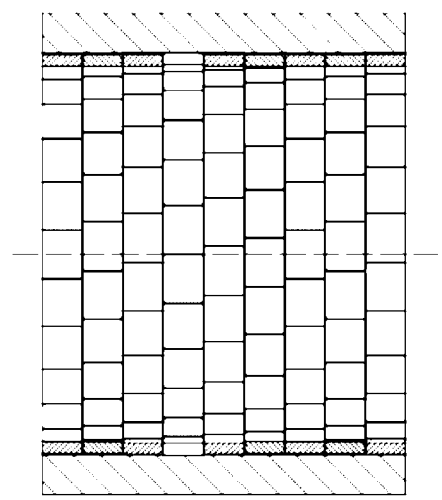
FIG. 17 is a simplified schematic representation of section A-A of the permanent magnet rotor housing embodiment of FIG. 16.

FIGS. 15, 16, and 17 illustrate another embodiment of the permanent magnet motor. In this embodiment, the magnets are not embedded into the outer turning rotor, but rather the magnets 15245 are surface mounted to the interior periphery (not specifically designated) of the rotor housing. In this embodiment, the magnets are configured in a spiral, which reduces cogging torque. However, in other embodiments, the spiral, or helical, configuration is not required and the magnets are surface mounted axially along the inner periphery of the rotor housing, with an adhesive, for example.

Figure 19:
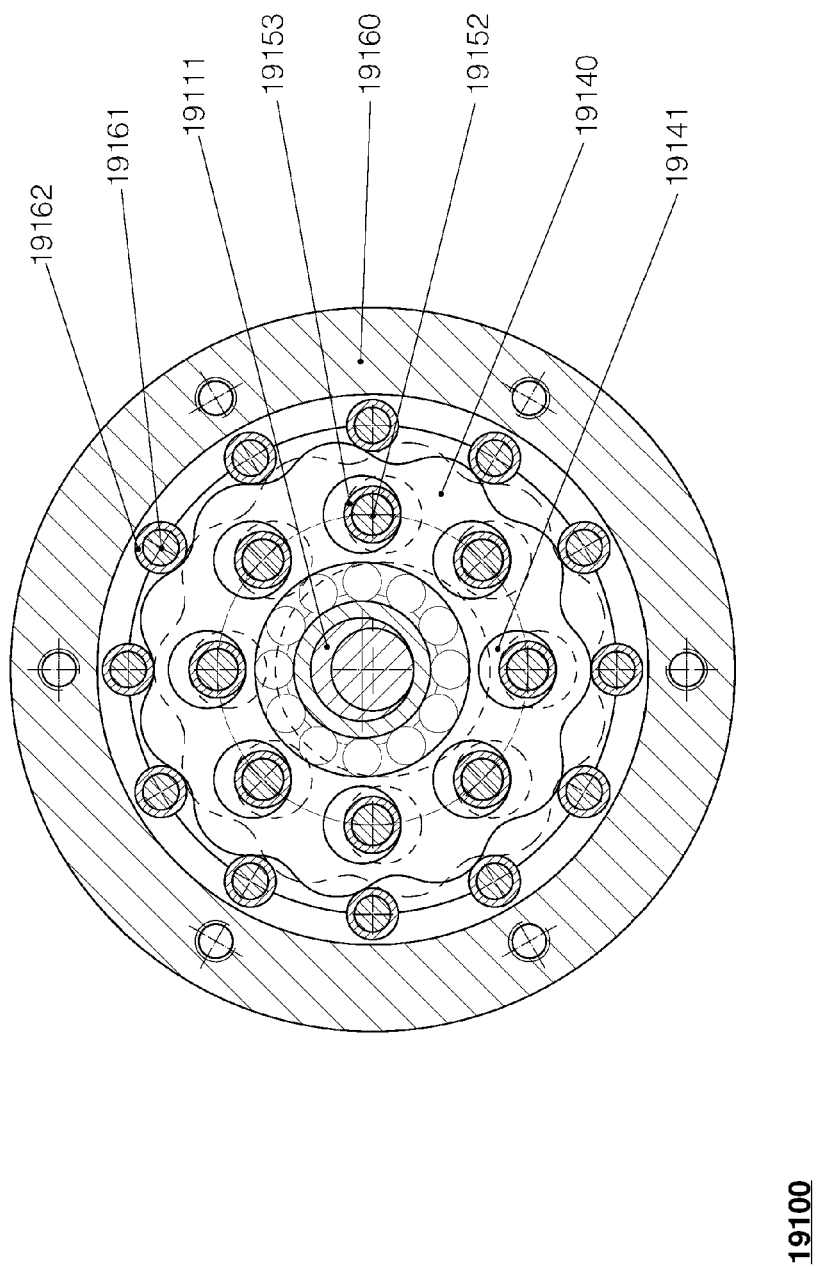
FIG. 19 is a cross-section through a conventional cycloidal speed reducer, which is commonly mounted to a standard external motor.

FIG. 19 is a cross-section representation through a conventional cycloidal speed reducer 19100, which is commonly mounted to a standard external motor by bolting the face (not specifically designated) of the cycloidal reducer housing to the external motor (not shown in this figure). In this representation of prior art, cycloidal reducer housing 19160 functions as the fixed reference point of the reducer. Around the inner periphery of the cycloidal reducer housing 19160, ring pins 19161 are inset. In some low reduction ratios, the ring pins 19161 are encased by ring pin bushings 19162, which, in turn, function as the internal-toothed ring gear that engages the external toothed gear or cycloidal disk 19140. In other higher reduction ratios, not shown, the ring pins are inset in the housing without bushings and engage the cycloidal disk directly.

Eccentric input shaft 19111 rotates and urges the cycloidal disk 19140 to oscillate about the ring pin bushings 19162 of the internal-toothed ring gear. In FIG. 19, there are twelve ring pin bushings 19162, or internal gear teeth, about the inner circumference of the cycloidal reducer housing 19160 and there are eleven lobes, or external gear teeth, about the outer circumference of the cycloidal disk 19140. Each full revolution of the eccentric input shaft 19111 causes the lobes of the cycloidal disk 19140 to engage each subsequent ring pin bushing 19162. Therefore, in this illustrative embodiment, because the cycloidal disk 19140 has eleven lobes and there are twelve ring pin bushings 19162, the cycloidal disk 19140 has engaged only eleven of the twelve ring pin bushings 19162, effectively causing the cycloidal disk 19140 to rotate backward one ring pin bushing. Generally, a cycloidal disk has n external teeth engaging at least n+1 internal teeth in the ring gear. As the cycloidal disk 19140 rotates, apertures 19141 in the cycloidal disk 19140 engage guide pins 19152 and guide pin bushings 19153, causing the guide pins 19152 and bushings 19153 to rotate with the cycloidal disk 19140. These guide pins 19152 and bushings 19153 are affixed to a guide pin support ring (not shown), which functions as the output of the reducer.

This concept is clearly employed in the conventional drum motor of FIG. 2, where the face of cycloidal reducer housing 19160 (labeled 2020 in FIG. 2) is bolted to a conventional motor. An output shaft 2030 of FIG. 2 is rigidly connected internally to the guide pins 19152 and guide pin bushings 19153 of FIG. 19.

Figure 20:
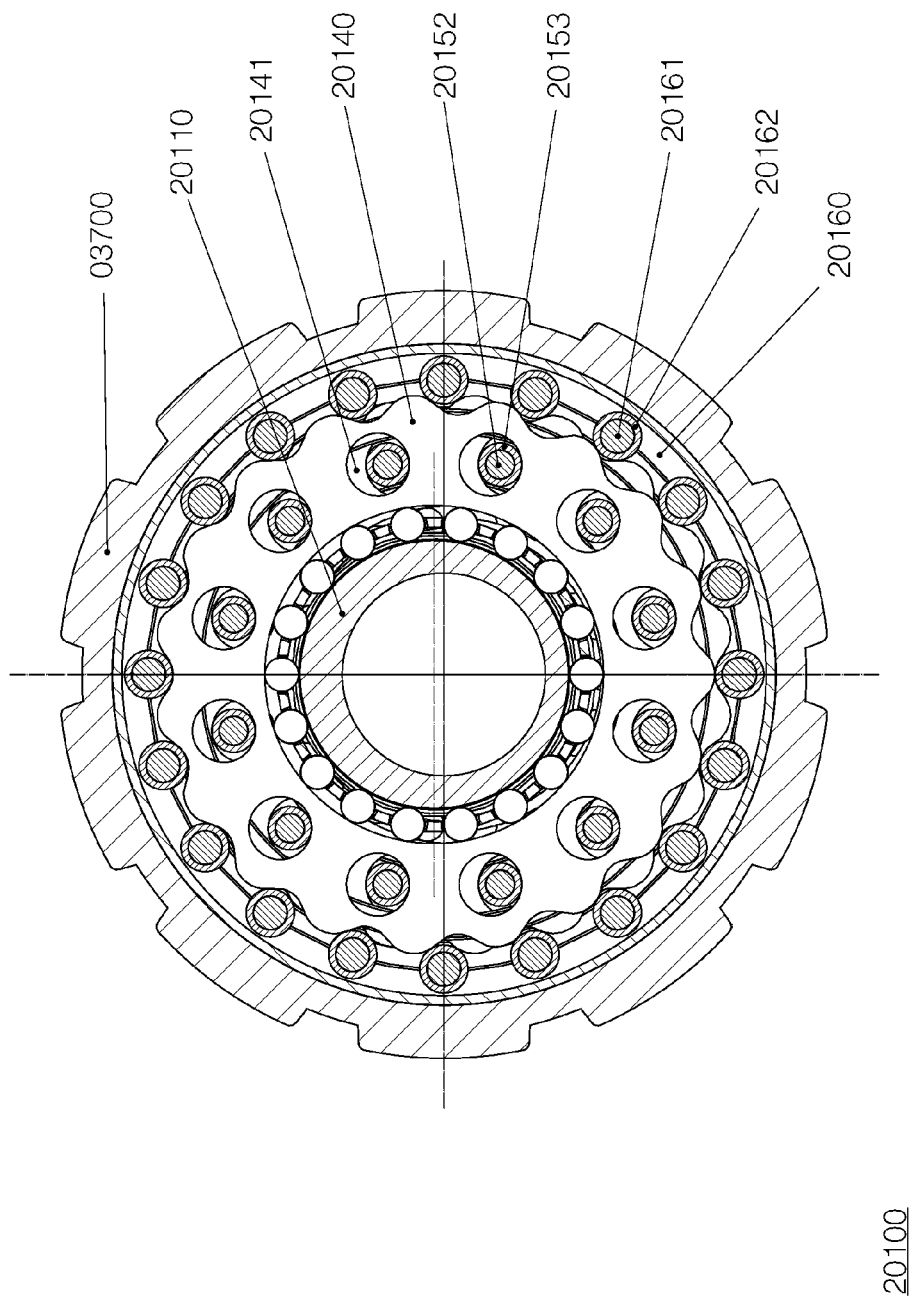
FIG. 20 is a cross-section through a cycloidal speed reducer of the present invention, which is mounted within a motorized drum.

FIG. 20 is a cross-section through a cycloidal speed reducer of the present invention 20100, which is mounted within a motorized drum (not shown in this figure). Unlike the prior art where the face of the cycloidal reducer housing is bolted to the motor, in this illustrative embodiment, cycloidal reducer housing 20160, which is the internal ring gear, is mounted directly to the inner periphery of the drum shell 03700. Therefore, cycloidal reducer housing 20160 does not serve as the fixed reference point of the reducer, but instead serves as the output of the reducer, rotating synchronously with the drum shell 03700.

In the embodiment of FIG. 20, there are shown twenty ring pins 20161 and twenty ring pin bushings 20162 about the inner circumference of the cycloidal housing 20160, which function as the inner ring gear. There are nineteen lobes about the outer circumference of the cycloidal disk 20140. In this embodiment, the guide pins 20152 and guide pin bushings 20153 are affixed to a guide pin support ring 03150, also referred to as a guide pin housing, (not shown in FIG. 20) that is coupled to the central fixed shaft 03210 (not shown in FIG. 20) by means of a high torque coupler 03350 (not shown in FIG. 20) in order to function as the fixed reference point of the cycloidal reducer 20100. As the eccentric input shaft 20110 rotates, the apertures 20141 in the cycloidal disk 20140 engage guide pins 20152 and guide pin bushings 20153, the cycloidal disk oscillates around the guide pins 20152 and guide pin bushings 20153. This oscillation movement of cycloidal disk 20140 engages each subsequent ring pin bushing 20162. Since there are more ring pin bushings 20162 than lobes on the cycloidal disk 20140, the internal ring gear of the cycloidal housing 20160 is advanced one ring pin bushing 20153 for every full rotation of the eccentric input shaft 20110. Thus the internal ring gear rotates at a reduced rate relative top the input shaft.

In the preferred illustrative embodiment of FIG. 20, eccentric input shaft 20110 of the cycloidal reducer 20100 is tubular with a hollow bore, thereby enabling the stator winding leads 03223 (not shown in FIG. 20) and the central shaft 03210 (not shown in FIG. 20) of the motorized drum 03000 (not shown in FIG. 20) to pass through the center of the cycloidal reducer 20100. FIG. 3 of the same preferred embodiment shows the stator winding leads 03223 and the central shaft 03210 passing through the hollow bore eccentric input shaft 03110 of the cycloidal reducer 03100. An advantage of this design is that the cycloidal reducer 03100 is mounted to the drum shell 03700, which is the most rigid element of the motorized drum 03000. There is sufficient clearance between the hollow bore input shaft 20110 and the central shaft 03210 so that when the central shaft deflects, it has no impact upon the cycloidal reducer 03100 because it has no contact with the hollow bore eccentric input shaft 20110.

A further advantage of the preferred embodiment of FIGS. 3 and 20 is that the heat generated from the rolling action of the cycloidal reducer elements is conducted immediately to the drum shell 03700 by means of the direct contact of the cycloidal reducer housing 20160, 03160 to the drum shell 03700.

By engaging the cycloidal housing 20160 directly to the drum shell 03700, a larger cycloidal reducer 20100 can be used within a given drum shell diameter, thus enabling a greater torque density of the motorized drum 03000 for a given axial length. As cycloidal reducers are inherently axially compact, the torque density is maximized for both the axial length and available internal diameter of the drum shell.

In some embodiments where high speed reductions are required, another embodiment of a high torque reducer is harmonic speed reducer 21800 shown in FIG. 21. FIG. 21 is a simplified schematic representation of a motorized drum 21000 that utilizes a harmonic speed reducer 21800 with a hollow bore input, wherein the major axis of wave generator 21810 is in the horizontal position. Harmonic speed reducer 21800 operates using the same basic principles as a cycloidal reducer, in that the rigid circular spline 21830 has more teeth than the flexible spline member 21820 being driven by the wave generator 21810. Every revolution of the wave generator 21810 effectively causes the rigid circular spline 21830 to advance by the amount of teeth that exceed the number of teeth of the flexible spline member 21820.

In this embodiment, rigid circular spline 21830 is mounted directly to drum shell 03700 and functions as the output of harmonic speed reducer 21800. Flexible spline 21820 is affixed to the central shaft by means of an affixing pin 21831 and functions as the fixed reference point of the harmonic speed reducer 21800. Wave generator 21810, which is the input of harmonic speed reducer 21800, is hollow so as to allow stator lead wires 03223 and central shaft 03210 to pass through the center of harmonic speed reducer 21800.

FIG. 22 is shows the same harmonic speed reducer of FIG. 21, wherein the major axis of the wave generator is in the vertical position.

Figure 24:
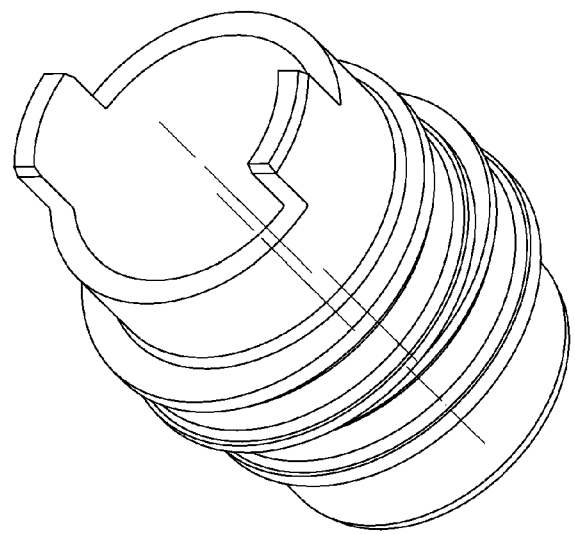
FIG. 24 is another simplified isometric representation of the hollow bore input of the cycloidal reducer of the present invention, utilizing protruding tabs to receive motor input and utilizing integral eccentric raceways to engage input gears.
Figure 23:
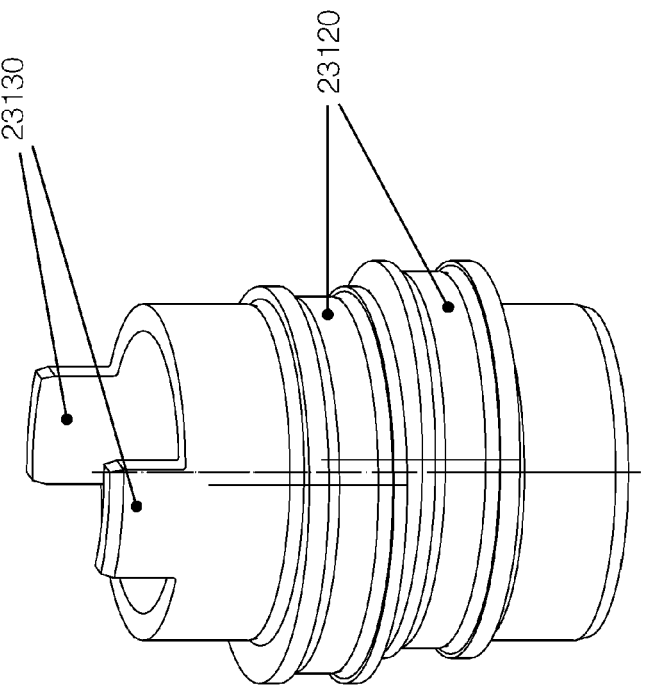
FIG. 23 is a simplified isometric representation of the hollow bore input of the cycloidal reducer of the present invention, utilizing protruding tabs to receive motor input and utilizing integral eccentric raceways to engage input gears.

FIGS. 23 and 24 are simplified isometric representations of the hollow bore input 03110 of the cycloidal reducer of the present invention. It is of a substantially tubular configuration utilizing protuberances referred to as protruding tabs 23130 to receive the motor input and utilizing integral eccentric raceways 23120 to engage the cycloidal disk input gears (not shown). In this illustrative embodiment, the input shaft of the cycloidal reducer is hollow, enabling the central shaft and stator winding leads to pass through the center of the cycloidal reducer.

Figure 25:
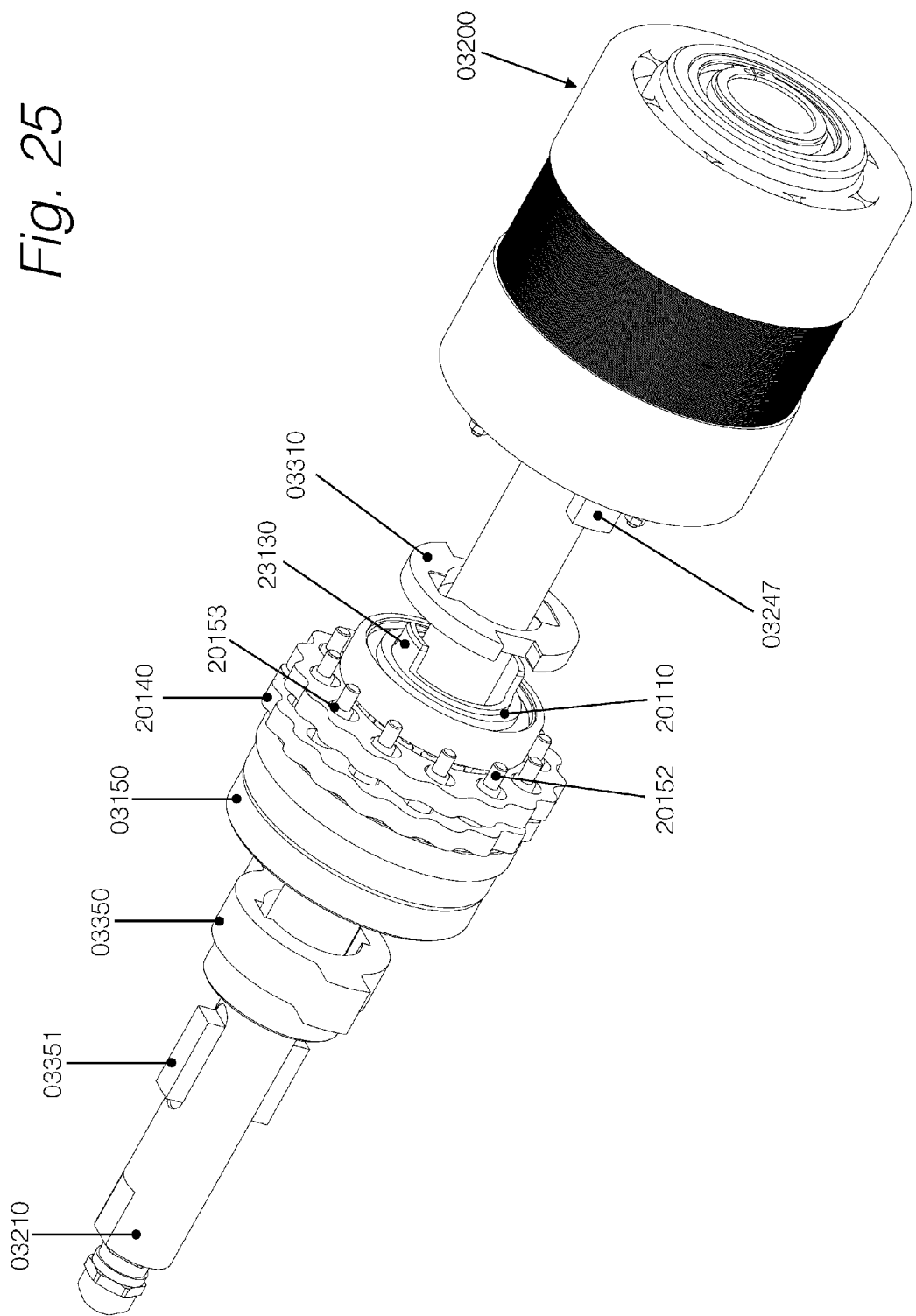
FIG. 25 a simplified partially exploded isometric schematic representation of the coupling between the outer rotor of an electric motor, a cycloidal speed reducer, and a central shaft of an embodiment of the invention.

FIG. 25 is a simplified partially exploded isometric schematic representation that is useful to illustrate the power transmission coupling arrangement between the outer rotor of an electric motor, a cycloidal speed reducer, and a central shaft of an embodiment of the invention. This figure demonstrates how the present invention accommodates the misalignment and deflection inherent in all motorized drums in an axially compact manner.

Central shaft 03210 of the motor 03200 extends throughout motorized drum 03000 (not specifically designated in this figure), specifically extending through the center of the hollow bore eccentric input shaft 20110 of the cycloidal reducer. In this preferred illustrative embodiment, the angular and concentric misalignments between motor 03200 and eccentric input shaft 20110 of cycloidal reducer caused by the deflection of central shaft 03210, are accommodated by a high speed coupler 03310.

The protruding rotor tabs 03247 engage the slots on the outer circumference of the axially narrow high speed coupler 03310. Additionally, protruding tabs 23130 of hollow bore eccentric input shaft 20110 of the cycloidal reducer engage slots in the inner circumference of high speed coupler 03310. Proper clearance between the outer slots of the high speed coupler 03310 and rotor tabs 03247, and proper clearance between the inner slots of high speed coupler 03310 and hollow bore eccentric input shaft tabs 23130, as well as proper clearance between the outer diameter of central shaft 03210 and the inner diameter of high speed coupler 03310, enable the coupler to angle and slide across the various driving faces.

Guide pins 20152 and guide pin bushings 20153 around which cycloidal disks 20140 oscillate are affixed to primary guide pin support ring 03150. Primary guide pin support ring 03150 has internal slots on the axial side of the primary guide support ring opposite motor 03200. These internal slots receive the protruding tabs of high torque coupler 03350. High torque coupler 03350 has keyways on the inner circumference and is affixed to the central shaft by shaft keys 03351. In this way, the fixed reference point of the cycloidal reducer is effectively connected to central shaft 03210.

Figure 26:
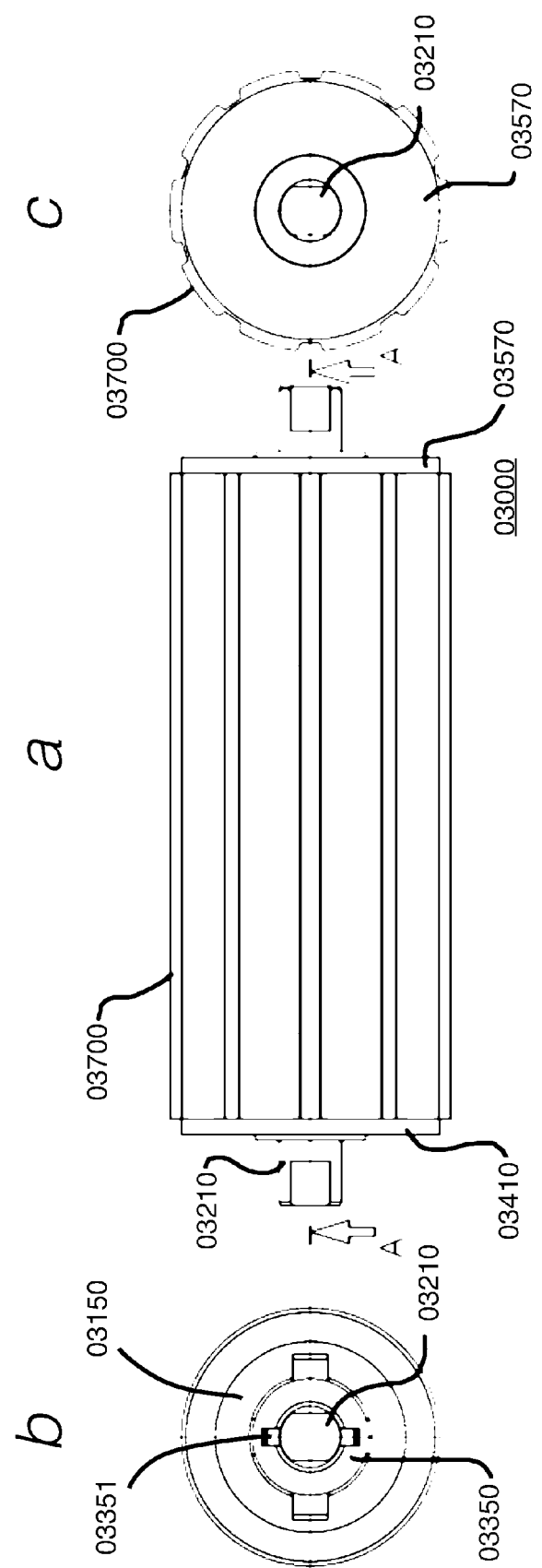
FIG. 26(a) is a simplified schematic representation of a side plan view of a motorized drum constructed in accordance with the invention.
FIG. 26(b) is a plan cross-sectional representation of a shaft coupler.
FIG. 26(c) is an end view of the motorized drum.

FIG. 26a is a simplified schematic representation of motorized drum 03000, having a coupler arrangement (not shown in this figure) constructed in accordance with the invention. FIG. 26b is a plan cross-sectional representation of a shaft coupler 03350, and FIG. 26c is an end view of motorized drum 03000. These figures show motorized drum 03000 to have a drum shell 03700 arranged to be rotatable about the central motor shaft 03210. The drum shell is sealed on the left-hand side of FIG. 26a to central motor shaft 03210 by an end lid 03410.

Figure 27:
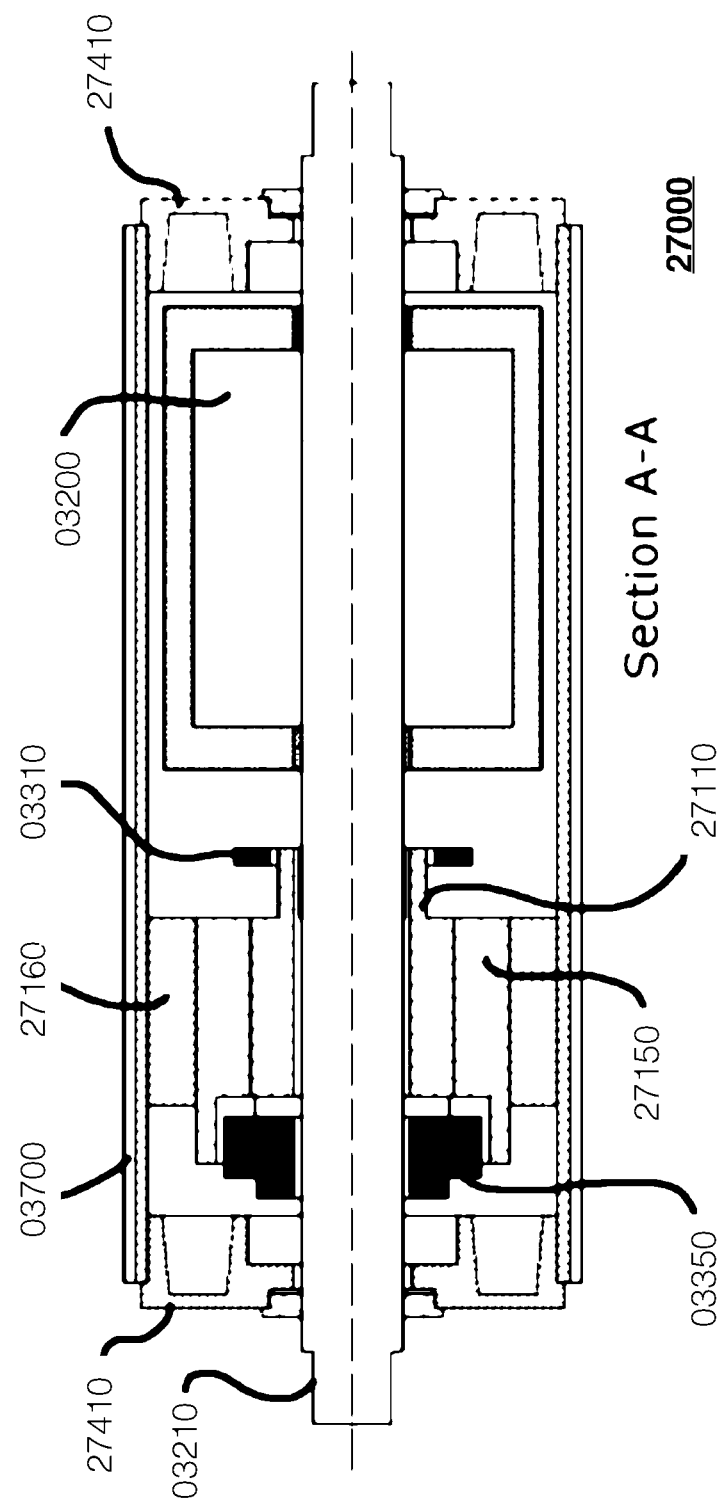
FIG. 27 is a simplified schematic partially cross-sectional side plan representation of the embodiment of FIGS. 26(a), 26(b), and 26(c) taken along section A-A of FIG. 26(a) and showing the coupling between the elements of the structure there within.

FIG. 27 is a simplified cross-sectional representation of the embodiment of FIG. 25 taken along section A-A of FIG. 25a and showing the coupling between the motor, the reducer and the shaft. As shown in this figure, an electric motor 03200 is coupled by means of high speed coupler 03310 noted above that is coupled to the cycloidal reducer input 27110. In this specific illustrative embodiment of the invention, the cycloidal reducer fixed reference 27150 is connected to central motor shaft 03210 by high torque coupler 03350. Drum shell 03700 is urged into rotation by virtue of its connection to the cyclo drive output 27160. High torque coupler 03350 prevents rotatory motion of cycloidal reducer fixed reference 27150 relative to central motor shaft 03210, while simultaneously accommodating for misalignment of central shaft 03210 relative to the cycloidal reducer fixed reference 27150 when the central shaft 03210 is flexed under load. High speed coupler 03310 also accommodates for misalignment between motor 03200 and the cycloidal input 27110 that results from the flexing of central motor shaft 03210. In this cross-sectional representation, rotor tabs 03247 are not seen because one is outside the surface of the figure and the other is behind the central motor shaft.

Figure 28:
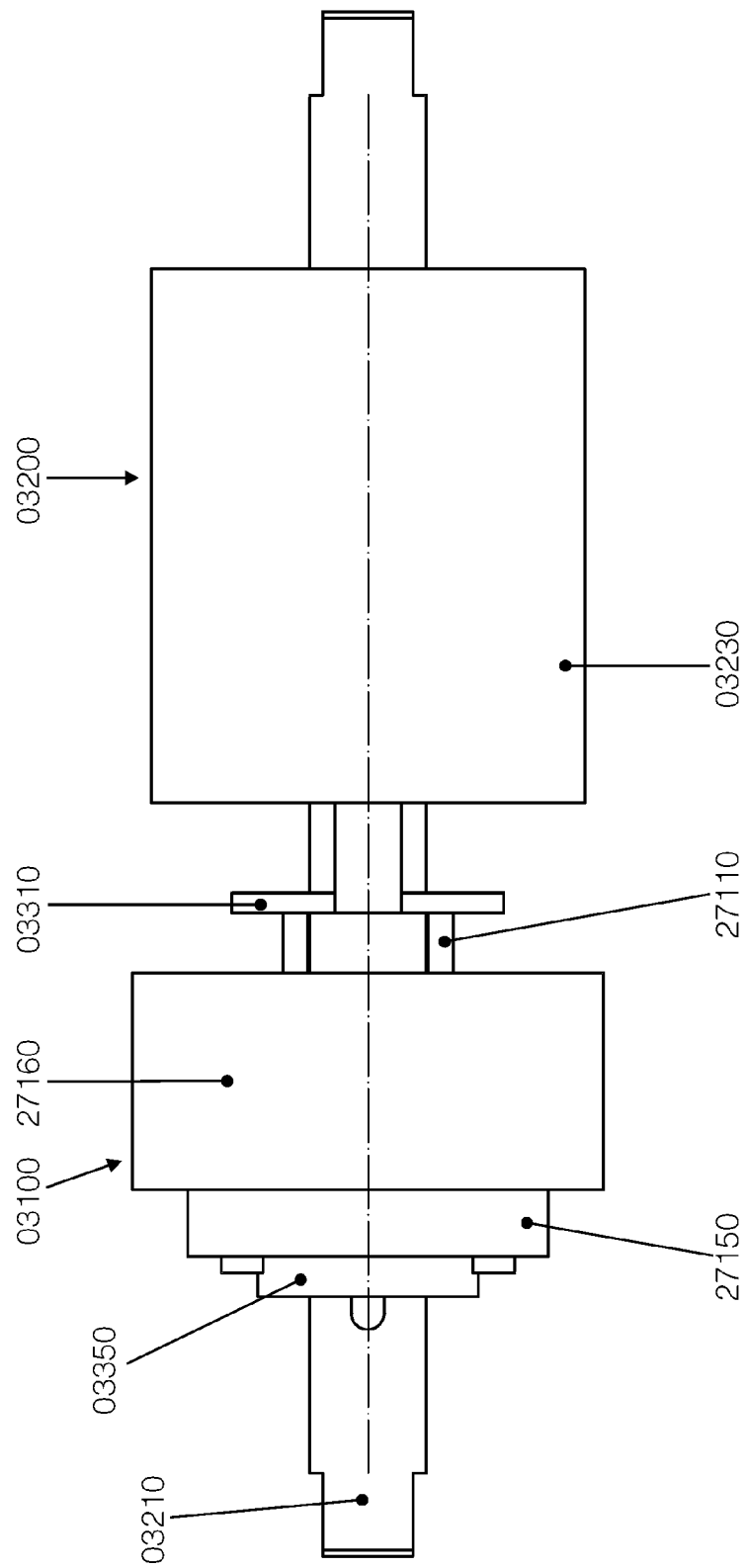
FIG. 28 is a simplified schematic representation of the coupling between the rotor of an electric motor, a cycloidal speed reducer, and a central shaft of an embodiment of the invention, wherein the high speed coupler has two slot pairs.

FIG. 28 is a simplified schematic representation of the coupling between rotor 03230 of electric motor 03200, cycloidal reducer 03100, and central shaft 03210 of an embodiment of the invention.

Figure 29:
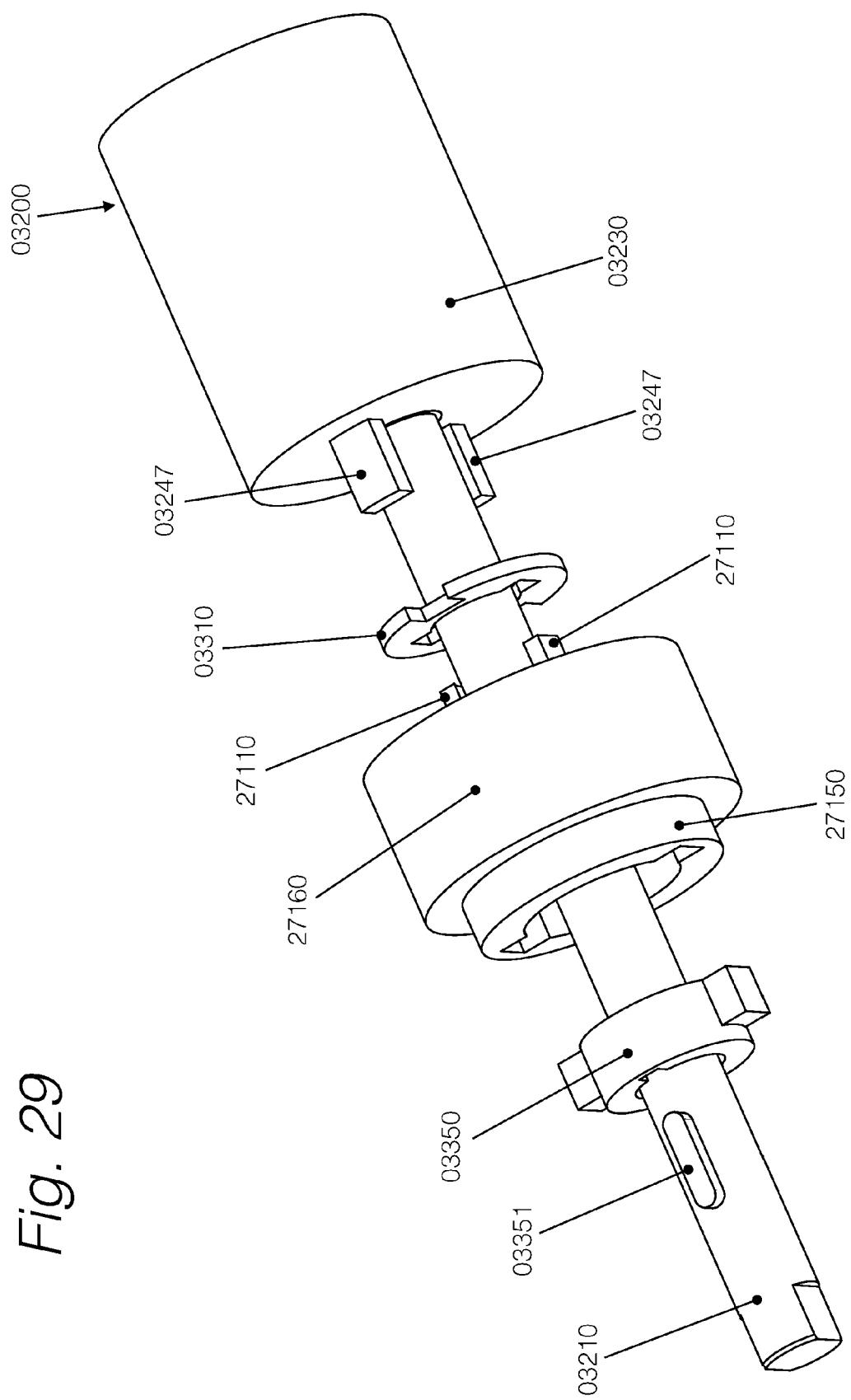
FIG. 29 is a simplified partially exploded isometric schematic representation of the coupling system between the rotor of an electric motor, a cycloidal speed reducer, and a central shaft of an embodiment of the invention, wherein the high speed coupler has two slot pairs.

FIG. 29 is a simplified partially exploded isometric representation of the coupling system between rotor 03230 of electric motor 03200, cycloidal reducer 03100, and central motor shaft 03210.

Figure 30:
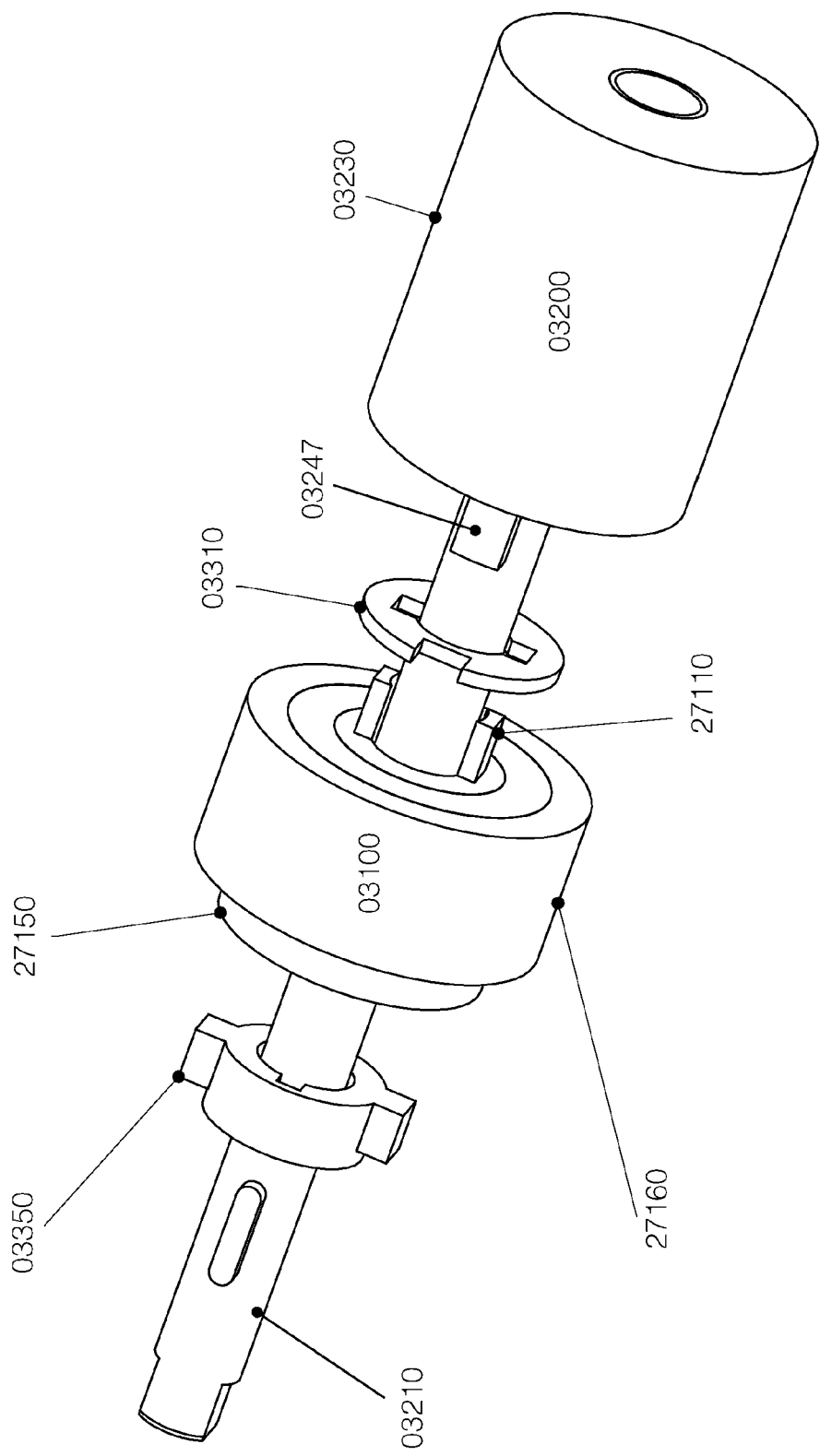
FIG. 30 is a further simplified partially exploded isometric schematic representation of the coupling system between the rotor of an electric motor, a cycloidal speed reducer, and a central shaft of an embodiment of the invention, wherein the high speed coupler has two slot pairs.

FIG. 30 is another simplified partially exploded isometric representation, viewed from a second angle, of the coupling system between rotor 03230 of electric motor 03200, cycloidal reducer 03100, and central motor shaft 03210. Elements of structure that have previously been discussed are similarly designated. As shown in these figures, the high speed coupler is configured to have two radially outward slots about the outer circumference to receive rotor tabs 03247 of motor 03230, and two radially inward slots about the inner circumference to receive the protruding tabs of cycloidal reducer input 27110. The slots or notches of the high speed coupler function as key ways and are arranged in substantially 90° displacement relative to each other.

Figure 35:
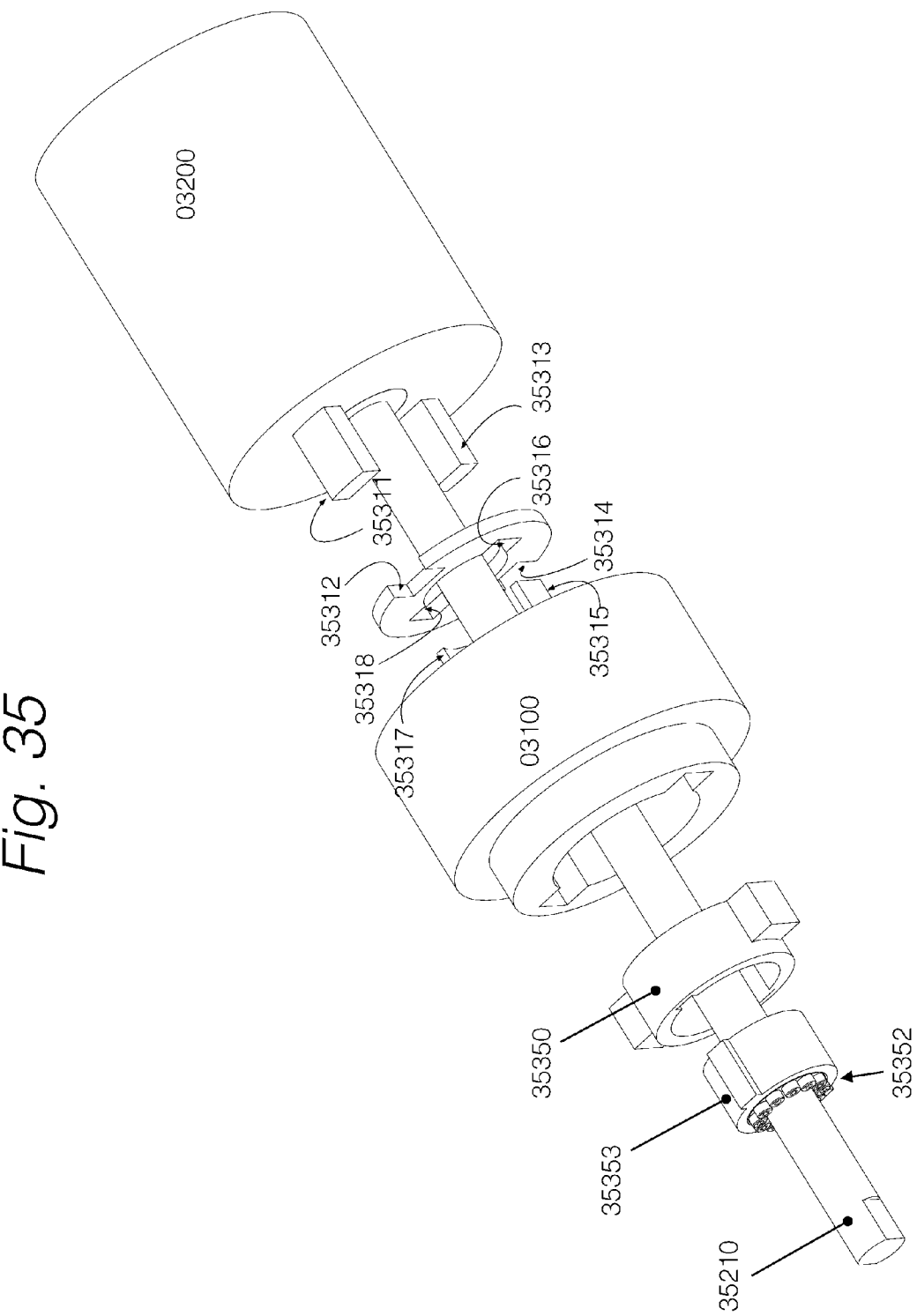
FIG. 35 is an alternate simplified partially exploded isometric schematic representation of the coupling system between the rotor of an electric motor, a cycloidal speed reducer, and a central shaft of an embodiment of the invention, wherein a keyless bushing engages the central shaft rather than keys directly inserted into the central shaft.

The high speed coupler has four active orthogonal driving faces at any point in time. In FIG. 35, which shows an illustrative embodiment, two of the active driving faces 35312, 35314 are parallel to each other and can be considered the first pair of the orthogonal driving faces; and the other two active driving faces 35316, 35318 are parallel to each other and can be considered the second pair of orthogonal driving faces. In this illustrative arrangement, the first pair of active drive faces is orthogonal to the second pair of active drive faces.

Two orthogonal driving faces 35312, 35314 actively receive torque from two respective orthogonal driving faces 35311, 35313 from the rotor tabs, which can be considered drive elements.

Two orthogonal driving faces 35318, 35316 transmit torque to two respective orthogonal driving faces 35317, 35315 of cycloidal reducer input 27110, which can be considered to have a pair of driven elements. Therefore, a total of eight orthogonal driving faces are constantly engaged during operation.

Figure 31:
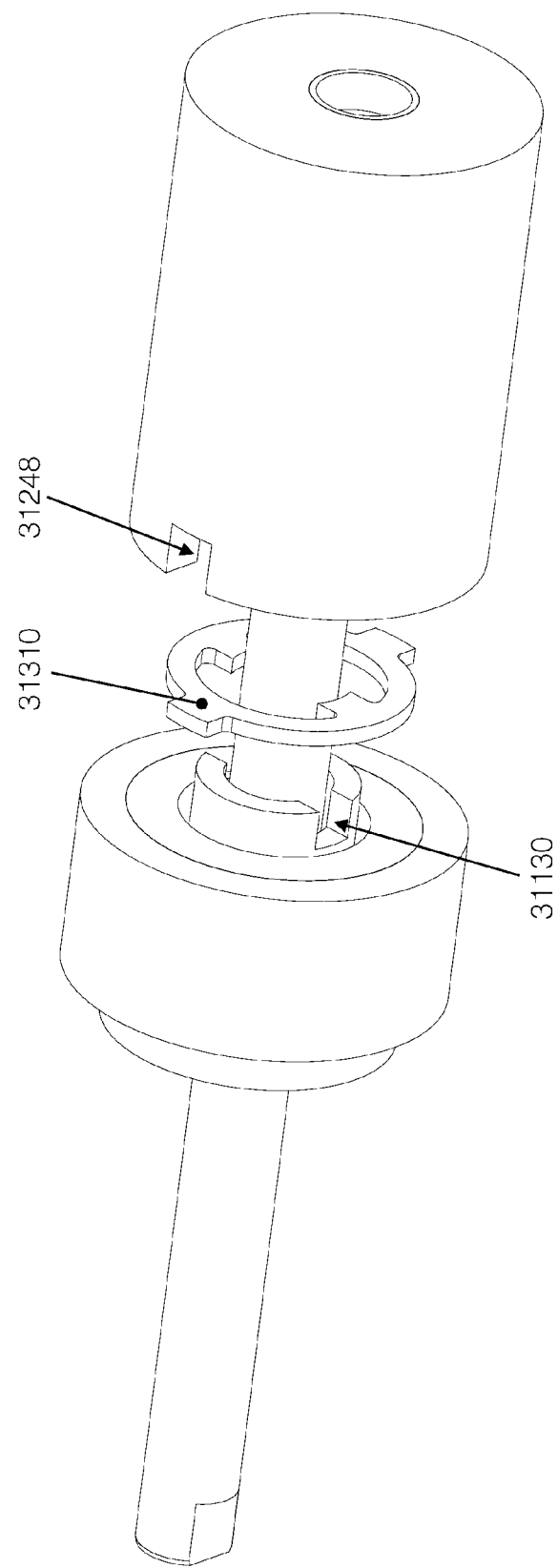
FIG. 31 is an alternate simplified partially exploded isometric schematic representation of the coupling system between the rotor of an electric motor, a cycloidal speed reducer, and a central shaft of an embodiment of the invention, wherein the high speed coupler has two tab pairs instead of slots.

A variety of orthogonal arrangements are possible. FIG. 31 is a simplified schematic isometric representation that shows a high speed coupler 31310 with protruding tabs about the outer circumference to receive slots from the outer turning rotor, and protruding tabs about the inner circumference to receive slots in the hollow bore eccentric cycloidal reducer input shaft.

Figure 32:
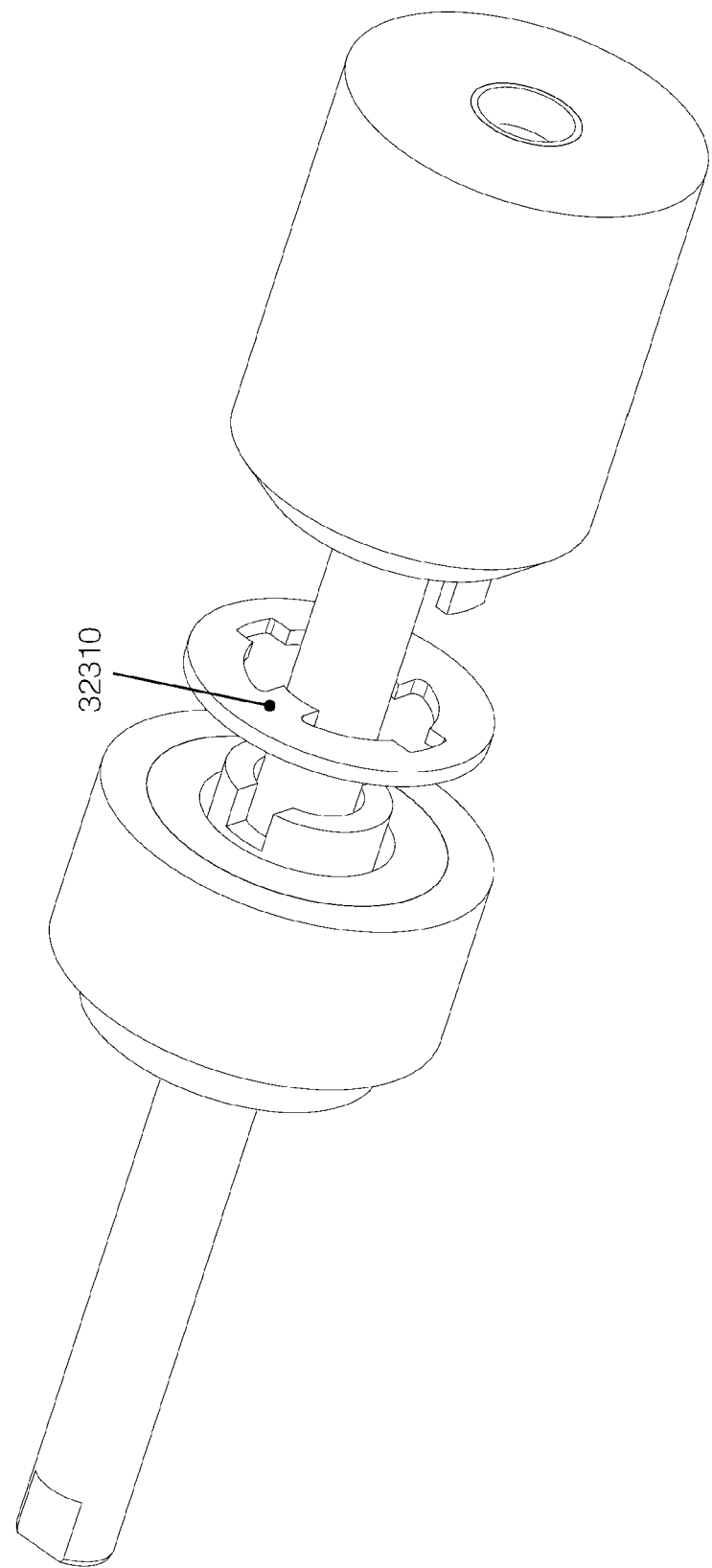
FIG. 32 is an alternate simplified partially exploded isometric schematic representation of the coupling system between the rotor of an electric motor, a cycloidal speed reducer, and a central shaft of an embodiment of the invention, wherein the high speed coupler has one pair of tabs and one pair of slots.

FIG. 32 is a simplified schematic isometric representation that shows slots about the inner circumference of high speed coupler 32310 to receive the rotor tabs, and protruding tabs about the inner circumference of high speed coupler 32310 to receive the slots of the hollow bore eccentric input shaft of the cycloidal reducer.

Figures 33, 34:
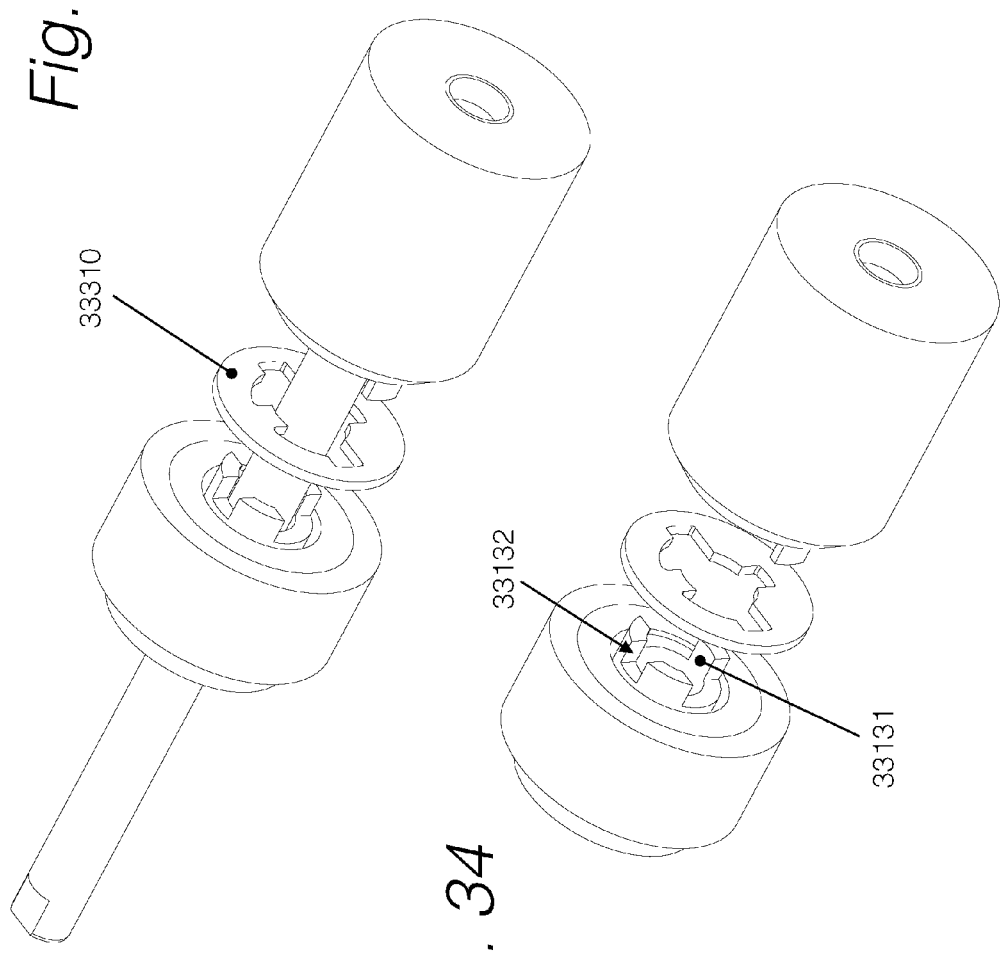
FIG. 33 is an alternate simplified partially exploded isometric schematic representation of the coupling system between the rotor of an electric motor, a cycloidal speed reducer, and a central shaft of an embodiment of the invention, wherein the high speed coupler has a tab paired with a slot.
FIG. 34 is an alternate simplified partially exploded isometric schematic representation of the coupling system between the rotor of an electric motor and a cycloidal speed reducer of an embodiment of the invention, wherein the high speed coupler has slot pair in the horizontal axis with a tab/slot paired in the vertical axis.

FIG. 33 is a simplified schematic isometric representation that further shows two slots about the inner circumference of high speed coupler, also referred to as an engagement coupler or speed coupler, 33319 to receive the rotor tabs, and one protruding tab about the inner circumference and one slot about the inner circumference in order to receive a corresponding slot and tab from the hollow bore eccentric input shaft of the cycloidal reducer.

FIG. 34 is a simplified schematic isometric representation that shows high speed coupler 34310 of this illustrative embodiment more clearly by eliminating the central shaft from the drawing. An advantage of this high speed coupling is that angular and concentric misalignment between the rotor and the input of the cycloidal reducer is accommodated, yet uninterrupted torque is delivered to the cycloidal reducer.

As noted, the cycloidal fixed reference 27150 of FIGS. 29-30 is fixed relative to central shaft 03210, but is permitted to accommodate misalignment resulting from the flexing of the central shaft when the system is under lateral load. This accommodation is achieved by a reference coupler arrangement in which a high torque coupler, also referred to as an engagement coupler or reference coupler, 03350 is rotationally fixed to central shaft 03210 by engagement with a radial shaft key 03351 that engages a corresponding keyway that extends longitudinally within high torque coupler 03350. High torque coupler 03350 is circumferentially configured with protruding tabs to fit within a corresponding slot in the fixed reference of the cycloidal reducer. Therefore, the same concept of orthogonal driving faces employed with the high speed coupler of FIG. 35 is employed, as well, by the high torque coupler.

FIG. 35 is another simplified schematic representation of an illustrative embodiment of the means by which the high torque coupler is affixed to the shaft. Rather than using keyways with matching keys, a keyless bushing 35352 is used. The advantage of a keyless bushing is that a smaller diameter central shaft can be used in the practice of the invention.

Figure 36:
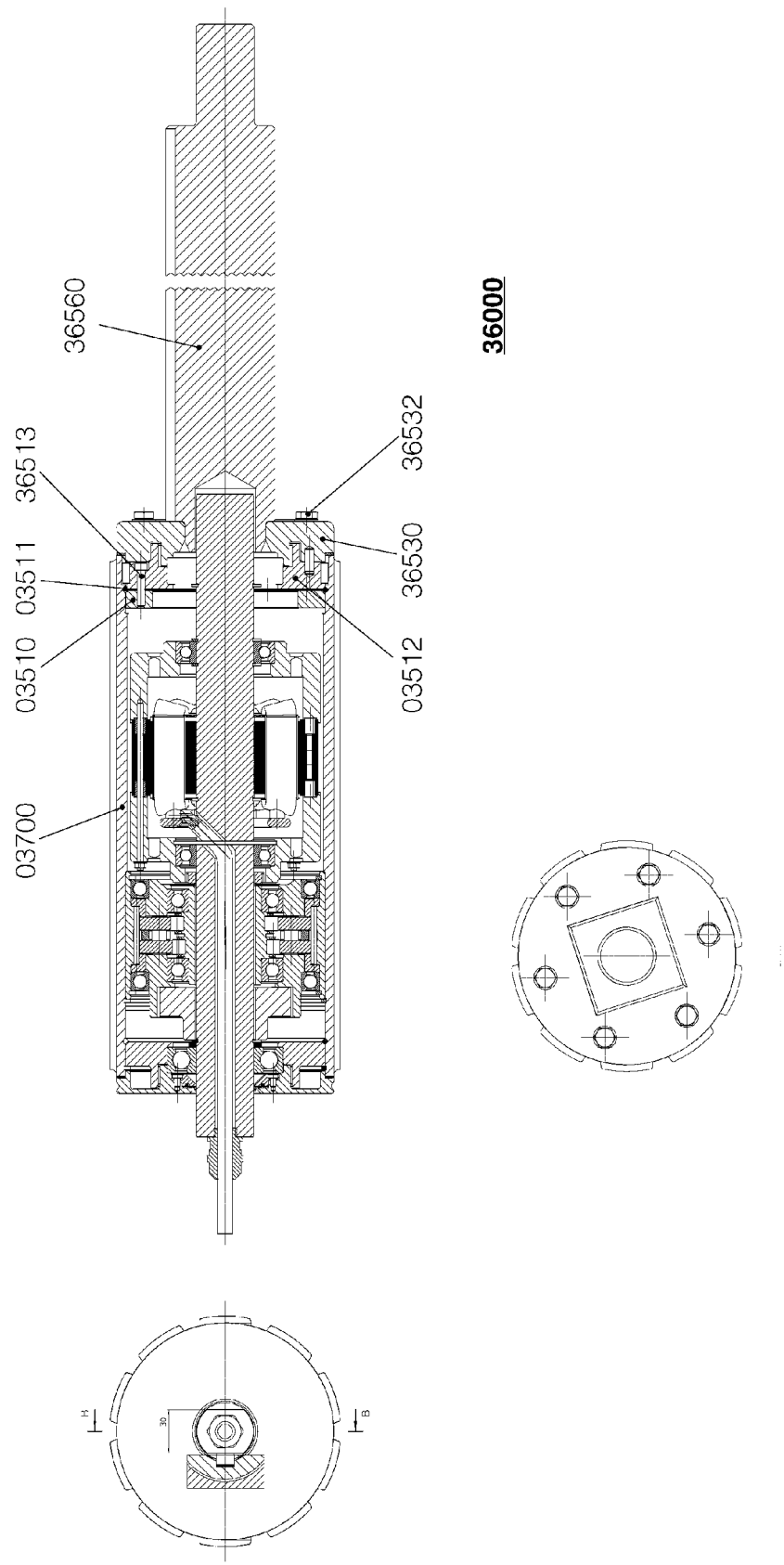
FIG. 36 is an axial cross-section of a motorized drum of an embodiment of the present invention, wherein an extension shaft is mounted to the mounting face of the base unit.

FIG. 36 is a simplified axial cross-sectional representation of a motorized drum 36000 of an embodiment of the present invention, wherein an extension shaft 36560 is mounted to mounting face 36512 of base unit 03010 (denoted in FIG. 3). Extension shaft 36560 is rigidly connected to clamp ring 36530 that is affixed against mounting face 03512 by use of a plurality of fasteners (extension clamping bolts 36532) extending through clamp ring 36530 and threading into mounting ring 03510 on the opposite side of mounting face 03512. The mounting ring is located some distance from the determined region of rotary power delivery or where the reducer delivers power to the drum shell.

Axially inward of mounting face 03512 is mounting ring 03510. The mounting ring 03510 has a chamfer on the outer circumference of its axially outward face. The chamfer of mounting ring 03510 is in direct contact with spring ring 03511. The spring ring, which may be formed of a hardened metal with an aggressive texture, may have a cross-sectional geometry that is generally circular or diamond or rectangular, for example. Spring ring 03511, mounting ring 03510, and mounting face 03512 are held in place by means of mounting ring alignment bolts 36513 when an attachable component is not mounted to mounting face 03512. In this illustrative embodiment, extension clamping bolts 36532 are used to draw clamp ring 36530 toward mounting ring 03510 thus causing the chamfer on mounting ring 03510 to be drawn against spring ring 03511, forcing the spring ring to expand radially into drum shell 03700, thereby transmitting the transaxial forces of extension shaft 36560 into drum shell 03700.

Figure 37:
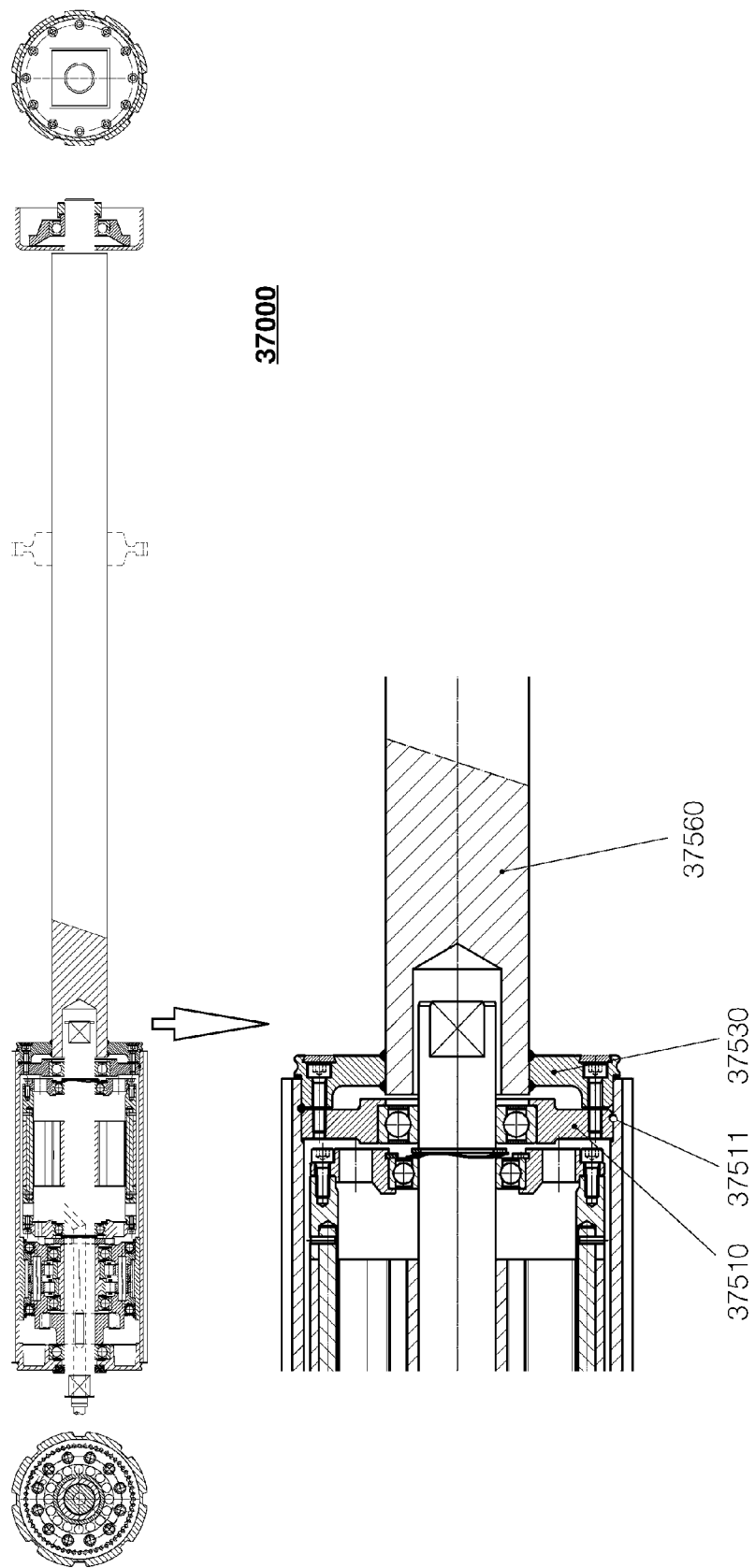
FIG. 37 is an axial cross-section of a motorized drum of an embodiment of the present invention, wherein the clamp ring of the extension shaft is in direct contact with the mounting ring of the base unit, without the use of an intervening mounting face.

FIG. 37 is a simplified axial cross-sectional representation of a motorized drum 37000 of a further embodiment of the present invention, wherein clamp ring 37530 of extension shaft 37560 directly contacts with mounting ring 37510 of base unit 03010 (denoted in FIG. 3), without the use of an intervening mounting face. In this embodiment, mounting ring 37510 has a similar chamfer as in FIG. 36 and is drawn similarly against spring ring 37511 by use of fasteners extending through clamp ring 37530.

Figure 38:
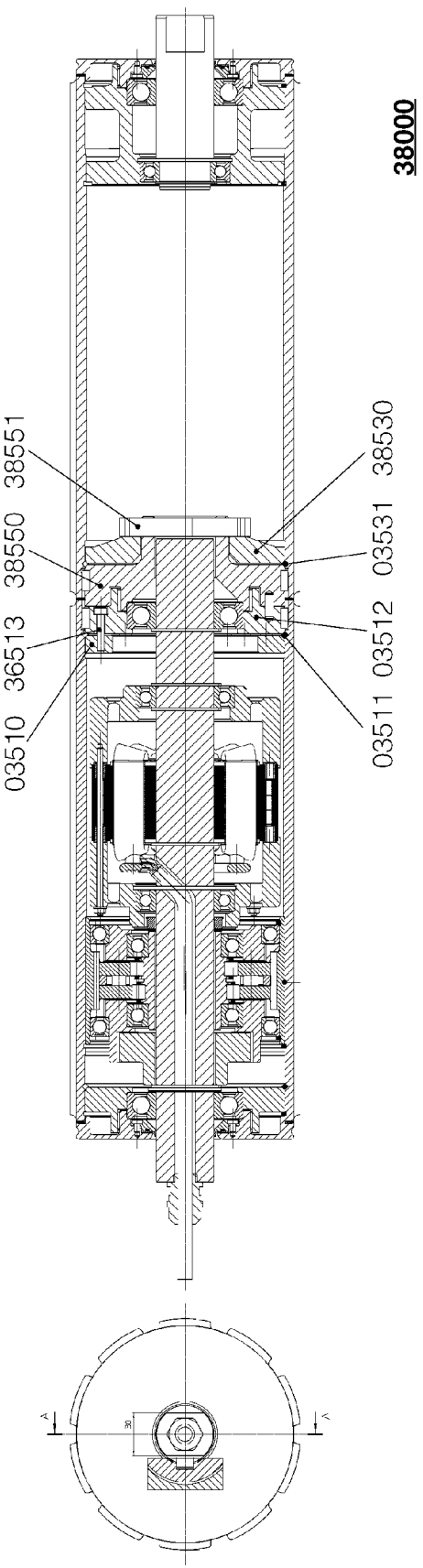
FIG. 38 is an axial cross-section of a motorized drum of a particular embodiment of the present invention, wherein an extension shell component is attached to the mounting face of the base unit and held in place by means of a large central nut.

FIG. 38 is a simplified axial cross-sectional representation of a motorized drum of a particular embodiment of the present invention, wherein an extension shell attachment 03560 (denoted in FIG. 3) is attached to mounting face 03510 of base unit 03010 (denoted in FIG. 3) and held in place by means of a large central nut 38551. Before mounting extension shell attachment 03560, threaded flange 38550 is mounted to mounting face 03512 by use of a plurality of fasteners (not shown) that thread into mounting ring 03510, thereby drawing the chamfer of mounting ring 03510 against spring ring 03511 such that spring ring 03511 expands radially into drum shell 03700. Additionally, clamp ring 03530 is inserted into extension shell attachment 03560 and a secondary spring ring 03531 is inserted into a circumferential groove in the inner periphery of extension shell attachment 03560 axially outward of clamp ring 03530. Then, extension shell attachment 03560 is placed against base unit 03010 and a central nut 38551 is inserted from opposite end of shell extension attachment 03560. This central nut 38551 is treaded onto threaded flange 38550, thereby drawing clamp ring 03531 against secondary spring ring 03531 causing secondary spring ring 03531 to expand radially into extension shell attachment 03560.

Figure 39:
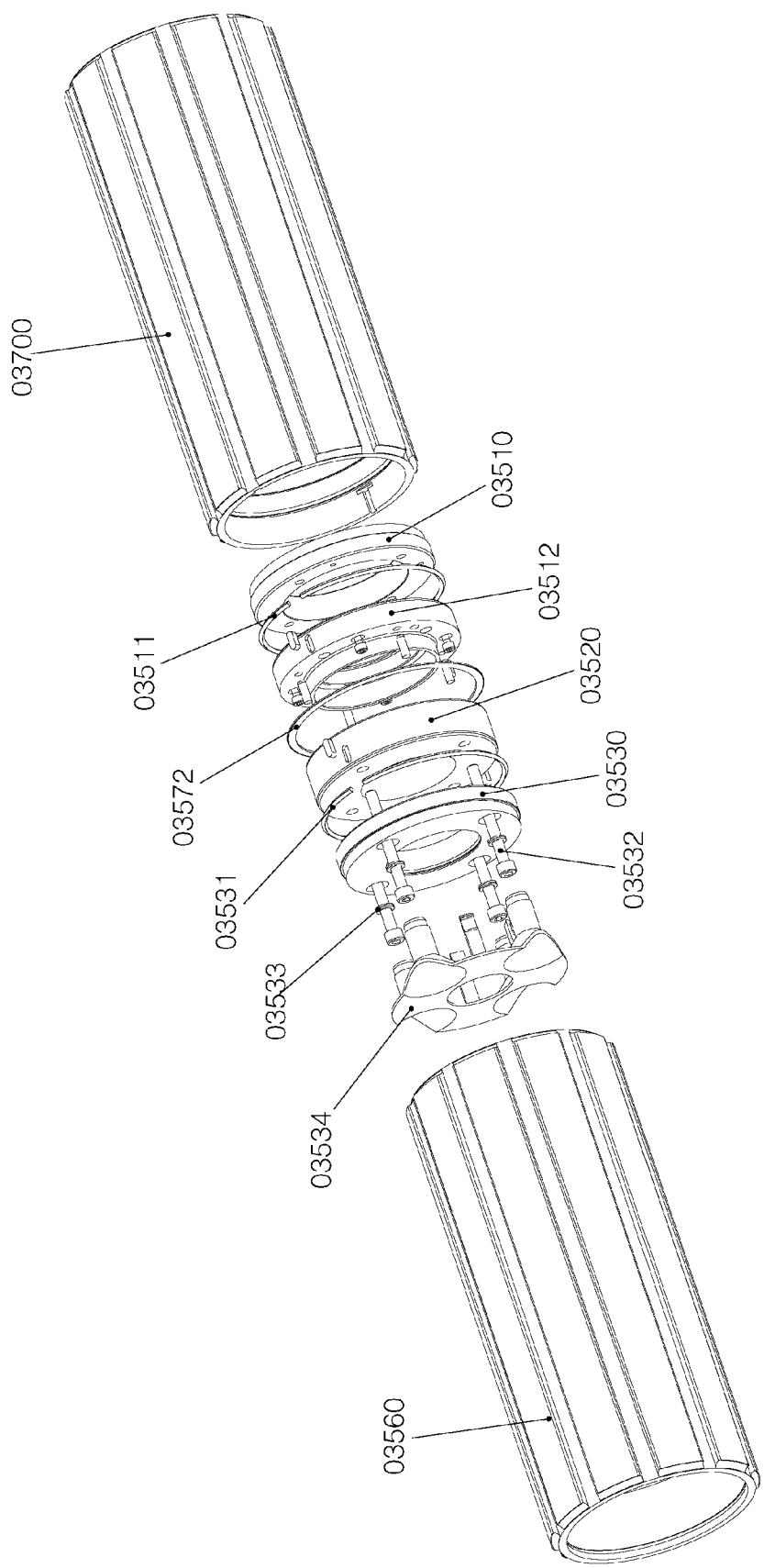
FIG. 39 is an isometric exploded view of the mounting face system utilized in attaching extension shell components to the base unit of a motorized drum, as an embodiment of the present invention.

FIG. 39 is an isometric exploded view of the mounting face system utilized in attaching extension shell component 03560 to base unit 03010 of a motorized drum 03000, as an embodiment of the present invention. In this embodiment, rather than using one central nut, a plurality of extension clamping bolts 03532 are used with mating cam faced washers 03533. The same principles demonstrated in FIG. 38 are shown in FIG. 39. Additionally, a bolt holder 03534 aids in mounting of extension shell attachment 03560 by assuring the extension clamping bolts 03532 remain in clamp ring 03530 during installation, while accommodating for the extra distance required by extension clamping bolts 03532 that are not yet threaded into mounting ring 03510.

Figure 40:
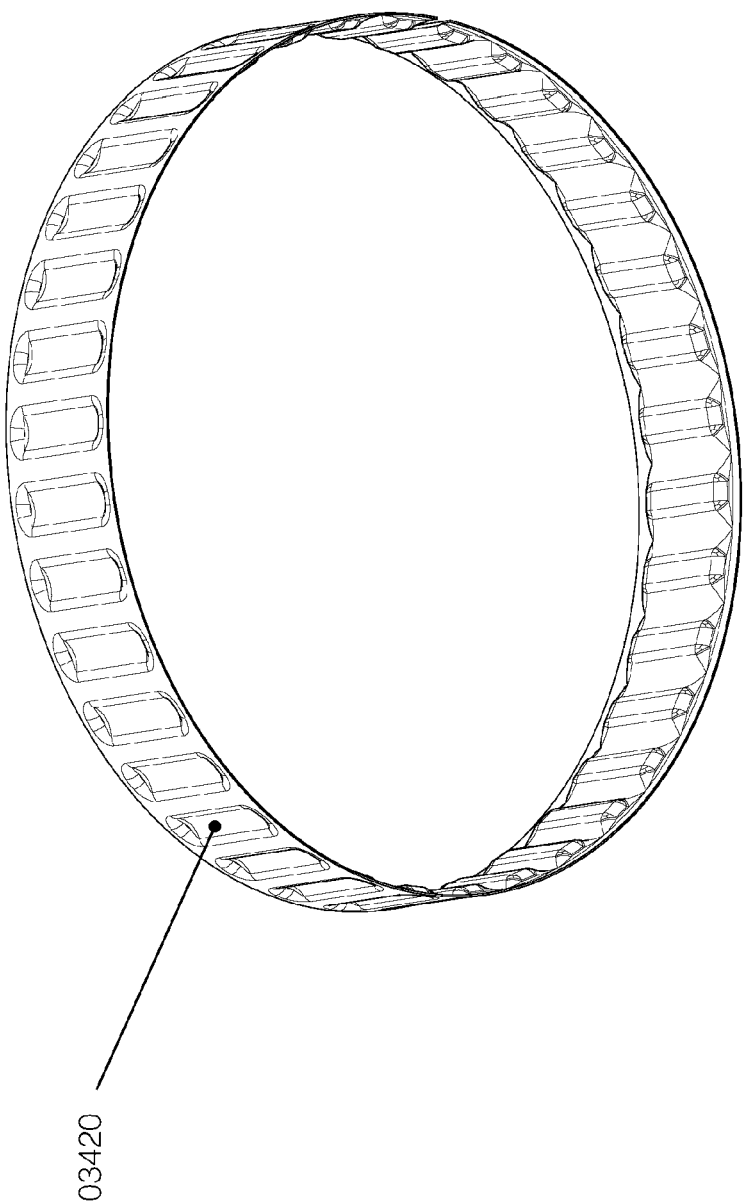
FIG. 40 is an isometric representation of an embossed spring band.

The end lid is connected to the motorized drum by means of an embossed spring band. FIG. 40 is a simplified representation of an embossed spring band 03420, also known as a tolerance ring.

Figure 41:
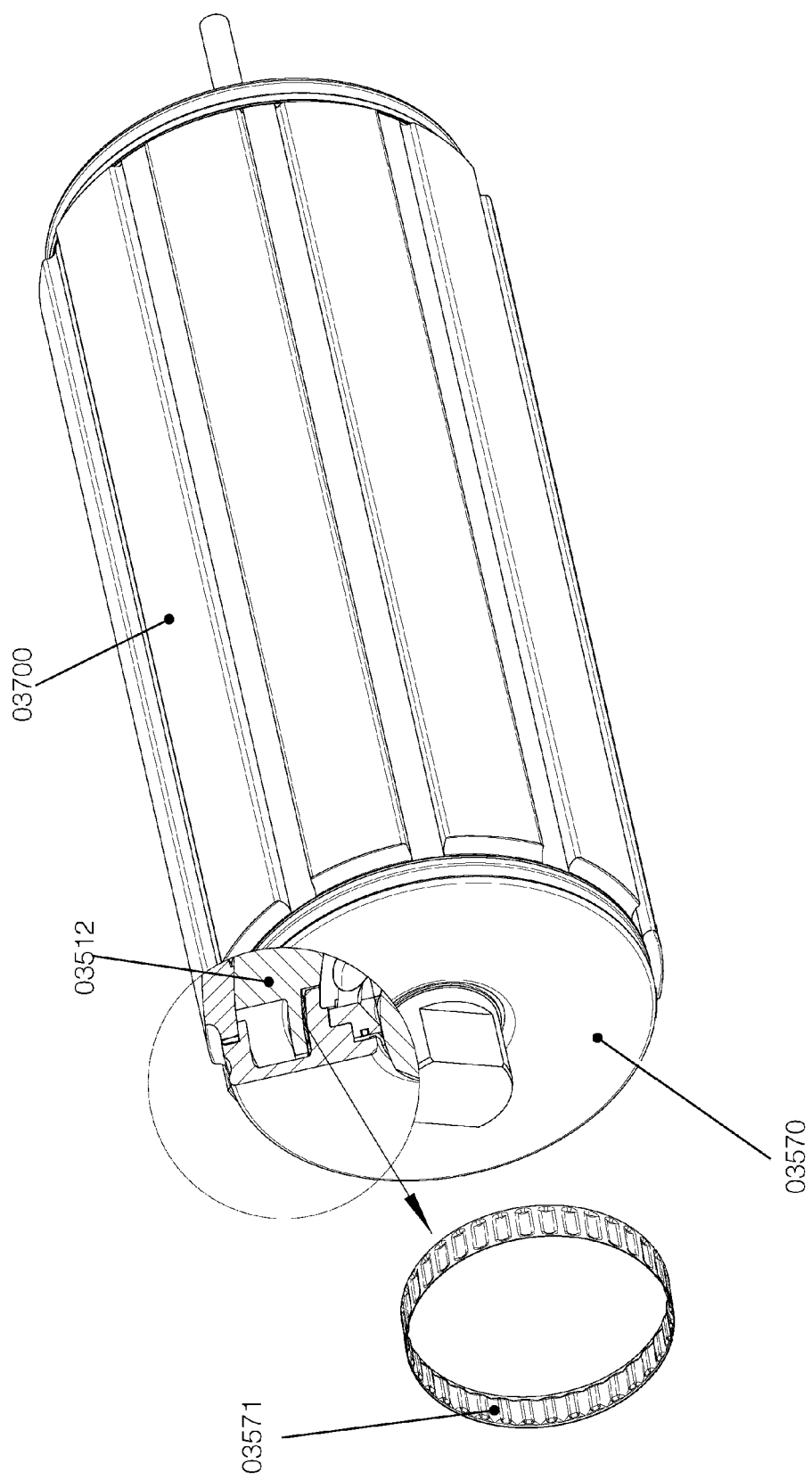
FIG. 41 is an isometric cut-away of one embodiment of the embossed spring band holding the end lid against the motorized drum of the present invention.

FIG. 41 is an isometric cut-away of one embodiment of embossed spring band 03571 that holds end lid 03570 against the motorized drum in a drum shell closure arrangement of the present invention. The embossed spring band 03571 is disposed between two concentric protuberances, also referred to as cylindrical geometries, of end lid 03570 and mounting face 03512 and when the two concentric protuberances are nested together in an end lid assembly, embossed spring band 03571 is compressed creating an interference fit between the two concentric protuberances. The mating concentric protuberances of the end lid and the mounting face have different nominal diameters.

Figure 42:
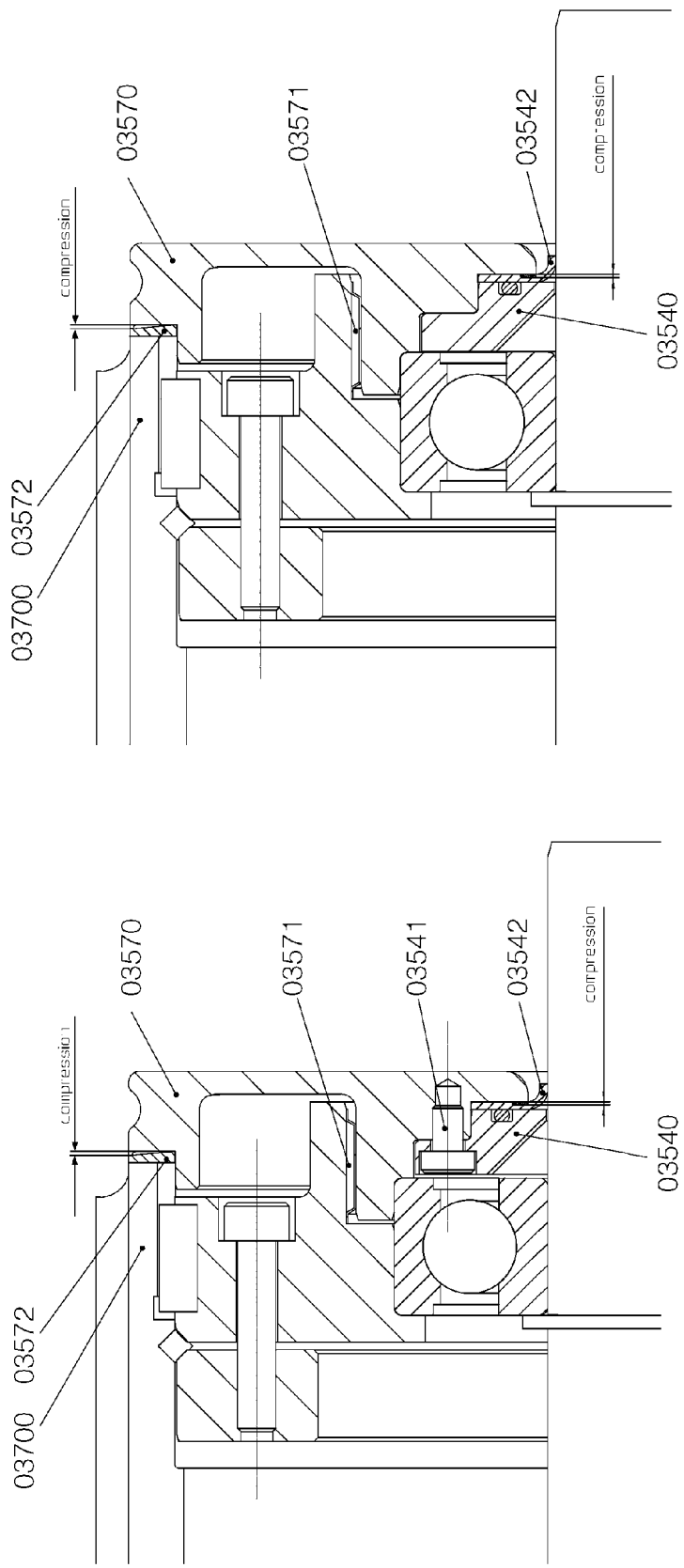
FIG. 42(a) is a simplified cross-sectional representation of an embodiment of the compression geometry utilized in the end lid where the end lid contacts the static drum shell seal in the motorized drum of the present invention and FIG. 42(b) is a simplified cross-sectional representation of an embodiment of the compression geometry utilized in the end lid where the end lid contacts the static drum shell seal in the motorized drum of the present invention in response to the application of an installation force, the end lid remaining in fixed relation by operation of an embossed band that is deformed upon installation.

In another illustrative embodiment, a static polymeric seal is disposed between the end lid and the drum shell. FIG. 42(*a*) is a simplified cross-sectional representation of such an embodiment. A polymeric seal 03572 is enclosed between end lid 03570 and drum shell 03700. A ring compression geometry is about the outer circumference of the axial inward face of end lid 03570. When end lid 03570 is held in place by the embossed spring ring, the ring compression geometry imposes a compressive force on seal 03572.

In another embodiment, not shown in figure, the ring compression geometry is on an axially outward face of the drum shell about an outer circumference of the end lid.

FIG. 42(*b*) is a simplified cross-sectional representation of an embodiment of the compression geometry utilized in the end lid where the end lid contacts the static drum shell seal in the motorized drum of the present invention and the ring compression geometry utilized in the end lid where the end lid contacts the rotary seal, also referred to as radial seal, in response to the application of an installation force, the end lid remaining in fixed relation to the polymeric rotary seal by operation of an embossed spring band that is deformed upon installation. Examples of rotary seals include rotary lip seals, rotary shaft seals or polymeric rotary lip seals. The embodiment of FIG. 42(*b*) bears similarity to that of FIG. 42(*a*), and accordingly, elements of structure that have previously been discussed are similarly designated.

Figure 43:
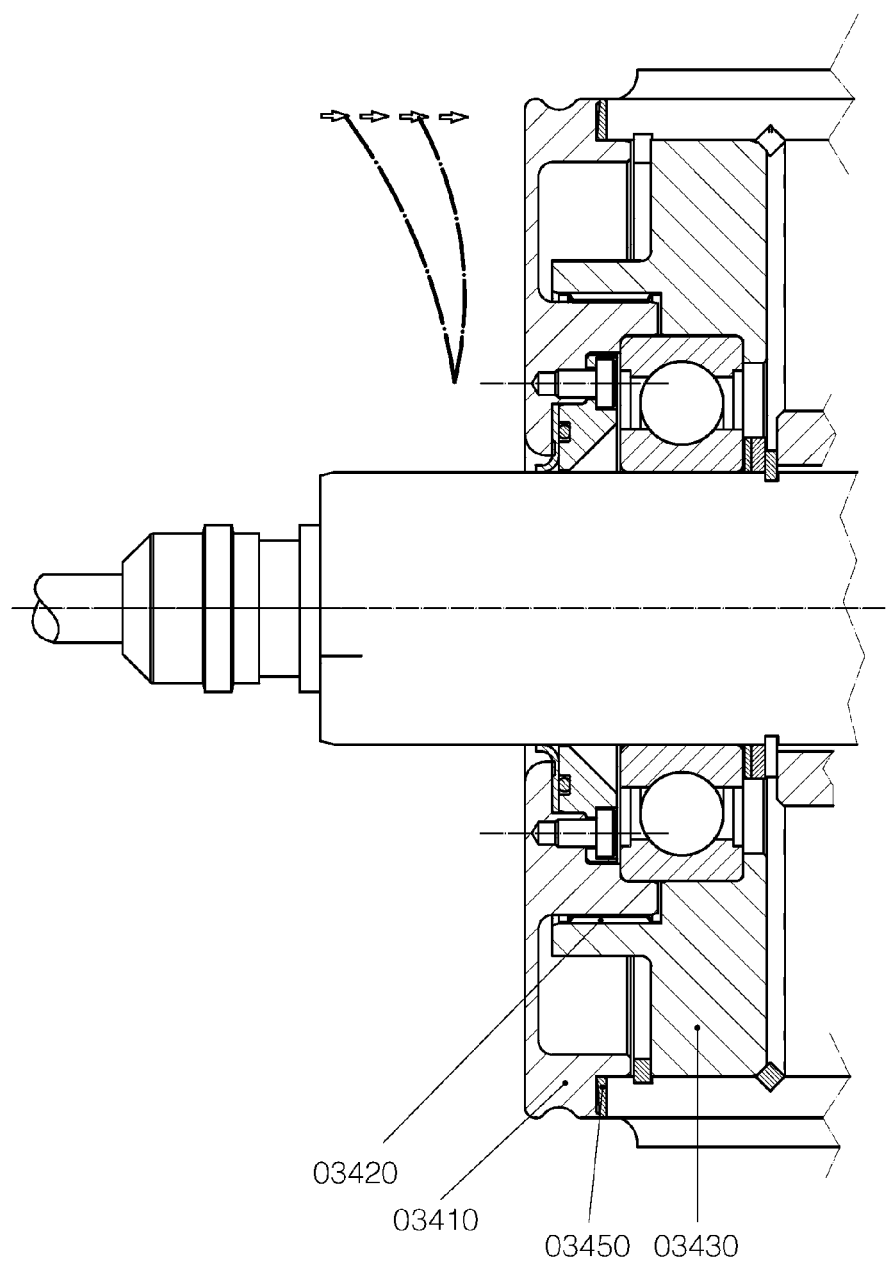
FIG. 43 is an axial simplified cross-sectional representation of the end lid of the motorized drum of the present invention in one embodiment, wherein the end lid has a relatively thin wall in the radial distance between the embossed spring band 03420 and the outer periphery in order to maximize the spring-like characteristics of the end lid against the static drum seal.

FIG. 43 is a simplified cross-sectional representation of another illustrative embodiment wherein a compressive force is maintained against seal 03450 by designing end lid 03410 with a thin wall, also referred to as an annular web, in the radial distance between the embossed spring band and the outer diameter to create a spring-like effect resulting from the axially resilient characteristic of the annular web. In this embodiment, the central portion of the end lid is held axially inward by embossed spring band 03420 slightly farther than the natural contact point between the outer portion of end lid 03410 and outer static seal 03450 thereby maintaining a constant compressive force against static seal 03450.

Figure 46:
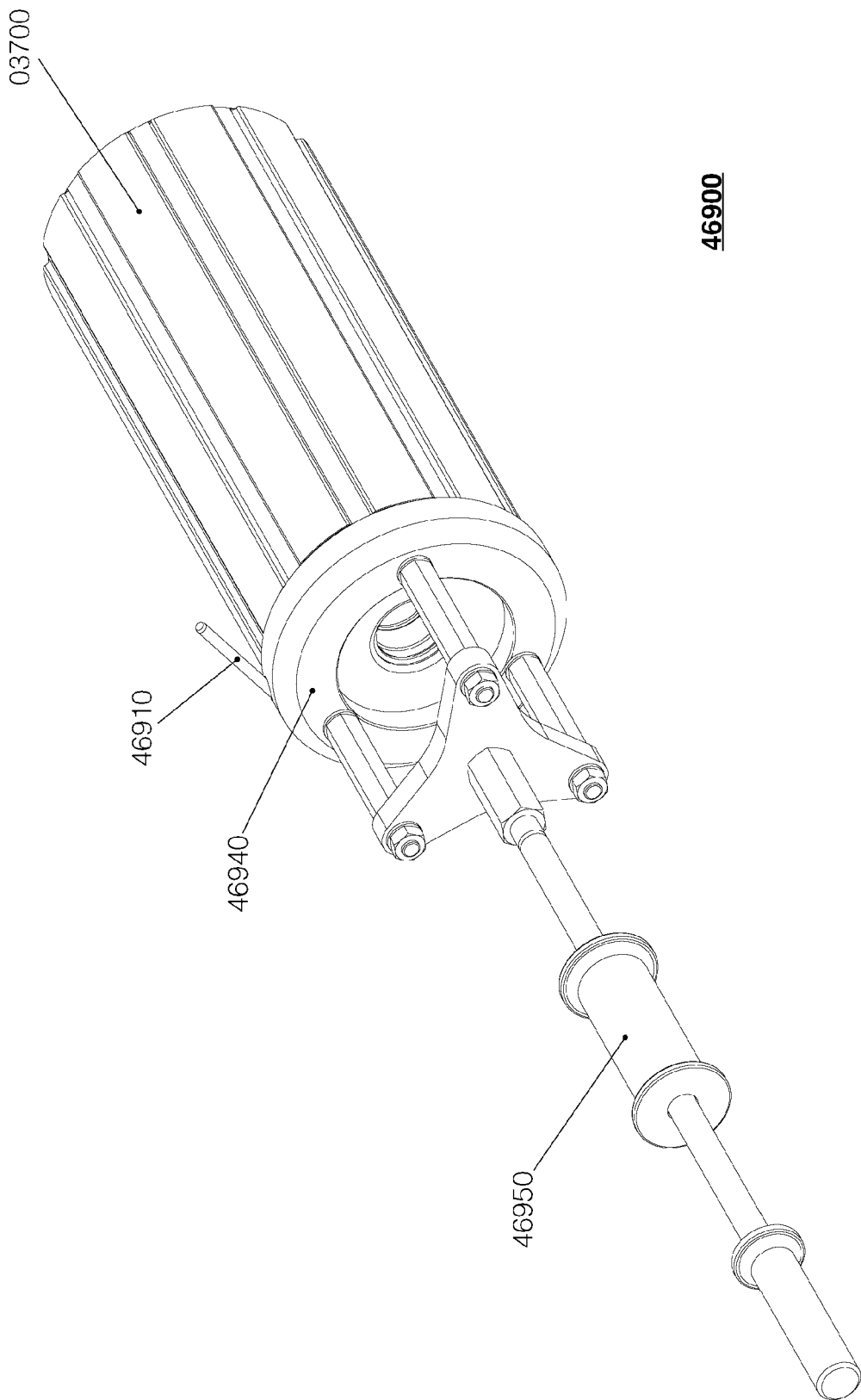
FIG. 46 is an isometric drawing of the end lid removal tool, as it is attached to the end lid of the motorized drum of the present invention.
Figure 47:
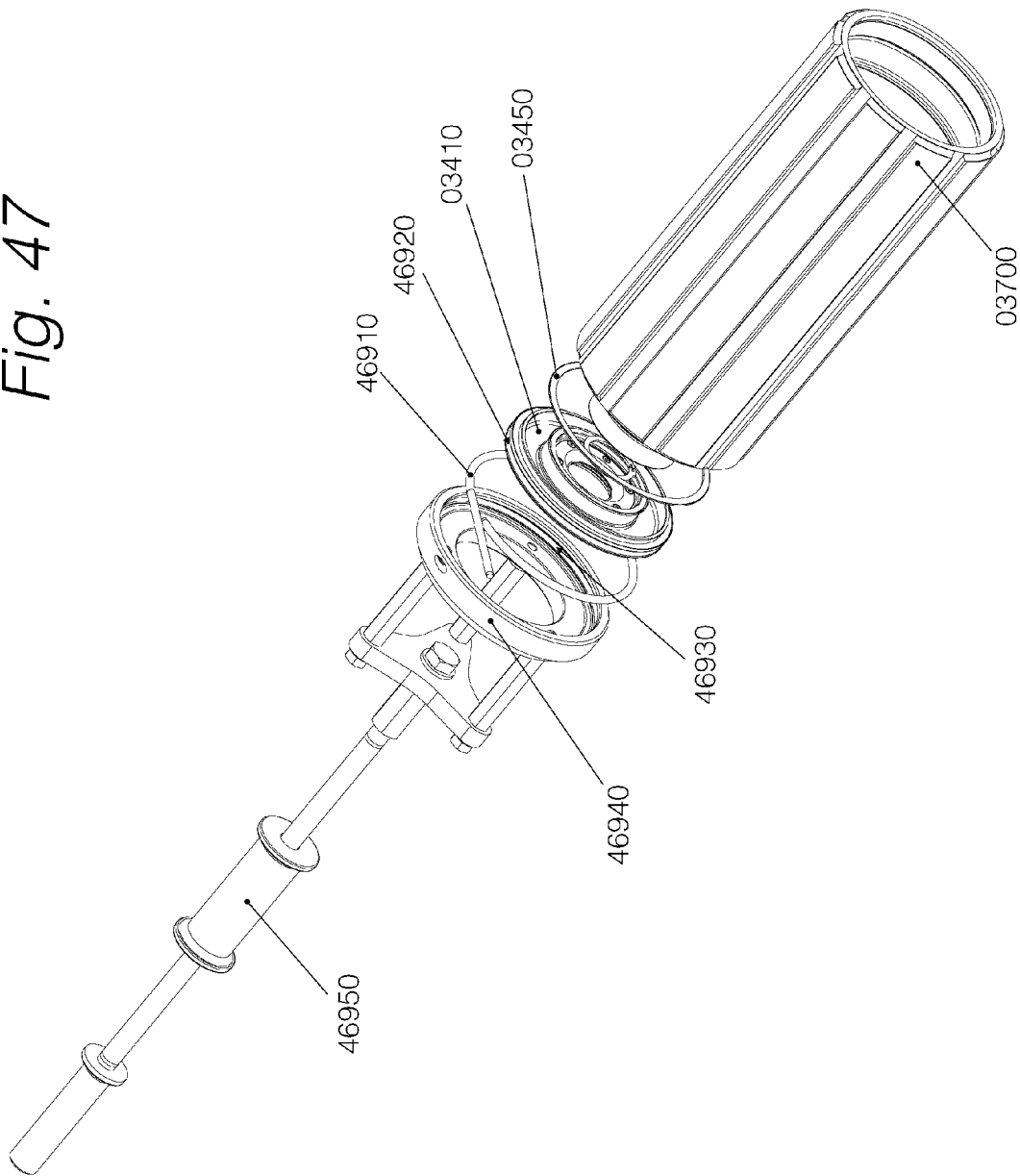
FIG. 47 is an isometric exploded view of FIG. 46.

Inasmuch as end lid 03570 covers mounting face 03512 on one side of motorized drum 03000, and inasmuch as compressed embossed spring band 03571 requires three tons of force to remove it, end lid 03570 has been designed with a geometry that mates with a removal tool clamp for simple removal in the field. FIG. 46 is a simplified isometric representation of one embodiment of the end lid removal tool as it is attached to the end lid of the motorized drum. FIG. 47 is a simplified isometric exploded representation of the embodiment of FIG. 46. End lid 03410 has a recessed, outer circumferential geometry 46920, also referred to as an end lid recess. Removal tool clamp 46940 has a recessed, inner circumferential geometry 46930, also referred to as an tool recess, that corresponds to geometry 46920 of end lid 03410. When removal tool clamp 46940 is placed over end lid 03410, two recessed geometries 46920, 46930 form a circular channel. A joining cord 46910 of a slightly smaller diameter than the circular channel is inserted through a tangential hole, or inlet, in removal tool clamp 46940. The inserted joining cord 46910 effectively locks end lid 03410 to removal tool clamp 46940, which can now be easily removed with a force generating arrangement, such as slide hammer 46950.

Figure 44:
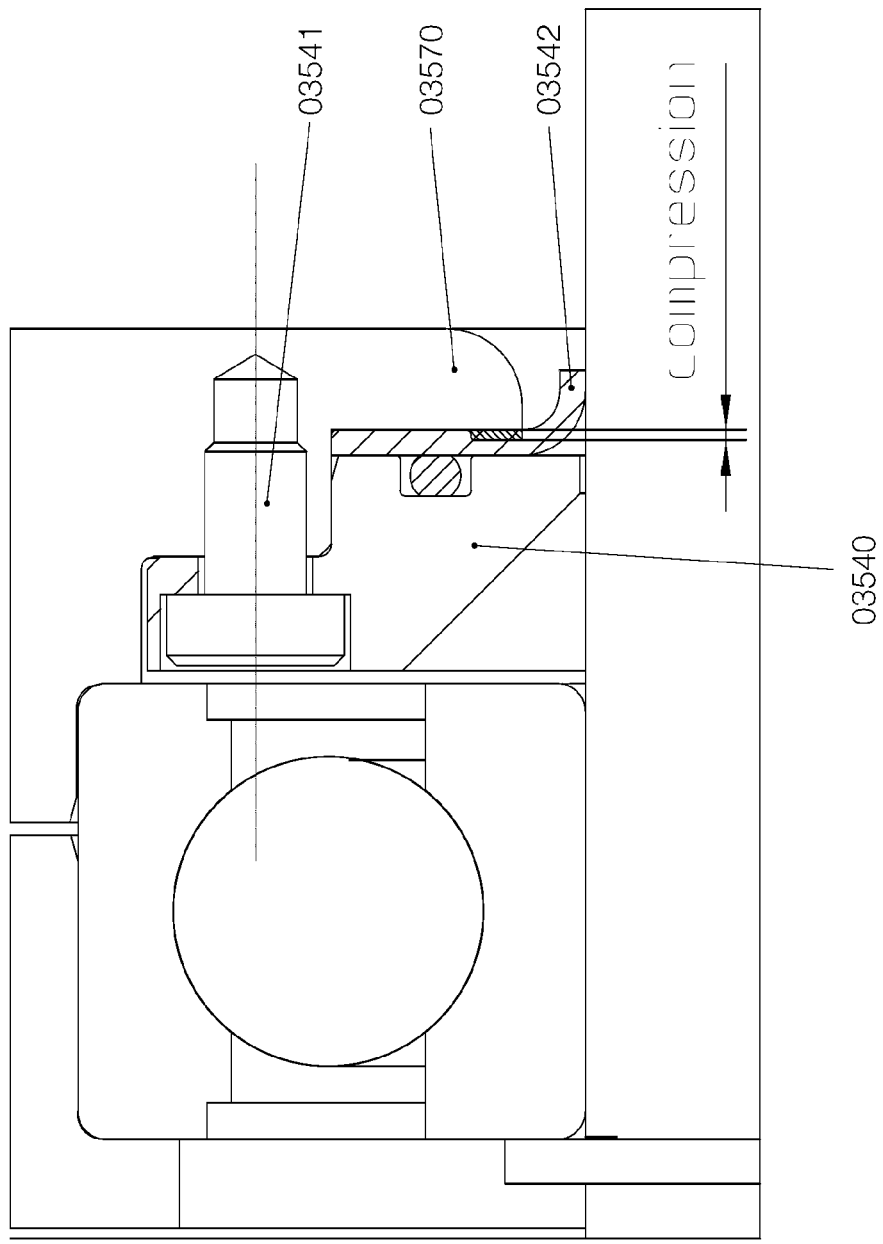
FIG. 44 is a simplified cross-sectional representation of one embodiment of the compression geometry utilized in the end lid where the end lid contacts the rotary shaft seal of a motorized drum of the present invention.

FIG. 44 is a simplified cross-sectional representation of one embodiment of the compression geometry utilized in the end lid where the end lid contacts the rotary shaft seal of the motorized drum. A polymeric seal 03542 is placed directly against end lid 03570. End lid 03570 has a ring compression geometry on its axial inward face about its outer circumference. A seal compression plate 03540 is attached to the end lid by a plurality of fasteners 03541, compressing seal 03542 between seal compression plate 03540 and end lid 03570 to form an end lid seal assembly. A significant compressive force is applied at the ring compression geometry of end lid 03570 preventing ingress of bacteria between seal 03542 and end lid 03570.

In another embodiment, not shown in figure, the ring compression geometry is on a axially outward face of the seal compression plate about an inner circumference of the end lid.

Figure 45:
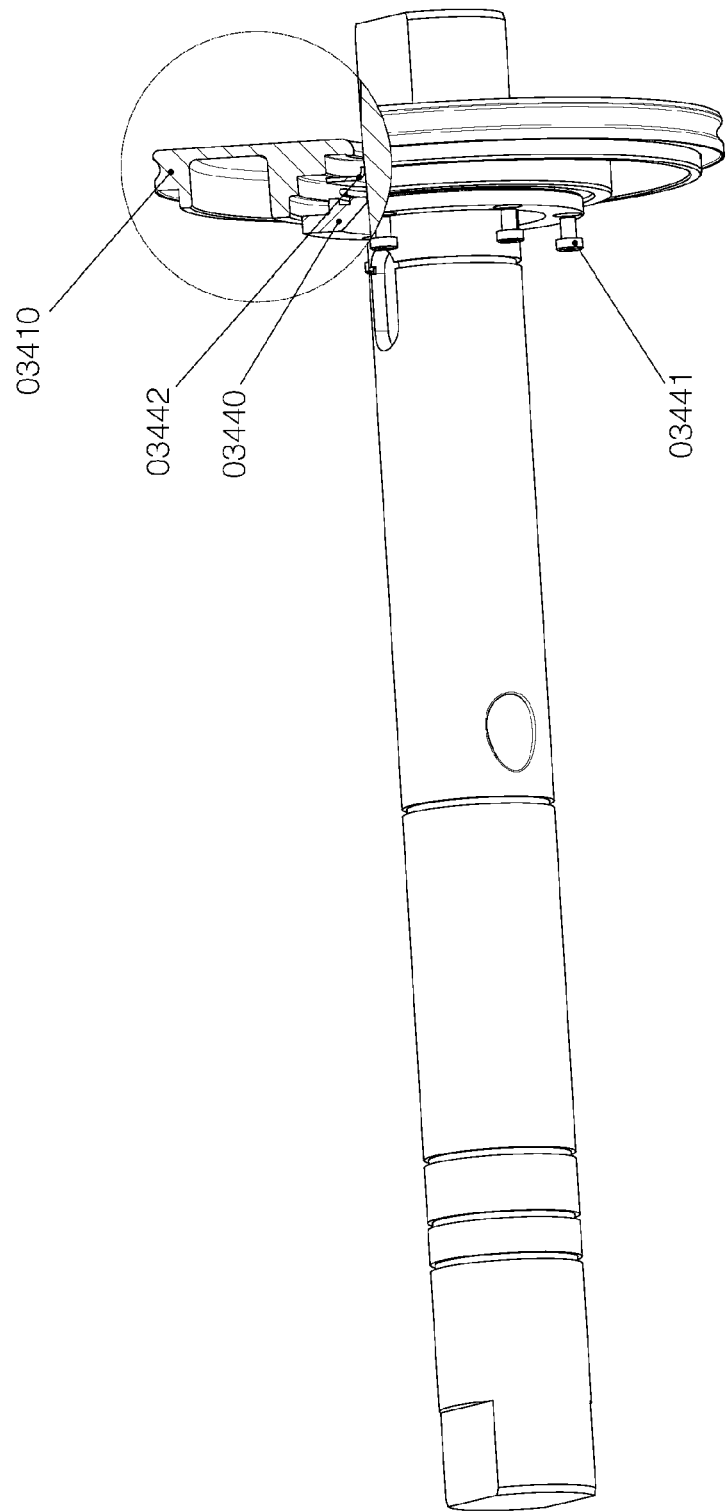
FIG. 45 is a cut away of an exploded view of one embodiment of the rotary shaft seal compression system of a motorized drum of the present invention.

FIG. 45 is a simplified partially cross-sectional representation of an embodiment of the rotary shaft seal compression system of a motorized drum.

Figure 48:
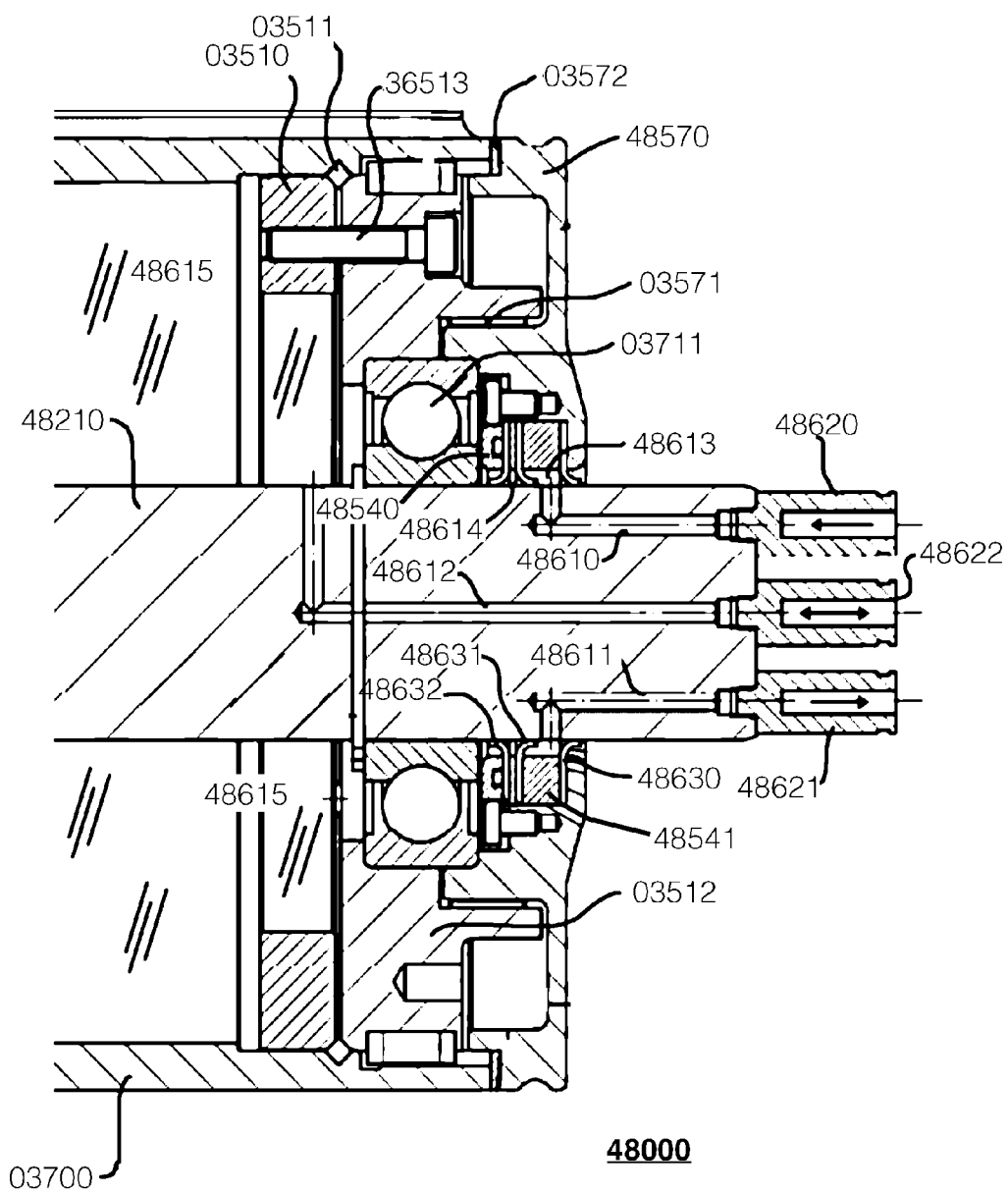
FIG. 48 is a simplified schematic representation of a specific illustrative embodiment of a fluid port that is useful in the sanitation of the motor using selectably evacuation or pressurization within the motor as well as a pair of fluid ports used to cycle cleaning fluids through an annular chamber in the seal region of the motorized drum of the present invention.

FIG. 48 is a simplified schematic representation of a cleaning-in-place system for the rotary shaft seals of the motorized drum. The cleaning-in-place system includes:

a shaft 48210 with first cleaning conduit 48610 and second cleaning conduit 48611;

an inlet port 48620 attached to first cleaning conduit 48610;

an outlet port 48621 attached to second cleaning conduit 48611;

an end lid 48570;

a first axially outward polymeric radial seal 48630;

a second axially outward polymeric radial seal 48631;

an annular chamber 48613 formed between first and second radial seals 48630, 48631;

a seal compression plate 48540;

a seal spacer ring 48541; and a plurality of fasteners.

In this illustrative embodiment, seals 48630, 48631 are stacked between end lid 48570 and seal compression plate 48540 and separated by seal spacer ring 48541, thus forming annular chamber 48613. A plurality of fasteners draw seal compression plate 48540 axially toward end lid 48570. In a preferred embodiment, end lid 48570 includes a ring compression geometry on its axial inward face about its inner circumference (not shown in FIG. 48), which imposes a compressive force against radial seal 48630. In another embodiment (also not shown in FIG. 48) a ring compression geometry is on an axial outward face of the seal spacer ring about an inner circumference of the end lid.

Cleaning agents are delivered through inlet port 48620 into first cleaning conduit 48610 and into annular chamber 48613 and exit second cleaning conduit 48611 and outlet port 48621. When desired, outlet port 48621 can be used to restrict the flow, thus building greater pressure in annular chamber 48613. When this pressure increases sufficiently, polymeric seal 48630 will be deflected outward and up and the cleaning fluid will pass between the radial face of seal 48630 and the surface of shaft 48210.

FIG. 48 further has a fluid conduit 48612 and a fluid port 48622 wherein fluid can be inserted or removed from drum chamber 48615, which is a sealed region.

Figure 49:
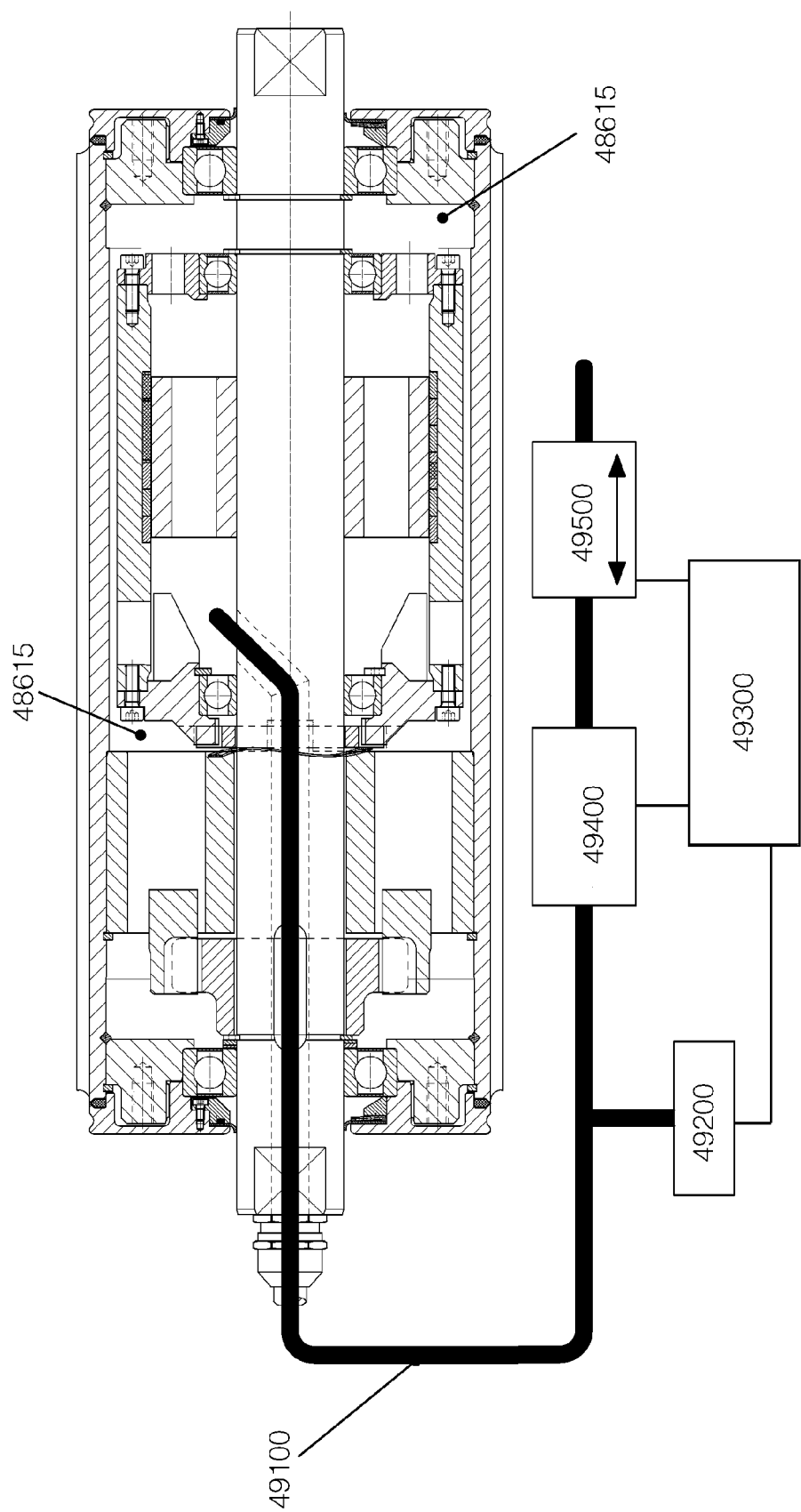
FIG. 49 is a simplified schematic of a fluid port system useful in the sanitation of the motorized drum of the present invention, and more particularly in monitoring the state of the seals.

FIG. 49 is a schematic of a seal monitoring system incorporating a conveyor component known as a drum motor. The seal monitoring system is comprised, in this embodiment, of a sealed drum chamber 48615, from which proceeds a fluid line 49100 in which, there is a sensor 49200 to measure pressure that reports to controller 49300. Subsequent to said sensor 49200 is a valve 49400 subsequently connected to pump 49500. Both the valve 49400 and pump 49500 may be controlled by the controller 49300. Pump 49500 may be capable of adding or subtracting fluids, particularly gases, to or from the drum chamber 48615. Alternatively, the sensor 49200 could be incorporated in a manner other than shown to measure flow of the fluid in said fluid line 49100. Additionally, the sensor 49200 could be mounted internal to the sealed drum chamber 48615 and may be attached to fluid line 49100 or it may be connected to the external environment in some other manner.

Figure 50:
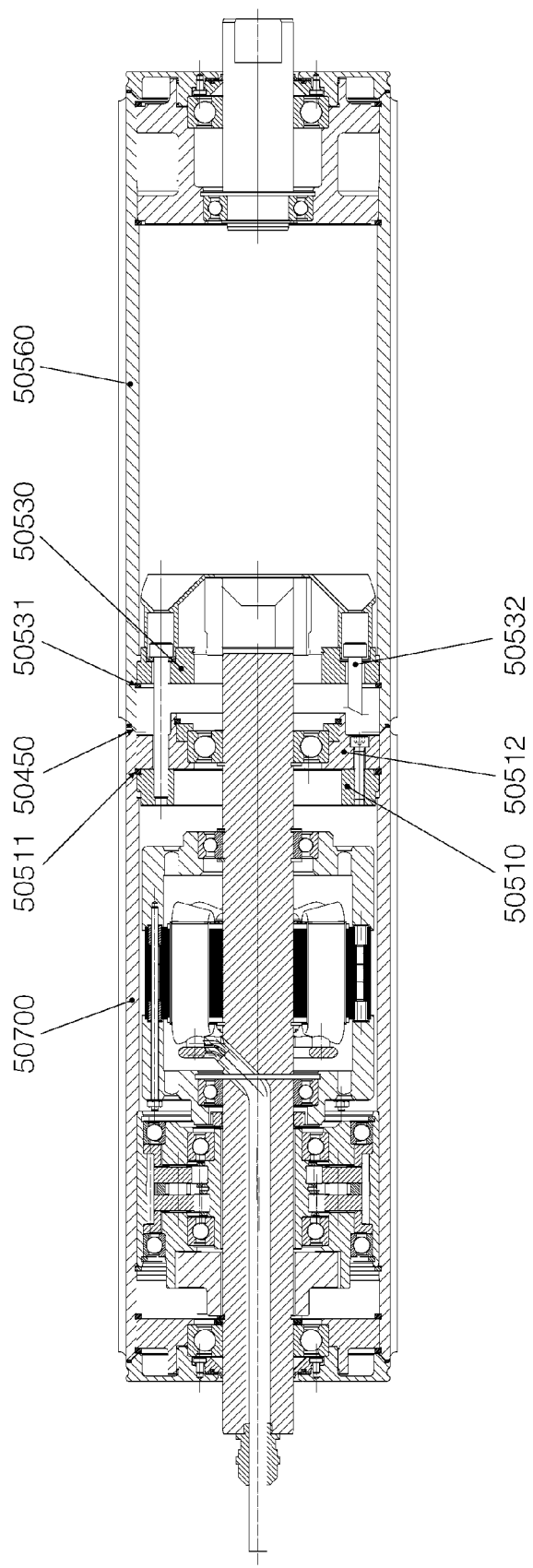
FIG. 50 is an axial cross-section of a motorized drum of a particular embodiment of the present invention, wherein an extension shell component is attached to the mounting face of the base unit using clamping bolts and the drum shell of the base unit has a chamfer that mates with a corresponding chamfer on the extension drum shell.

FIG. 50 is an axial cross-section of a motorized drum of another particular embodiment of the present invention, wherein an extension shell attachment 50560 is attached to the mounting ring 50510. In this embodiment, the drum shell 50700 is fitted with an internally beveled chamfer and the extension shell attachment 50560 is fitted with a mating externally beveled chamfer, referred to collectively as mating chamfers 50450, by which the drum shell 50700 and the extension shell attachment 50560 are drawn together by a plurality of extension clamping bolts 50532 threading into the mounting ring 50510.

Axially inward of the mounting face 50512 is the mounting ring 50510. The mounting ring 50510 has a groove on the periphery of the outer circumference of its axially outward face. This groove is in direct contact with the spring ring 50511.

Axially inward of the chamfered end of the extension shell attachment 50560 is a radially installed groove in which a spring ring 50531 is fitted. Axially inward of the spring ring 50531 is the clamp ring 50530. The extension clamping bolts 50532 are used to draw the clamp ring 50530 toward the mounting ring 50510 thus causing the chamfer on the extension shell attachment 50560 to mate coaxially under compression with the chamfer on the drum shell 50700, resulting in mating chamfers 50450, thereby transmitting the transaxial forces of the extension shell attachment 50560 into the drum shell 50700.

In summary, the foregoing is directed in part to:
eliminating the need for oil in the motor system, which poses a risk of cross contamination in sanitary applications;

increasing the torque density of the motor within a fixed diameter and motor length;

providing greater stability with variable loads;

transmitting core stator heat to the drum shell through via a gas with the use of circumferential gas turbulence between the stator and the rotor and between the rotor and the drum shell where it can be removed by the belt;

avoiding the need for additional position sensors to communicate the rotor position to the power electronics with the use of magnets, in some embodiments, that are embedded in the lamination stack and thereby cause a variation in magnetic flux around the circumference of the rotor, which variation can be detected by the power electronics that are connected to the stator windings; and accommodating the deflection caused through belt pull.

Although the invention has been described in terms of specific embodiments and applications, persons skilled in the art can, in light of this teaching, generate additional embodiments without exceeding the scope, or departing from the spirit, of the invention described herein. Accordingly, it is to be understood that the drawing and description in this disclosure are proffered to facilitate comprehension of the invention, and should not be construed to limit the scope thereof.

What is claimed is:

1. A conveyor roller comprising:
   a drum shell;
   a shaft extending outward of the drum shell; and
   an end lid seal assembly affixed to an axial end of said drum shell, said end lid seal assembly having:
   an end lid interposed between said drum shell and said shaft;
   a polymeric rotary lip seal; and
   a seal compression plate axially inward of said polymeric rotary lip seal,
   wherein said polymeric rotary lip seal is axially compressed between said seal compression plate and said end lid.

2. The conveyor roller of claim 1, wherein there is further provided a fastener extending through said seal compression plate and fastened into said end lid.

3. The conveyor roller of claim 1, wherein there is further provided an embossed spring band for fastening said end lid against a mounting face, whereby said seal compression plate is pressed toward said end lid and applies a force to said polymeric rotary lip seal.

4. The conveyor roller of claim 1, wherein there is further provided a ring compression geometry on an axially inward face and about an inner circumference of said end lid, for exerting a compressive force on said polymeric rotary lip seal when said seal compression plate is urged toward said end lid.

5. The conveyor roller of claim 1, wherein said seal compression plate is configured to have a ring compression geometry on its axially outward face about an inner circumference of said end lid, for exerting a compressive force on said polymeric rotary lip seal when said seal compression plate is urged toward said end lid.

6. A conveyor roller comprising:
   a drum shell;
   an end lid assembly having:
   an end lid;
   an embossed spring band; and
   a mounting face affixed to said drum shell at an axial end of said drum shell, said end lid having a first cylindrical geometry with a first nominal diameter designed to mate concentrically with a second cylindrical geometry having a different second nominal diameter on said mounting face, whereby when said embossed spring band is disposed radially between the mating first and second cylindrical geometries, said embossed spring band is compressed to an extent that creates an interference fit between the two concentrically mating cylindrical geometries.

7. The conveyor roller of claim 6, wherein there is additionally provided a polymeric seal disposed axially between an axially inward face of said end lid and an axially outward face of said drum shell about the outer circumference of said end lid.

8. The conveyor roller of claim 7, wherein said end lid maintains a spring force about its outer circumference against said polymeric seal.

9. The conveyor roller of claim 8, wherein said end lid is configured to have a ring compression geometry on its axially inward face about the outer circumference of the end lid, for exerting a compressive force on said polymeric seal as said end lid is retained against the drum shell by said embossed spring band.

10. The conveyor roller of claim 7, wherein said drum shell is configured to have a ring compression geometry on an axially outward face about the outer circumference of said end lid, for exerting a compressive force on said polymeric seal as said end lid is retained against said drum shell by said embossed spring band.

* * * * *

UNITED STATES PATENT AND TRADEMARK OFFICE
CERTIFICATE OF CORRECTION

| | | |
|---|---|---|
| PATENT NO. | : 9,248,971 B2 | Page 1 of 1 |
| APPLICATION NO. | : 14/237503 | |
| DATED | : February 2, 2016 | |
| INVENTOR(S) | : Laurens G. J. Wolters and Michael Hendrik DeGroot | |

It is certified that error appears in the above-identified patent and that said Letters Patent is hereby corrected as shown below:

On the title page item (73), Assignee line: delete "Laitram, L.C.C., Harahan, LA (US)" and substitute --Mol Belting Systems, Inc., Grand Rapids, MI (US)--.

Signed and Sealed this
Twelfth Day of April, 2016

Michelle K. Lee
*Director of the United States Patent and Trademark Office*